(12) United States Patent
Gotoh et al.

(10) Patent No.: US 9,193,907 B2
(45) Date of Patent: Nov. 24, 2015

(54) LIQUID CRYSTAL COMPOUND HAVING VINYLOXY, LIQUID CRYSTAL COMPOSITION AND LIQUID CRYSTAL DISPLAY DEVICE

(71) Applicants: Yasuyuki Gotoh, Tokyo (JP); Masahide Kobayashi, Ichihara (JP)

(72) Inventors: Yasuyuki Gotoh, Tokyo (JP); Masahide Kobayashi, Ichihara (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/081,744

(22) Filed: Nov. 15, 2013

(65) Prior Publication Data

US 2014/0138582 A1     May 22, 2014

(30) Foreign Application Priority Data

Nov. 16, 2012   (JP) ................. 2012-252231

(51) Int. Cl.
| | | |
|---|---|---|
| *C09K 19/48* | (2006.01) | |
| *C09K 19/30* | (2006.01) | |
| *C09K 19/12* | (2006.01) | |

(52) U.S. Cl.
CPC ......... *C09K 19/3068* (2013.01); *C09K 19/3028* (2013.01); *C09K 19/3066* (2013.01); *C09K 2019/122* (2013.01); *C09K 2019/301* (2013.01); *C09K 2019/3009* (2013.01); *C09K 2019/3016* (2013.01); *C09K 2019/3036* (2013.01); *C09K 2019/3075* (2013.01)

(58) Field of Classification Search
CPC ........... C09K 19/3028; C09K 19/3066; C09K 19/6068; C09K 2019/122; C09K 2019/301; C09K 2019/3016; C09K 2019/3036; C09K 2019/3075
USPC ............... 252/299.01, 299.6, 299.63, 299.66; 428/1.1; 560/1, 59, 65, 116, 118; 568/642, 643, 645, 647
See application file for complete search history.

(56) References Cited

U.S. PATENT DOCUMENTS

| | | | |
|---|---|---|---|
| 6,171,664 B1 | 1/2001 | Bremer et al. | |
| 2010/0309402 A1 | 12/2010 | Kobayashi et al. | |
| 2012/0190897 A1* | 7/2012 | Yamashita et al. | ............ 568/645 |

FOREIGN PATENT DOCUMENTS

| | | |
|---|---|---|
| JP | H02-503441 A | 3/1988 |
| JP | 2000-026323 A | 1/2000 |
| WO | 89/08633 A1 | 9/1989 |
| WO | 2009/031437 A | 3/2009 |

* cited by examiner

*Primary Examiner* — Geraldina Visconti
(74) *Attorney, Agent, or Firm* — Hogan Lovells US LLP

(57) ABSTRACT

A liquid crystal compound having high stability to heat, light and so forth, a high clearing point, a low minimum temperature of a liquid crystal phase, small viscosity, suitable optical anisotropy, large negative dielectric anisotropy, a suitable elastic constant and excellent compatibility with other liquid crystal compounds, a liquid crystal composition containing the compound, and a liquid crystal display device including the composition. The compound is represented by formula (1-1):

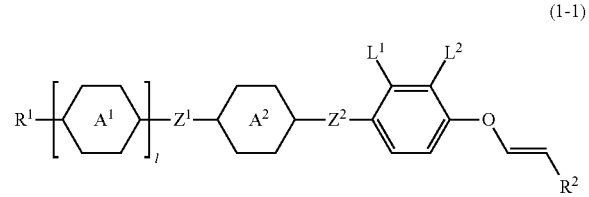

(1-1)

wherein, for example, $R^1$ is alkyl having 1 to 10 carbons, alkoxy having 1 to 9 carbons or alkenyl having 2 to 10 carbons; $R^2$ is alkyl having 1 to 10 carbons, alkoxy having 1 to 9 carbons or alkenyl having 3 to 10 carbons; ring $A^1$ is 1,4-cyclohexylene or 1,4-phenylene; ring $A^2$ is 1,4-cyclohexylene, 1,4-phenylene or 2,3-difluoro-1,4-phenylene; $Z^1$ and $Z^2$ are single bonds; $L^1$ and $L^2$ are fluorine; and l is 0, 1 or 2.

14 Claims, No Drawings

LIQUID CRYSTAL COMPOUND HAVING VINYLOXY, LIQUID CRYSTAL COMPOSITION AND LIQUID CRYSTAL DISPLAY DEVICE

This is a Non-Provisional application, which claims priority to Japanese Patent Application No. 2012-252231, filed on Nov. 16, 2012; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The invention relates to a liquid crystal compound, a liquid crystal composition and a liquid crystal display device. More specifically, the invention relates to a compound that has vinyloxy and 2,3-difluoro-1,4-phenylene, and has a negative dielectric anisotropy, a liquid crystal composition containing the compound, and a liquid crystal display device including the composition.

BACKGROUND ART

A liquid crystal display device is widely used for a display of a personal computer, a television and so forth. The device utilizes optical anisotropy, dielectric anisotropy and so forth of a liquid crystal compound. As an operating mode of the liquid crystal display device, a variety of modes are known, such as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode, a fringe field switching (FFS) mode and a polymer sustained alignment (PSA) mode.

Among the modes, the IPS mode, the FFS mode and the VA mode are known to improve narrowness of an angle of visibility, which is a disadvantage of operating modes such as the TN mode and the STN mode. In the liquid crystal display device having the mode of the kind, a liquid crystal composition having a negative dielectric anisotropy is mainly used. In order to further improve characteristics of the liquid crystal display device, a liquid crystal compound contained in the composition preferably has physical properties described in items (1) to (8) below.

(1) High stability to heat, light and so forth,
(2) a high clearing point,
(3) a low minimum temperature of a liquid crystal phase,
(4) a small viscosity ($\eta$),
(5) a suitable optical anisotropy ($\Delta n$),
(6) a large negative dielectric anisotropy ($\Delta\epsilon$),
(7) a suitable elastic constant ($K_{33}$: bend elastic constant), and
(8) an excellent compatibility with other liquid crystal compounds.

An effect of physical properties of the liquid crystal compound on the characteristics of the device is as described below. A compound having a high stability to heat, light and so forth as described in (1) increases a voltage holding ratio of the device. Thus, a service life of the device becomes longer. A compound having a high clearing point as described in (2) extends a temperature range in which the device can be used. A compound having a low minimum temperature of the liquid crystal phase such as a nematic phase and a smectic phase, as described in (3), in particular, a compound having a low minimum temperature of the nematic phase, also extends a temperature range in which the device can be used. A compound having a small viscosity as described in (4) decreases a response time of the device.

A compound having a suitable optical anisotropy as described in (5) improves a contrast of the device. In accordance with a design of the device, a compound having a large optical anisotropy or a small optical anisotropy, mare specifically, a compound having a suitable optical anisotropy, is required. When decreasing the response time by decreasing a cell gap of the device, a compound having a large optical anisotropy is suitable. A compound having a large negative dielectric anisotropy as described in (6) decreases a threshold voltage of the device. Thus, an electric power consumption of the device is decreased.

With regard to (7), a compound having a large elastic constant decreases a response time of the device. A compound having a small elastic constant decreases the threshold voltage of the device. Therefore, a suitable elastic constant is required according to characteristics that are desirably improved. A compound having an excellent compatibility with other liquid crystal compounds as described in (8) is preferred because physical properties of a composition are adjusted by mixing a liquid crystal compound having different physical properties.

A variety of liquid crystal compounds having a negative dielectric anisotropy have so far been prepared (for example, patent literature Nos. 1 to 3). Patent literature No. 1 discloses compound (A). Patent literature No. 2 discloses compound (B) and compound (C). However, the compounds are not fully suitable for a mode of a liquid crystal display device in recent years.

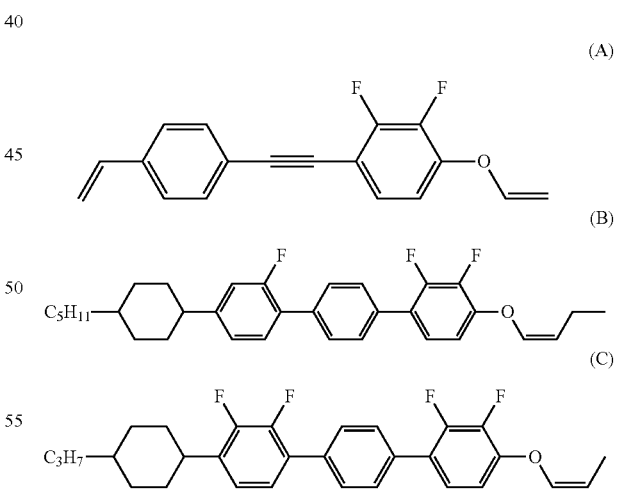

Excellent physical properties that are not found in a conventional compound can be expected from a new compound. The new compound is expected to have a suitable balance between two physical properties required upon preparing a liquid crystal composition. In view of such a situation, development is desired for a compound having excellent physical properties and a suitable balance between the physical properties with regard to (1) to (8) as described above.

3

CITATION LIST

Patent Literature

Patent literature No. 1: JP 2000-26323 A.
Patent literature No. 2: WO 2009/031437 A.
Patent literature No. 3: JP H02-503441 A.

SUMMARY OF INVENTION

Technical Problem

A first object of the invention is to provide a liquid crystal compound having a high stability to heat, light and so forth, a high clearing point, a low minimum temperature of a liquid crystal phase, a small viscosity, a suitable optical anisotropy, a large negative dielectric anisotropy, a suitable elastic constant and an excellent compatibility with other liquid crystal compounds. The object is to provide a compound having a particularly large negative dielectric anisotropy. The object is to provide a compound having a particularly excellent compatibility. A second object is to provide a liquid crystal composition that contains the compound and has a high maximum temperature of a nematic phase, a low minimum temperature of the nematic phase, a small viscosity, a suitable optical anisotropy, a large negative dielectric anisotropy and a suitable elastic constant. The object is to provide a liquid crystal composition having a suitable balance regarding at least two of the physical properties. A third object is to provide a liquid crystal display device that includes the composition, and has a wide temperature range in which a device can be used, a short response time, a large voltage holding ratio, a low threshold voltage, a large contrast ratio and a long service life.

Solution to Problem

The invention concerns a compound represented by formula (1-1), a liquid crystal composition containing the compound, and a liquid crystal display device including the composition.

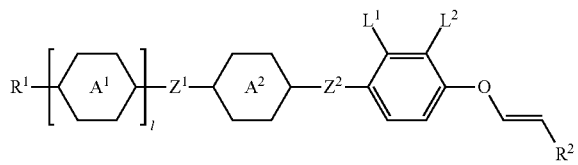

(1-1)

In formula (1-1),
$R^1$ is hydrogen, alkyl having 1 to 10 carbons, alkoxy having 1 to 9 carbons, alkoxyalkyl having 2 to 9 carbons, alkenyl having 2 to 10 carbons or alkenyloxy having 2 to 9 carbons;
$R^2$ is alkyl having 1 to 10 carbons, alkoxy having 1 to 9 carbons, alkoxyalkyl having 2 to 9 carbons, alkenyl having 3 to 10 carbons or alkenyloxy having 2 to 9 carbons;
ring $A^1$ is 1,4-cyclohexylene, 1,4-cyclohexenylene or 1,4-phenylene;
ring $A^2$ is 1,4-cyclohexylene, 1,4-cyclohexenylene, 1,4-phenylene, 2-fluoro-1,4-phenylene or 2,3-difluoro-1,4-phenylene;
$Z^1$ and $Z^2$ are independently a single bond, $—(CH_2)_2—$, $—CH_2O—$, $—OCH_2—$, $—COO—$ or $—OCO—$;
$L^1$ and $L^2$ are independently fluorine or chlorine and at least one of $L^1$ and the $L^2$ is fluorine; and
l is 0, 1 or 2.

4

The invention also concerns use of at least one of the compounds as a component of a liquid crystal composition.

The invention further concerns a liquid crystal composition, containing at least one of the compounds.

The invention still further concerns a liquid crystal display device, including the liquid crystal composition.

Advantageous Effects of Invention

A first advantage of the invention is to provide a liquid crystal compound having a high stability to heat, light and so forth, a high clearing point, a low minimum temperature of a liquid crystal phase, a small viscosity, a suitable optical anisotropy, a large negative dielectric anisotropy, a suitable elastic constant and an excellent compatibility with other liquid crystal compounds. The advantage is to provide a compound having a particularly large negative dielectric anisotropy. The advantage is to provide a compound having a particularly excellent compatibility. A second advantage is to provide a liquid crystal composition that contains the compound and has a high maximum temperature of a nematic phase, a low minimum temperature of the nematic phase, a small viscosity, a suitable optical anisotropy, a large negative dielectric anisotropy and a suitable elastic constant. The advantage is a liquid crystal composition having a suitable balance regarding at least two of physical properties. A third advantage is to provide a liquid crystal display device that includes the composition and has a wide temperature range in which the device can be used, a short response time, a large voltage holding ratio, a low threshold voltage, a large contrast ratio and a long service life.

DESCRIPTION OF EMBODIMENTS

Usage of terms herein is as described below. A liquid crystal compound is a generic term for a compound having a liquid crystal phase such as a nematic phase or a smectic phase, and also a compound having no liquid crystal phase but useful as a component of the liquid crystal composition. The liquid crystal compound, the liquid crystal composition and a liquid crystal display device may be occasionally abbreviated as "compound," "composition" and "device," respectively. The Liquid crystal display device is a generic term for a liquid crystal display panel and a liquid crystal display module. A clearing point is a transition temperature between the liquid crystal phase and an isotropic phase in the liquid crystal compound. A minimum temperature of the liquid crystal phase is a transition temperature between a solid and the liquid crystal phase (a smectic phase, a nematic phase or the like) in the liquid crystal compound. A maximum temperature of the nematic phase is a transition temperature between the nematic phase and the isotropic phase in the liquid crystal composition, and may be occasionally abbreviated as a maximum temperature. A minimum temperature of the nematic phase may be occasionally abbreviated as a minimum temperature. A compound represented by formula (1-1) may be occasionally abbreviated as compound (1-1). The abbreviation may apply occasionally also to a compound represented by formula (2) or the like. In formula (1-1), formula (2) or the like, a symbol $A^1$, $D^2$ or the like surrounded by a hexagonal shape corresponds to ring $A^1$, ring $D^2$ or the like, respectively. A plurality of ring $A^1$ are described in one formula or in different formulas. In the compounds, two groups represented by arbitrary two rings $A^1$ may be identical or different. The rule is applied to a symbol ring $A^2$, $Z^2$ or the like. More-over, the rule is also applied to two of ring $A^1$ when l is 2. An amount of a compound expressed in terms of "percent" is expressed in terms of "weight percent (% by weight)" based on the total amount of the composition.

An expression "at least one of "A" may be replaced by "B"" means that a position of "A" is arbitrary when the number of "A" is 1, and the positions can be selected without limitation also when the number of "A" is 2 or more. An expression "at least one of A may be replaced by B, C or D" means a case where arbitrary A is replaced by B, a case where arbitrary A is replaced by C, a case where arbitrary A is replaced by D, and further a case where a plurality of A are replaced by at least two of B, C and D. For example, alkyl in which at least one of —$CH_2$— may be replaced by —O— or —CH=CH— includes alkyl, alkenyl, alkoxy, alkoxyalkyl, alkoxyalkenyl and alkenyloxyalkyl. In addition, such a case where replacement of two successive —$CH_2$— by —O— results in forming —O—O— is not preferred. In alkyl or the like, a case where replacement of —$CH_2$— of a methyl part (—$CH_2$—H) by —O— results in forming —O—H is not preferred, either.

Then, 2-fluoro-1,4-phenylene means two divalent groups described below. Fluorine may be leftward or rightward. The rule is also applied to an asymmetrical divalent group such as tetrahydropyran-2,5-diyl.

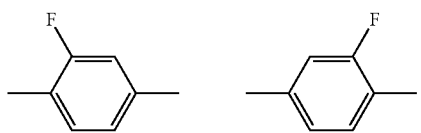

The invention includes the content as described in item 1 to item 15 as described below.

Item 1. A compound represented by formula (1-1):

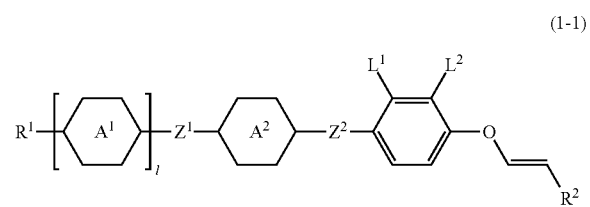

wherein, in formula (1-1),
$R^1$ is hydrogen, alkyl having 1 to 10 carbons, alkoxy having 1 to 9 carbons, alkoxyalkyl having 2 to 9 carbons, alkenyl having 2 to 10 carbons or alkenyloxy having 2 to 9 carbons;
$R^2$ is alkyl having 1 to 10 carbons, alkoxy having 1 to 9 carbons, alkoxyalkyl having 2 to 9 carbons, alkenyl having 3 to 10 carbons or alkenyloxy having 2 to 9 of carbons;
ring $A^1$ is 1,4-cyclohexylene, 1,4-cyclohexenylene or 1,4-phenylene;
ring $A^2$ is 1,4-cyclohexylene, 1,4-cyclohexenylene, 1,4-phenylene, 2-fluoro-1,4-phenylene or 2,3-difluoro-1,4-phenylene; $Z^2$ and $Z^2$ are independently a single bond, —$(CH_2)_2$—, —$CH_2O$—, —$OCH_2$—, —COO— or —OCO—;
$L^2$ and $L^2$ are independently fluorine or chlorine and at least one of $L^2$ and $L^2$ is fluorine; and
l is 0, 1, or 2.

Item 2. The compound according to item 1, represented by formula (1-2):

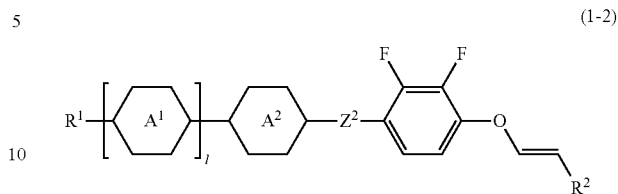

wherein, in formula (1-2),
$R^1$ is alkyl having 1 to 10 carbons, alkoxy having 1 to 9 carbons, alkoxyalkyl having 2 to 9 carbons, alkenyl having 2 to 10 carbons or alkenyloxy having 2 to 9 carbons;
$R^2$ is alkyl having 1 to 10 carbons, alkoxy having 1 to 9 carbons, alkoxyalkyl having 2 to 9 carbons, alkenyl having 3 to 10 carbons or alkenyloxy having 2 to 9 carbons;
ring $A^1$ is 1,4-cyclohexylene, 1,4-cyclohexenylene or 1,4-phenylene;
ring $A^2$ is 1,4-cyclohexylene, 1,4-cyclohexenylene, 1,4-phenylene, 2-fluoro-1,4-phenylene or 2,3-difluoro-1,4-phenylene;
$Z^2$ is a single bond, —$(CH_2)_2$—, —$CH_2O$—, —$OCH_2$—, —COO— or —OCO—; and
l is 0, 1 or 2.

Item 3. The compound according to item 2, represented by formula (1-3):

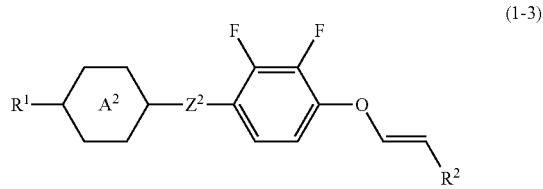

wherein, in formula (1-3),
$R^1$ is alkyl having 1 to 10 carbons, alkoxy having 1 to 9 carbons, alkoxyalkyl having 2 to 9 carbons, alkenyl having 2 to 10 carbons or alkenyloxy having 2 to 9 carbons
$R^2$ is alkyl having 1 to 10 carbons, alkoxy having 1 to 9 carbons, alkoxyalkyl having 2 to 9 carbons, alkenyl having 3 to 10 carbons or alkenyloxy having 2 to 9 carbons;
ring $A^2$ is 1,4-cyclohexylene, 1,4-cyclohexenylene, 1,4-phenylene, 2-fluoro-1,4-phenylene or 2,3-difluoro-1,4-phenylene; and $Z^2$ is a single bond, —$(CH_2)_2$—, —$CH_2O$—, —$OCH_2$—, —COO— or —OCO—.

Item 4. The compound according to item 2, represented by formula (1-4):

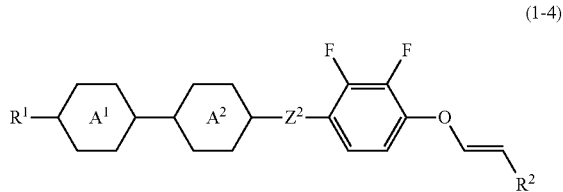

wherein, in formula (1-4),
$R^1$ is alkyl having 1 to 10 carbons, alkoxy having 1 to 9 carbons, alkoxyalkyl having 2 to 9 carbons, alkenyl having 2 to 10 carbons or alkenyloxy having 2 to 9 carbons;

$R^2$ is alkyl having 1 to 10 carbons, alkoxy having 1 to 9 carbons, alkoxyalkyl having 2 to 9 carbons, alkenyl having 3 to 10 carbons or alkenyloxy having 2 to 9 carbons;
ring $A^1$ is 1,4-cyclohexylene, 1,4-cyclohexenylene or 1,4-phenylene;
ring $A^2$ is 1,4-cyclohexylene, 1,4-cyclohexenylene, 1,4-phenylene, 2-fluoro-1,4-phenylene or 2,3-difluoro-1,4-phenylene; and
$Z^2$ is a single bond, —$(CH_2)_2$—, —$CH_2O$—, —$OCH_2$—, —COO— or —OCO—.

Item 5. The compound according to item 2, represented by any one of formulas (1-5-1) to (1-5-12):

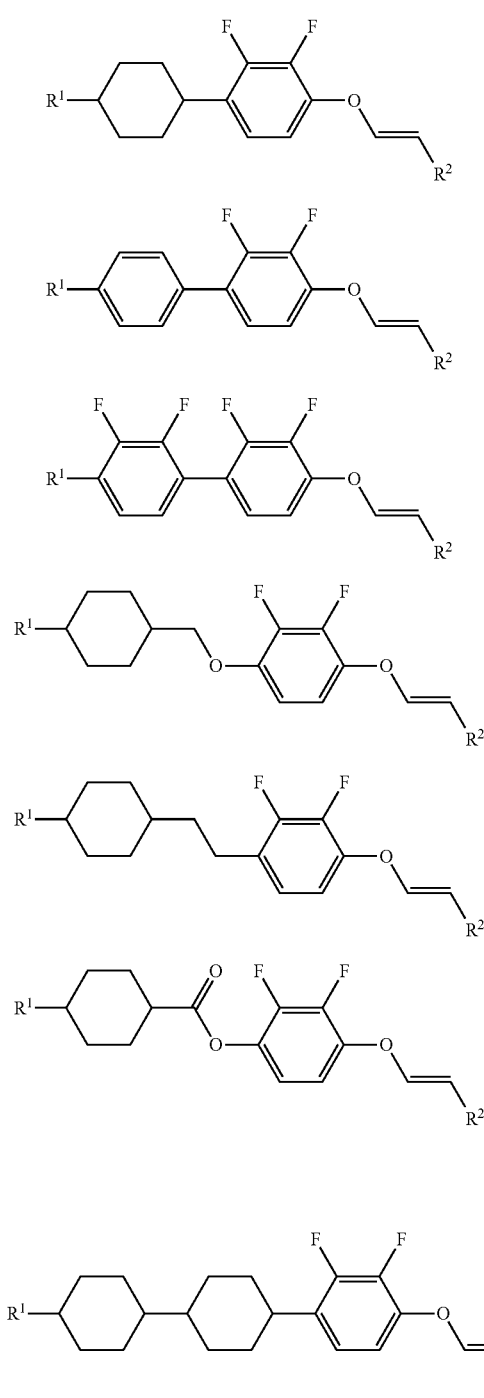

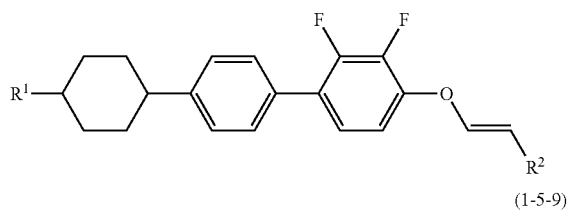

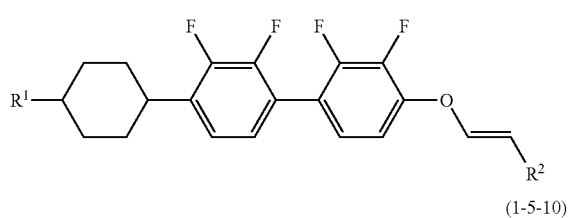

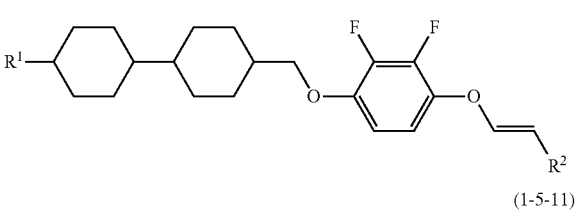

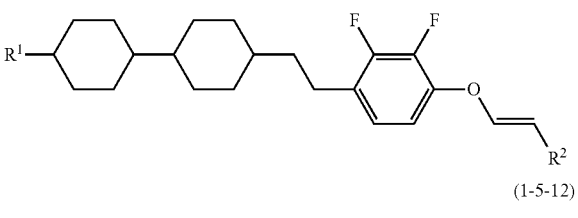

wherein, in formulas (1-5-1) to (1-5-12), $R^1$ is alkyl having 1 to 10 carbons, alkoxy having 1 to 9 carbons, alkoxyalkyl having 2 to 9 carbons, alkenyl having 2 to 10 carbons or alkenyloxy having 2 to 9 carbons, and $R^2$ is alkyl having 1 to 10 carbons, alkoxy having 1 to 9 carbons, alkoxyalkyl having 2 to 9 carbons, alkenyl having 3 to 10 carbons or alkenyloxy having 2 to 9 carbons.

Item 6. The compound according to item 5, wherein, in formulas (1-5-1) to (1-5-12) according to item 5, $R^1$ is alkyl having 1 to 10 carbons or alkenyl having 2 to 10 carbons, and $R^2$ is alkyl having 1 to 10 carbons or alkenyl having 3 to 10 carbons.

Item 7. Use of at least one of the compounds according to any one of items 1 to 6 as a component of a liquid crystal composition.

Item 8. A liquid crystal composition, containing at least one of the compounds according to any of items 1 to 6.

Item 9. The liquid crystal composition according to item 8, further containing at least one compound selected from the group of compounds represented by formulas (6) to (12):

(6)
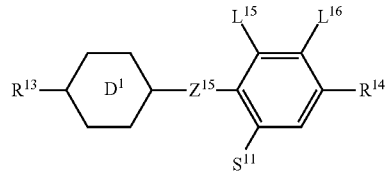

(7)
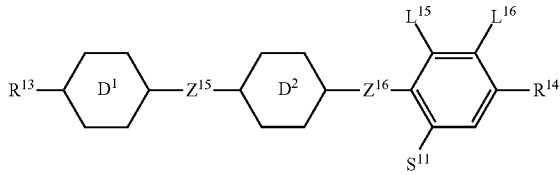

(8)
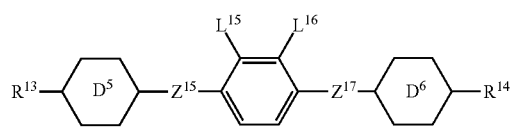

(9)
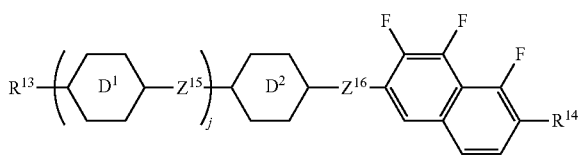

(10)
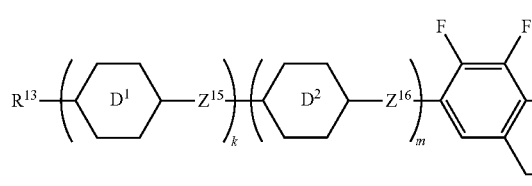

(11)
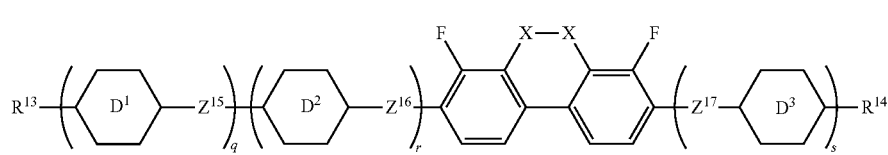

(12)
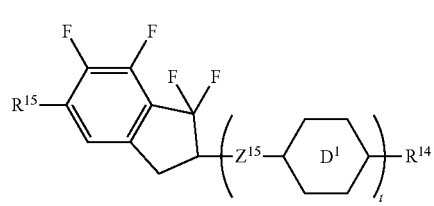

wherein, in formulas (6) to (12), $R^{13}$ is alkyl having 1 to 10 carbons or alkenyl having 2 to 10 carbons, and in the alkyl and the alkenyl, at least one of —$CH_2$— may be replaced by —O— and at least one of hydrogen may be replaced by fluorine;

$R^{14}$ is alkyl having 1 to 10 carbons, and in the alkyl, at least one of —$CH_2$— may be replaced by —O— and at least one of hydrogen may be replaced by fluorine;

$R^{15}$ is hydrogen, fluorine, alkyl having 1 to 10 carbons or alkenyl having 2 to 10 carbons, and in the alkyl and the alkenyl, at least one of —$CH_2$— may be replaced by —O— and at least one of hydrogen may be replaced by fluorine;

$S^{11}$ is independently hydrogen or methyl;

X is —$CF_2$—, —O— or —CHF—;

ring $D^1$, ring $D^2$, ring $D^3$ and ring $D^4$ are independently 1,4-cyclohexylene, 1,4-cyclohexenylene, 1,4-phenylene in which at least one of hydrogen may be replaced by fluorine, tetrahydropyran-2,5-diyl or decahydronaphthalene-2,6-diyl;

ring $D^5$ and ring $D^6$ are independently 1,4-cyclohexylene, 1,4-cyclohexenylene, 1,4-phenylene, tetrahydropyran-2,5-diyl or decahydronaphthalene 2,6-diyl;

$Z^{15}$, $Z^{16}$, $Z^{17}$ and $Z^{18}$ are independently a single bond, —$CH_2CH_2$—, —COO—, —$CH_2O$—, —$OCF_2$— or —$OCF_2CH_2CH_2$—;

$L^9$ and $L^{10}$ are independently fluorine or chlorine; and j, k, m, n, p, q, r and s are independently 0 or 1, a sum of k, m, n and p is 1 or 2, a sum of q, r and s is 0, 1, 2 or 3, and t is 1, 2 or 3.

Item 10. The liquid crystal composition according to any one of items 8 to 9, further containing at least one compound selected from the group of compounds represented by formulas (13) to (15):

(13)
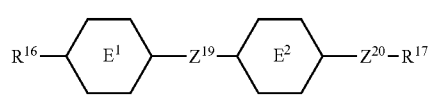

(14)
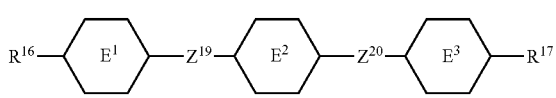

-continued

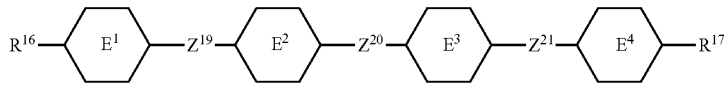
(15)

wherein, in formulas (13) to (15),
$R^{16}$ and $R^{17}$ are independently alkyl having 1 to 10 carbons or alkenyl having 2 to 10 carbons, and in the alkyl or the alkenyl, at least one of —CH$_2$— may be replaced by —O— and at least one of hydrogen may be replaced by fluorine;
ring $E^1$, ring $E^2$, ring $E^3$ and ring $E^4$ are independently 1,4-cyclohexylene, 1,4-phenylene, 2-fluoro-1,4-phenylene, 2,5-difluoro-1,4-phenylene or pyrimidine-2,5-diyl; and
$Z^{19}$, $Z^{20}$ and $Z^{21}$ are independently a single bond, —CH$_2$CH$_2$—, —CH=CH—, —C≡C— or —COO—.

Item 11. The liquid crystal composition according to any one of items 8 to 10, further containing at least one compound selected from the group of compounds represented by formulas (2) to (4):

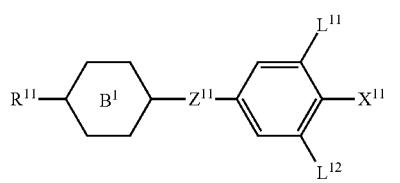
(2)

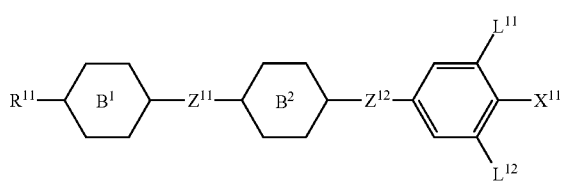
(3)

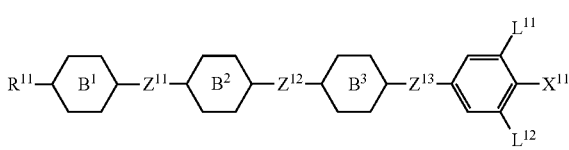
(4)

wherein, in formulas (2) to (4),
$R^{11}$ is alkyl having 1 to 10 carbons or alkenyl having 2 to 10 carbons, and in the alkyl and the alkenyl, at least one of hydrogen may be replaced by fluorine and at least one of —CH$_2$— may be replaced by —O—;
$X^{11}$ is fluorine, chlorine, —OCF$_3$, —OCHF$_2$, —CF$_3$, —CHF$_2$, —CH$_2$F, —OCF$_2$CHF$_2$ or —OCF$_2$CHFCF$_3$;
ring $B^1$, ring $B^2$ and ring $B^3$ are independently 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;
$Z^{11}$, $Z^{12}$ and $Z^{13}$ are independently a single bond, —CH$_2$CH$_2$—, —CH=CH—, —C≡C—, —COO—, —OCF$_2$—, —CH$_2$O— or —(CH$_2$)$_4$—; and
$L^{11}$ and $L^{12}$ are independently hydrogen or fluorine.

Item 12. The liquid crystal composition according to any one of items 8 to 11, further containing at least one compound selected from the group of compounds represented by formula (5):

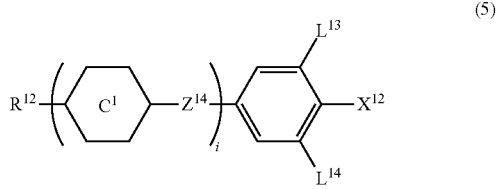
(5)

wherein, in formula (5),
$R^{12}$ is alkyl having 1 to 10 carbons or alkenyl having 2 to 10 carbons, and in the alkyl and the alkenyl, at least one of hydrogen may be replaced by fluorine and at least one of —CH$_2$— may be replaced by —O—;
$X^{12}$ is —C≡N or —C≡C—C≡N;
ring $C^1$ is 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;
$Z^{14}$ is a single bond, —CH$_2$CH$_2$—, —C≡C—, —COO—, —CF$_2$O—, —OCF$_2$— or —CH$_2$O—;
$L^{13}$ and $L^{14}$ are independently hydrogen or fluorine; and
i is 1, 2, 3 or 4.

Item 13. The liquid crystal composition according to items 8 to 12, further containing at least one optically active compound and/or at least one polymerizable compound.

Item 14. The liquid crystal composition according to items 8 to 13, further containing at least one antioxidant and/or at least one ultraviolet light absorber.

Item 15. A liquid crystal display device, including the liquid crystal composition according to any one of items 8 to 14.

The compound, liquid crystal composition and liquid crystal display device of the invention are explained in order.
1-1. Compound (1-1)

Compound (1-1) of the invention will be explained. Preferred examples of a terminal group, a ring structure and a bonding group in compound (1-1), and an effect of the groups on physical properties are also applied to a compound represented by a subordinate formula of formula (1-1) for compound (1-1).

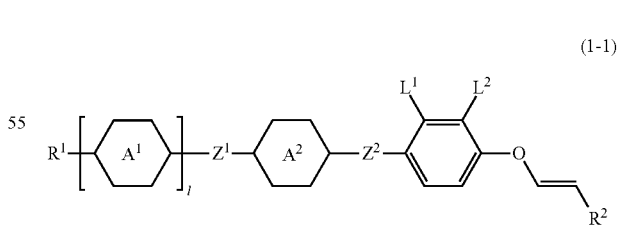
(1-1)

In formula (1-1), $R^1$ is hydrogen, alkyl having 1 to 10 carbons, alkoxy having 1 to 9 carbons, alkoxyalkyl having 2 to 9 carbons, alkenyl having 2 to 10 carbons or alkenyloxy having 2 to 9 carbons; $R^2$ is alkyl having 1 to 10 carbons, alkoxy having 1 to 9 carbons, alkoxyalkyl having 2 to 9 carbons, alkenyl having 3 to 10 carbons or alkenyloxy having 2 to 9 carbons. The groups have a straight chain or a branched chain, and do not include a cyclic group such as cyclohexyl. In the groups, the straight chain is preferred to the branched chain.

Preferred examples of $R^1$ or $R^2$ include alkyl, alkoxy, alkoxyalkyl and alkenyl. Further preferred examples of $R^1$ or $R^2$ include alkyl, alkoxy and alkenyl.

Specific examples of alkyl include —$CH_3$, —$C_2H_5$, —$C_3H_7$, —$C_4H_9$, —$C_5H_{11}$, —$C_6H_{13}$ and —$C_7H_{15}$. Specific examples of alkoxy include —$OCH_3$, —$OC_2H_5$, —$OC_3H_7$, —$OC_4H_9$, —$OC_5H_{11}$ and —$OC_6H_{13}$. Specific examples of alkoxyalkyl include —$CH_2OCH_3$, —$CH_2OC_2H_5$, —$CH_2OC_3H_7$, —$(CH_2)_2OCH_3$, —$(CH_2)_2OC_2H_5$, —$(CH_2)_2OC_3H_7$, —$(CH_2)_3OCH_3$, —$(CH_2)_4OCH_3$, and —$(CH_2)_5OCH_3$. Specific examples of alkenyl include —CH=$CH_2$, —CH=$CHCH_3$, —$CH_2$CH=$CH_2$, —CH=$CHC_2H_5$, —$CH_2$CH=$CHCH_3$, —$(CH_2)_2$CH=$CH_2$, —CH=$CHC_3H_7$, —$CH_2$CH=$CHC_2H_5$, —$(CH_2)_2$CH=$CHCH_3$ and —$(CH_2)_3$CH=$CH_2$. Specific examples of alkenyloxy include —$OCH_2$CH=$CH_2$, —$OCH_2$CH=$CHCH_3$ and —$OCH_2$CH=$CHC_2H_5$.

Preferred examples of $R^1$ or $R^2$ include —$CH_3$, —$C_2H_5$, —$C_3H_7$, —$C_4H_9$, —$C_5H_{11}$, —$OCH_3$, —$OC_2H_5$, —$OC_3H_7$, —$OC_4H_9$, —$OC_5H_{11}$, —$CH_2OCH_3$, —$(CH_2)_2OCH_3$, —$(CH_2)_3OCH_3$, —$CH_2$CH=$CH_2$, —$CH_2$CH=$CHCH_3$, —$(CH_2)_2$CH=$CH_2$, —$CH_2$CH=$CHC_2H_5$, —$(CH_2)_2$CH=$CHCH_3$, —$(CH_2)_3$CH=$CH_2$, —$(CH_2)_3$CH=$CHCH_3$, —$(CH_2)_3$CH=$CHC_2H_5$, —$(CH_2)_3$CH=$CHC_3H_7$, —$OCH_2$CH=$CH_2$, —$OCH_2$CH=$CHCH_3$ and —$OCH_2$CH=$CHC_2H_5$. Further preferred examples of $R^1$ or $R^2$ include —$CH_3$, —$C_2H_5$, —$C_3H_7$, —$OCH_3$, —$OC_2H_5$, —$OC_3H_7$, —$OC_4H_9$, —$(CH_2)_2$CH=$CH_2$, —$(CH_2)_2$CH=$CHCH_3$ and —$(CH_2)_2$CH=$CHC_3H_7$.

When $R^1$ or $R^2$ has a straight chain, a temperature range of the liquid crystal phase is wide and viscosity is small. When $R^1$ or $R^2$ has a branched chain, compatibility with other liquid crystal compounds is good. A compound in which $R^1$ is optically active is useful as a chiral dopant. A reverse twisted domain that is generated in the liquid crystal display device can be prevented by adding the compound to the composition. A compound in which $R^1$ is not optically active is useful as a component of the composition.

A preferred configuration of —CH=CH— in alkenyl depends on a position of a double bond. A trans configuration is preferred in alkenyl having the double bond in an odd-numbered position, such as —CH=$CHCH_3$, —CH=$CHC_2H_5$, —CH=$CHC_3H_7$, —CH=$CHC_4H_9$, —$C_2H_4$CH=$CHCH_3$ and —$C_2H_4$CH=$CHC_2H_5$. A cis configuration is preferred in alkenyl having the double bond on an even-numbered position, such as —$CH_2$CH=$CHCH_3$, —$CH_2$CH=$CHC_2H_5$ and —$CH_2$CH=$CHC_3H_7$. The alkenyl compound having a preferred configuration has a wide temperature range of the liquid crystal phase, a small viscosity and a large elastic constant.

However, a group in which oxygen and oxygen are adjacent, such as $CH_3$—O—O—$CH_2$—, or a group in which double bond sites are adjacent, such as $CH_3$—CH=CH—CH=CH—, are not preferred in consideration of stability of the compound.

In formula (1-1), ring $A^1$ is 1,4-cyclohexylene, 1,4-cyclohexenylene or 1,4-phenylene; ring $A^2$ is 1,4-cyclohexylene, 1,4-cyclohexenylene, 1,4-phenylene, 2-fluoro-1,4-phenylene or 2,3-difluoro-1,4-phenylene.

Preferred examples of ring $A^1$ or ring $A^2$ include 1,4-cyclohexylene, 1,4-phenylene and 2,3-difluoro-1,4-phenylene. Further preferred examples include 1,4-cyclohexylene and 1,4-phenylene. Particularly preferred examples include 1,4-cyclohexylene. Then, 1,4-cyclohexylene has cis and trans configurations. From a viewpoint of a high maximum temperature, the trans configuration is preferred.

When at least one of ring $A^1$ and ring $A^2$ is 1,4-cyclohexylene, the viscosity is small. When the compound is added, the viscosity of the composition can be decreased. When at least one of ring $A^2$ is 2,3-difluoro-1,4-phenylene, the dielectric anisotropy is negatively large. When the compound is added, the dielectric anisotropy of the composition can be negatively increased.

In formula (1-1), $Z^1$ and $Z^2$ are independently a single bond, —$(CH_2)_2$—, —$CH_2O$—, —$OCH_2$—, —COO— or —OCO—.

A compound in which $Z^1$ or $Z^2$ is —COO— or —OCO— has a high maximum temperature, and therefore is preferred. A compound in which $Z^1$ or $Z^2$ is —$CH_2O$— or —$OCH_2$— has a large negative dielectric anisotropy, and therefore is preferred. A compound in which $Z^1$ or $Z^2$ is a single bond or —$(CH_2)_2$— has a small viscosity, and therefore is preferred.

In consideration of the stability of the compound, a single bond, —$(CH_2)_2$—, —$CH_2O$— or —$OCH_2$— is preferred, and a single bond or —$(CH_2)_2$— is further preferred. In consideration of increasing a clearing point, when one of $Z^1$ and $Z^2$ is —$(CH_2)_2$—, —$CH_2O$—, —$OCH_2$—, —COO— or —OCO—, the other is preferably a single bond. A case where both $Z^1$ and $Z^2$ are a single bond is further preferred.

In formula (1-1), $L^1$ and $L^2$ are independently fluorine or chlorine and at least one of $L^1$ and $L^2$ is fluorine.

A compound in which both $L^1$ and $L^2$ are fluorine has a high maximum temperature and a negatively large dielectric anisotropy, and therefore is preferred.

In formula (1-1), 1 is 0, 1, or 2. When 1 is 0, the viscosity is small. When 1 is 1, a balance between the viscosity and the maximum temperature is excellent. When 1 is 2, the maximum temperature is high.

Compound (1-1) has vinyloxy and 2,3-difluoro-1,4-phenylene. Due to an effect of such structure, the compound has a suitable optical anisotropy, a large negative dielectric anisotropy and a suitable elastic constant. The compound has an excellent compatibility due to an effect of vinyloxy. The compound is particularly excellent from a viewpoint of the large negative dielectric anisotropy and the excellent compatibility.

As described above, a compound having objective physical properties can be obtained by suitably selecting types of the terminal groups, the ring structures, the bonding groups and so forth. Incidentally, compound (1-1) may contain an isotope such as $^2H$ (deuterium) and $^{13}C$ in an amount larger than an amount of natural abundance because no significant difference exists in physical properties of the compound.

1-2. Preferred Compound

Specific examples of preferred compound (1-1) include compound (1-2) according to item 2, compound (1-3) according to item 3, compound (1-4) according to item 4 and compounds (1-5-1) to (1-5-12) according to item 5.

Compounds (1-2) to (1-4) have vinyloxy and 2,3-difluoro-1,4-phenylene, and are asymmetrical in structure. Therefore, the compounds are preferred from a viewpoint of a high stability to heat or light, a low minimum temperature of the liquid crystal phase, a high maximum temperature of the liquid crystal phase, a large negative dielectric anisotropy and a suitable elastic constant. Compounds in which $Z^2$ is a single bond in compounds (1-2) to (1-4) are further preferred from a viewpoint of a high maximum temperature. Compounds in which $Z^2$ is —$(CH_2)_2$— are further preferred from a viewpoint of a small viscosity. Compounds in which $Z^2$ is —$CH_2O$— or —$OCH_2$— are further preferred from a viewpoint of a large negative dielectric anisotropy. Compounds in which $Z^2$ is —COO— or —OCO— are still further preferred from a viewpoint of a high maximum temperature.

Compounds (1-5-1) to (1-5-12) have vinyloxy and 2,3-difluoro-1,4-phenylene, and therefore are still further preferable from a viewpoint of a high stability to heat or light, a low minimum temperature of the liquid crystal phase, a suitable optical anisotropy, a large negative dielectric anisotropy and a suitable elastic constant.

A composition containing compound (1-1), in particular, compounds (1-2) to (1-4) or compounds (1-5-1) to (1-5-12) has a high maximum temperature, a low minimum temperature, a small viscosity, a suitable optical anisotropy, a large negative dielectric anisotropy and a suitable elastic constant. The composition is stable under conditions in which the liquid crystal display device is ordinarily used, and the compound is not precipitated as crystals (or a smectic phase) even when the composition is kept at a low temperature. Accordingly, compound (1-1) is suitably applied to a liquid crystal composition used for a liquid crystal display device having an operating mode such as IPS, VA or PSA.

1-3. Synthesis of Compound (1-1)

A method for synthesizing compound (1-1) will be explained. Compound (1-1) can be prepared by suitably combining techniques of synthetic organic chemistry. A method for introducing an objective terminal group, ring and bonding group into a starting material is described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza, in Japanese) (Maruzen Co., Ltd.).

1-3-1. Formation of a Bonding Group

An example of a method for forming a bonding group in compound (1-1) is as described in a scheme below. In the scheme, $MSG^1$ (or $MSG^2$) is a monovalent organic group having at least one ring. Monovalent organic groups represented by a plurality of $MSG^1$ (or $MSG^2$) may be identical or different. Compounds (1A) to (1D) correspond to compound (1-1).

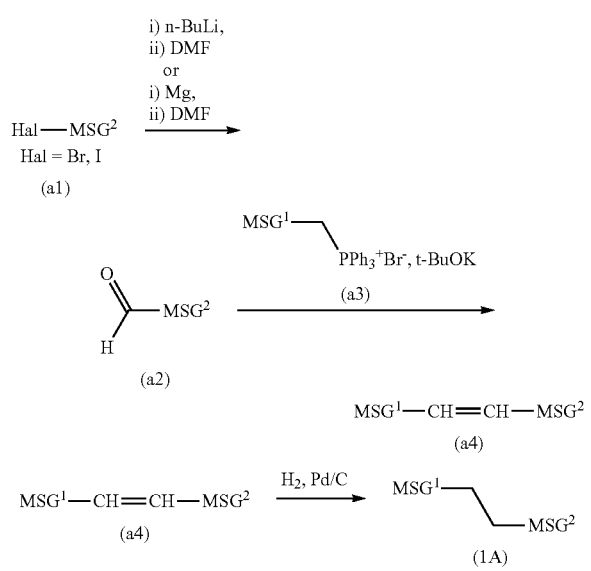

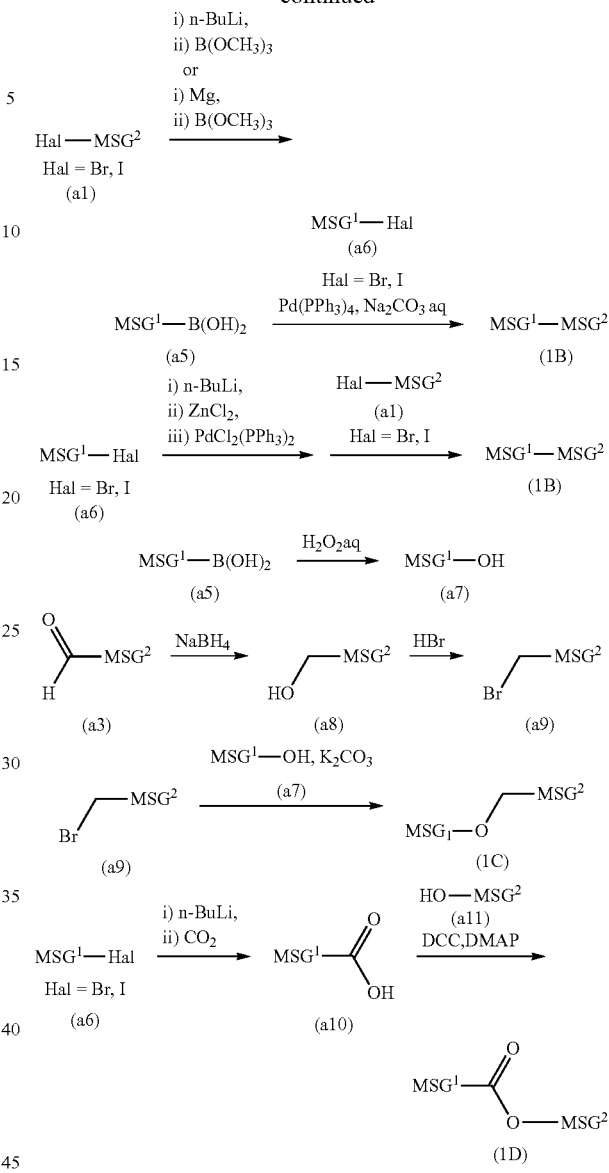

(1) Formation of —(CH$_2$)$_2$—

Aldehyde (a2) is obtained by allowing organohalogen compound (a1) to react with butyllithium (or magnesium), and then allowing the resulting intermediate to react with formamide such as N,N-dimethylformamide (DMF). Compound (a4) having a double bond is obtained by allowing aldehyde (a2) to react with phosphorus ylide obtained by treating phosphonium salt (a3) with a base such as potassium t-butoxide. Compound (1A) is prepared by hydrogenating compound (a4) in the presence of a catalyst such as palladium on carbon (Pd/C).

(2) Formation of a Single Bond

A Grignard reagent (or a lithium salt) is prepared by allowing organohalogen compound (a1) to react with magnesium (or butyllithium). Dihydroxyborane (a5) is obtained by allowing the Grignard reagent (or the lithium salt) to react with a boric acid ester such as trimethyl borate, and then by hydrolyzing the resultant product in the presence of acid such as hydrochloric acid. Compound (1B) is prepared by allowing compound (a5) to react with organohalogen compound (a6)

in an aqueous carbonate solution in the presence of a tetrakis (triphenylphosphine)palladium (Pd(PPh$_3$)$_4$) catalyst.

A method described below can also be applied. Organohalogen compound (a6) is allowed to react with butyl lithium and further with zinc chloride. Compound (1B) is prepared by allowing the resulting intermediate compound to react with compound (a1) in the presence of bistriphenylphosphine dichloropalladium (Pd(PPh$_3$)$_2$Cl$_2$).

(3) Formation of —CH$_2$O— or —OCH$_2$—

Alcohol (a7) is obtained by oxidizing dihydroxyborane (a5) with an oxidizing agent such as hydrogen peroxide. Separately, alcohol (a8) is obtained by reducing aldehyde (a3) with a reducing agent such as sodium borohydride. Halogen compound (a9) is obtained by halogenating the alcohol (a8) with hydrobromic acid or the like. Compound (1C) is prepared by allowing the halide (a9) to react, in the presence of potassium carbonate or the like, with the alcohol (a7) previously obtained.

(4) Formation of —COO— or —OCO—

Carboxylic acid (a10) is obtained by allowing compound (a6) to react with n-butyl lithium and then with carbon dioxide. Compound (1D) having —COO— is prepared by dehydrating the carboxylic acid (a10) and phenol (a11) in the presence of 1,3-dicyclohexylcarbodiimide (DDC) and 4-dimethylaminopyridine (DMAP). Compound having —OCO— can also be prepared according to the method.

1-3-2. Preparation Example

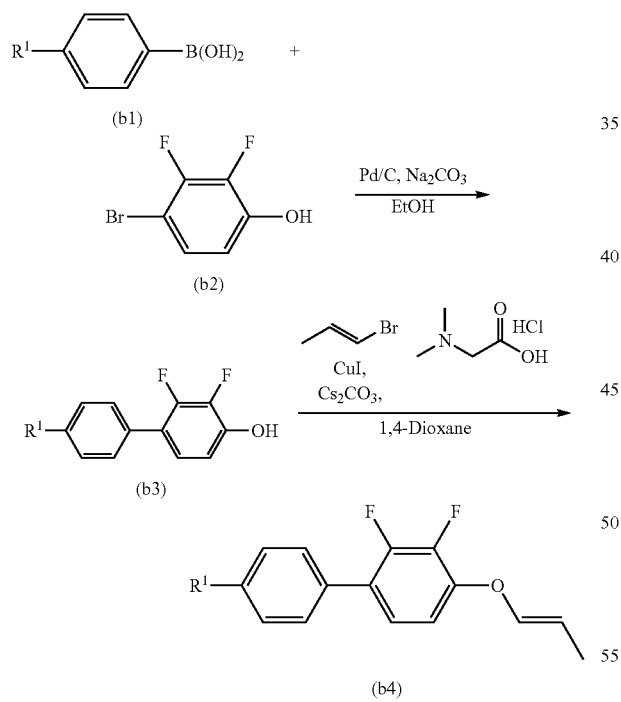

An example of a method for preparing compound (1-1) is as described below. Compound (b3) is obtained by allowing 4-alkyl phenylboronic acid (b1) to react with 4-bromo-2,3-difluorophenol (b2) in ethanol in the presence of a catalyst amount of Pd/C and sodium carbonate. Compound (b4) being one example of compound (1-1) is prepared by allowing compound (b3) to react with trans-1-bromo-1-propene, cesium carbonate, copper iodide and N,N-dimethylglycine hydrochloride in 1,4-dioxane.

2. Composition (1)

Liquid crystal composition (1) of the invention will be explained below. Composition (1) contains at least one compound (1) as component A. Composition (1) may contain two or more kinds of compound (1). Composition (1) may contain only compound (1) as a component of the liquid crystal composition. Composition (1) preferably contains at least one of compound (1) in the range of approximately 1 to approximately 99% by weight in order to develop excellent physical properties. In a composition having a positive dielectric anisotropy, a preferred content of compound (1) is in the range of approximately 5 to approximately 60% by weight. In a composition having a negative dielectric anisotropy, a preferred content of compound (1) is approximately 30% or less by weight. Composition (1) may also contain compound (1) and various kinds of liquid crystal compounds that are not described herein.

A preferred composition contains a compound selected from components B, C, D and E shown below. When composition (1) is prepared, a component thereof can be selected, for example, by taking dielectric anisotropy of liquid crystal compound (1) into consideration. A composition prepared by suitably selected a component has a high maximum temperature of the nematic phase, a low minimum temperature of the nematic phase, a small viscosity, a suitable optical anisotropy, a large dielectric anisotropy and a suitable elastic constant.

Component B includes compounds (2) to (4). Component C includes compound (5). Component D includes compounds (6) to (12). Component E includes compounds (13) to (15). The components will be explained in the order.

Component B includes a compound having a halogen-containing group or a fluorine-containing group at a right terminal. Preferred examples of component B include compounds (2-1) to (2-16), compounds (3-1) to (3-113) and compounds (4-1) to (4-57).

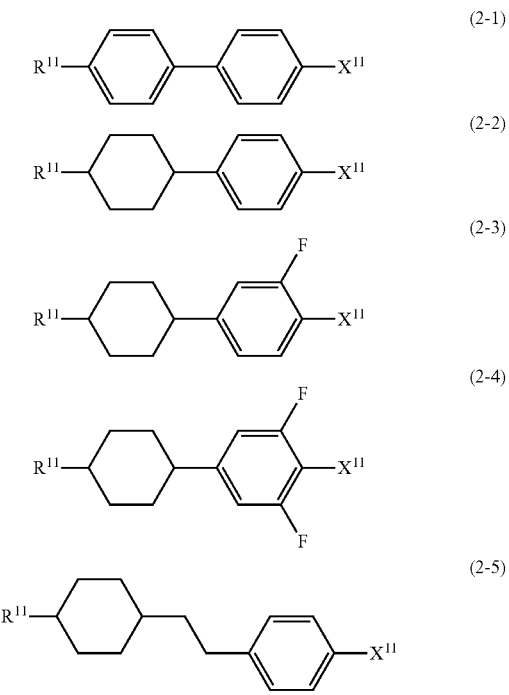

(3-10) 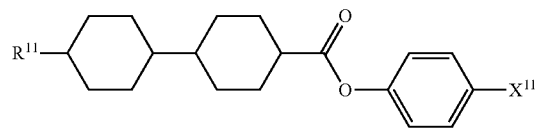
(3-11) 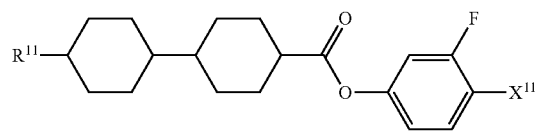
(3-12) 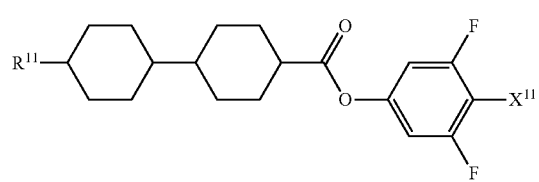
(3-13) 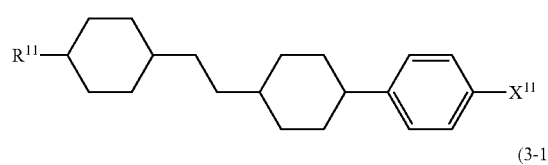
(3-14) 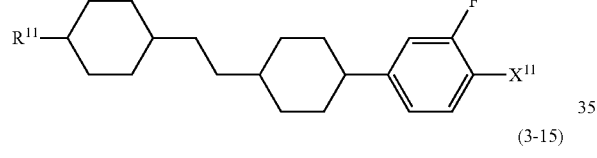
(3-15) 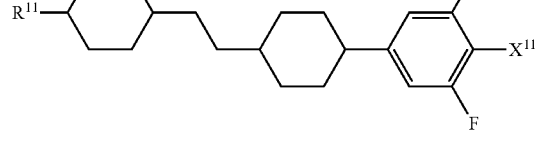
(3-16) 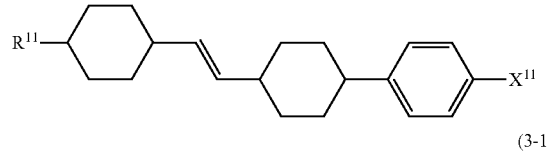
(3-17) 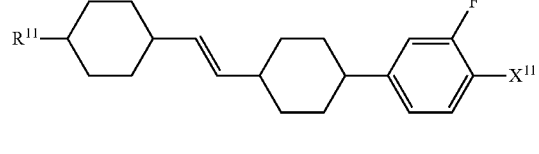
(3-18) 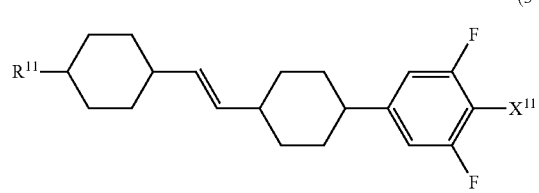
(3-19) 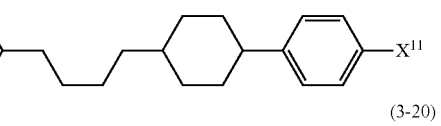
(3-20) 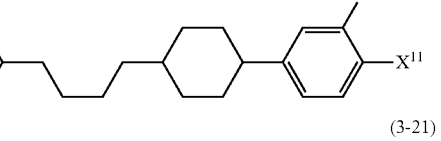
(3-21) 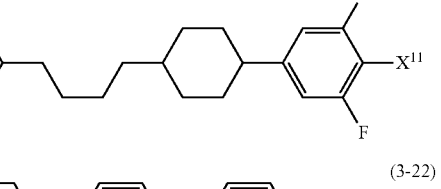
(3-22) 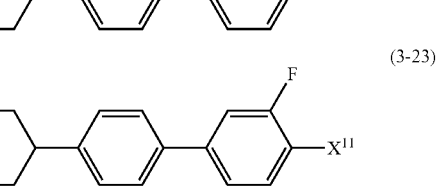
(3-23) 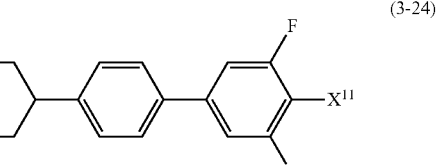
(3-24) 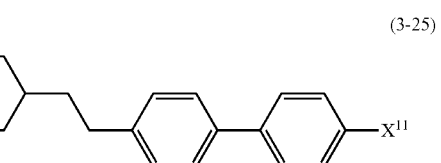
(3-25) 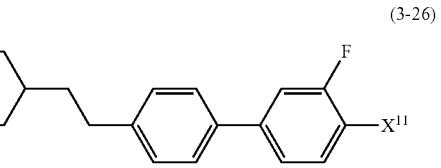
(3-26) 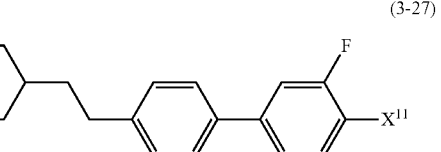
(3-27) 
(3-28) 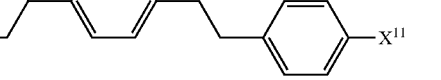

(3-29) 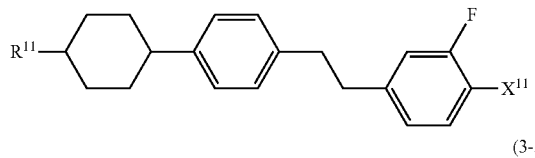
(3-30) 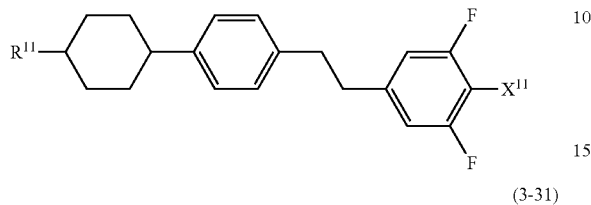
(3-31) 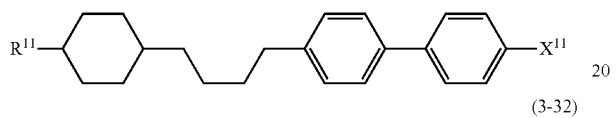
(3-32) 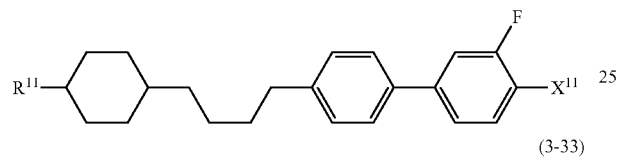
(3-33) 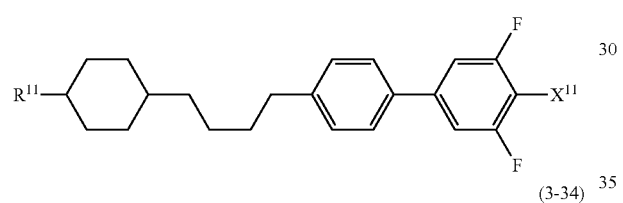
(3-34) 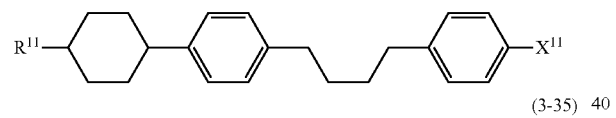
(3-35) 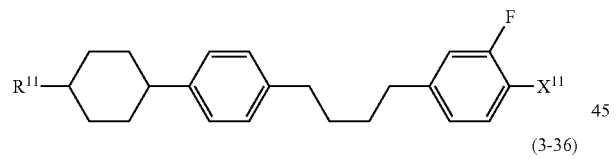
(3-36) 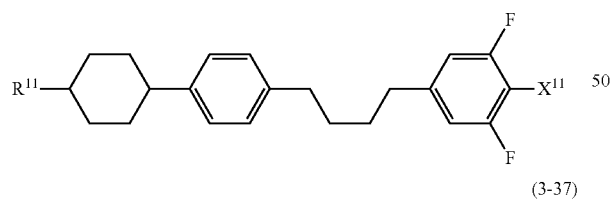
(3-37) 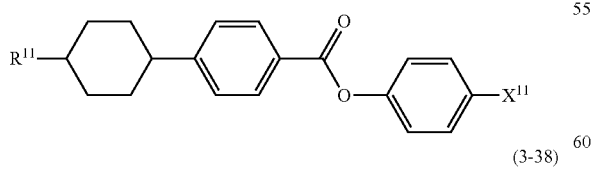
(3-38) 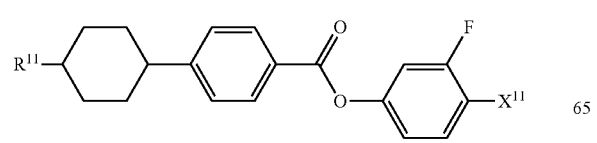
(3-39) 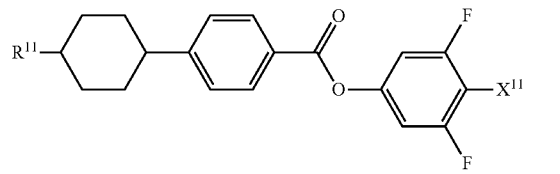
(3-40) 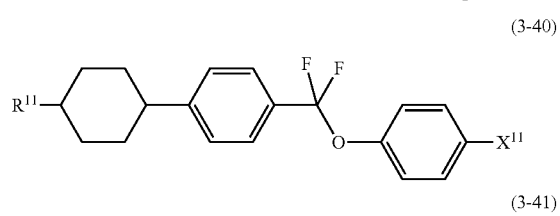
(3-41) 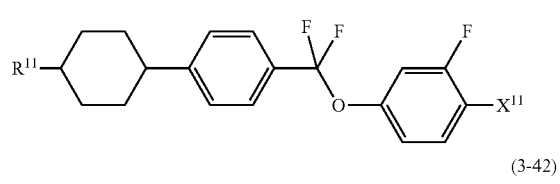
(3-42) 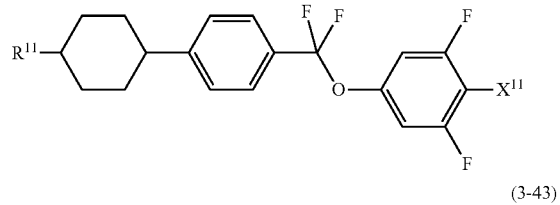
(3-43) 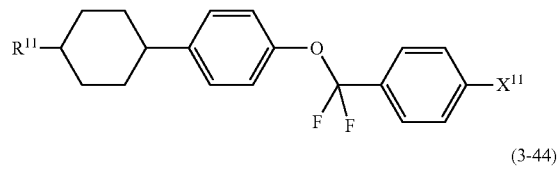
(3-44) 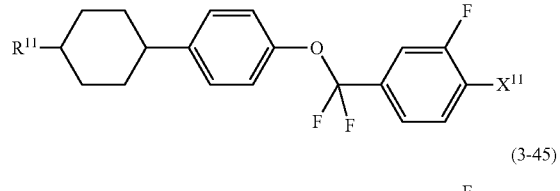
(3-45) 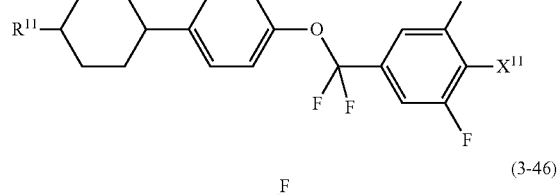
(3-46) 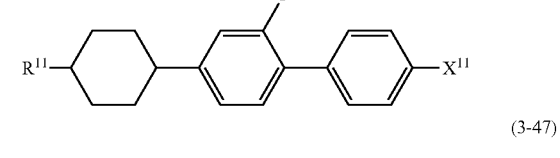
(3-47) 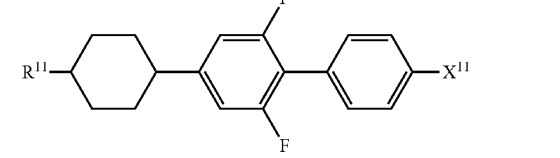

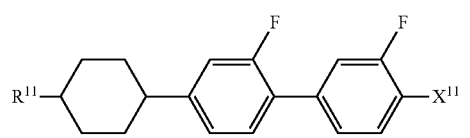 (3-48)
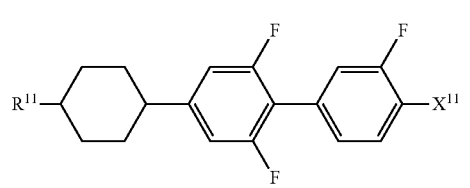 (3-49)
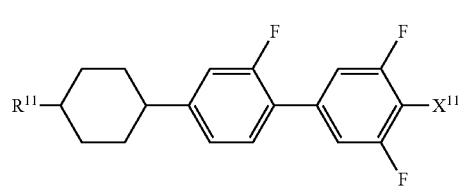 (3-50)
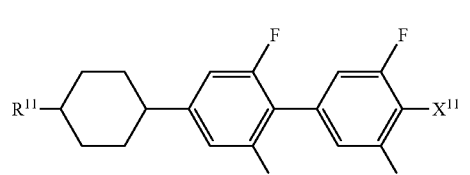 (3-51)
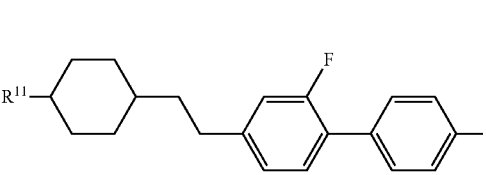 (3-52)
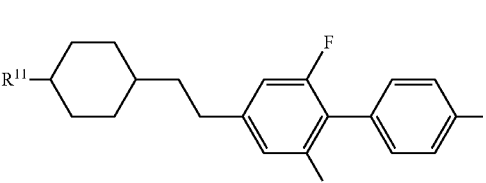 (3-53)
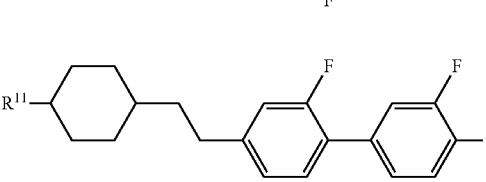 (3-54)
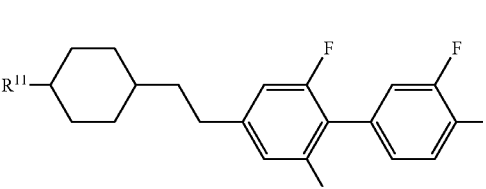 (3-55)
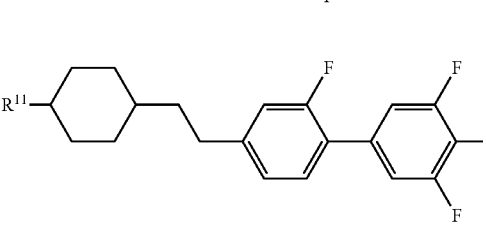 (3-56)
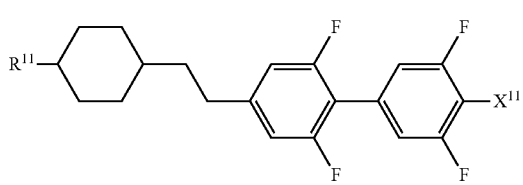 (3-57)
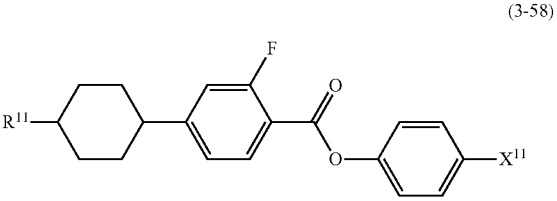 (3-58)
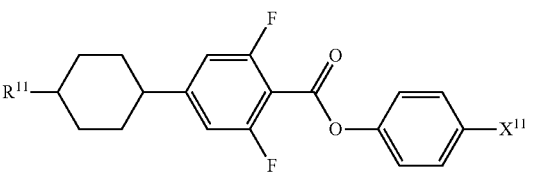 (3-59)
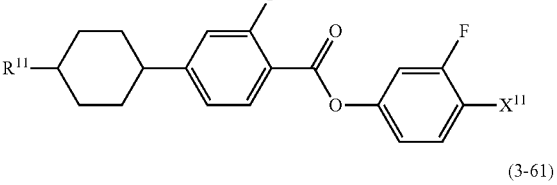 (3-60)
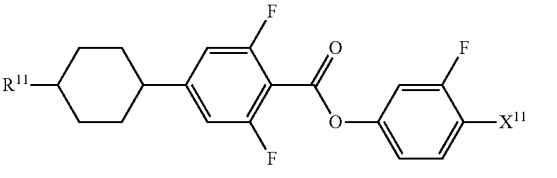 (3-61)
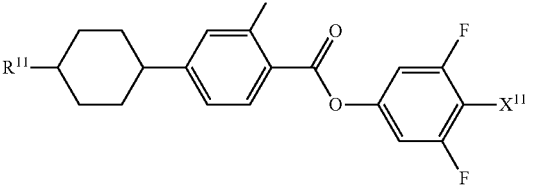 (3-62)
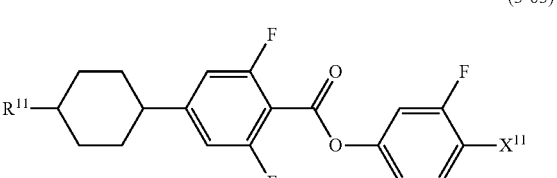 (3-63)
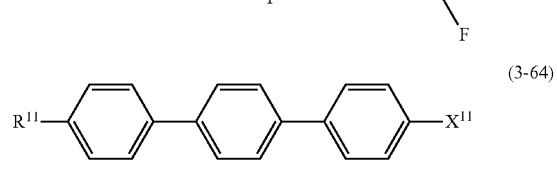 (3-64)

(3-65) 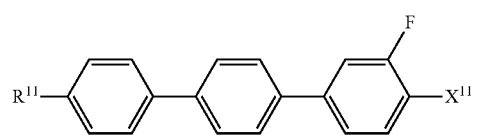
(3-66) 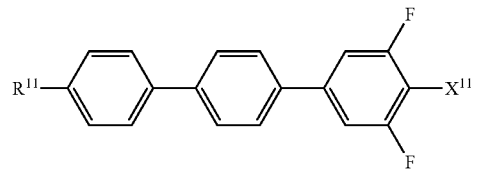
(3-67) 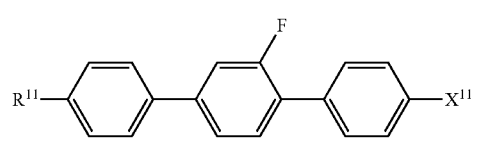
(3-68) 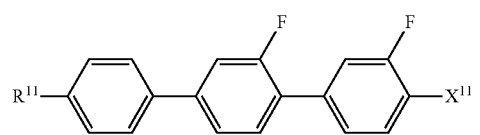
(3-69) 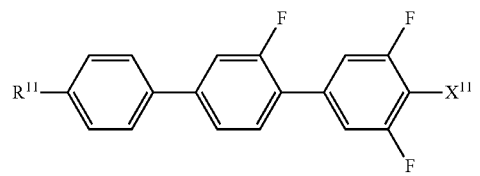
(3-70) 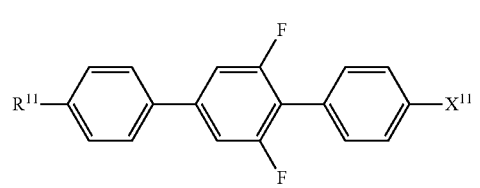
(3-71) 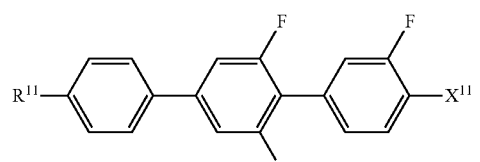
(3-72) 
(3-73) 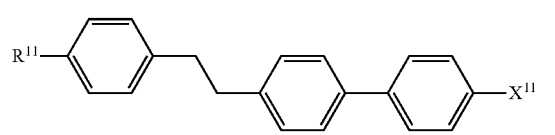
(3-74) 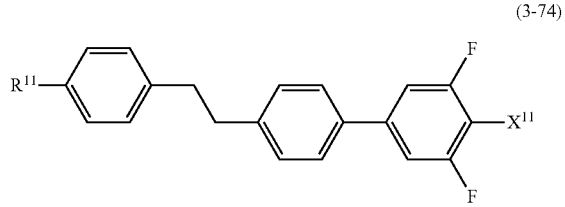
(3-75) 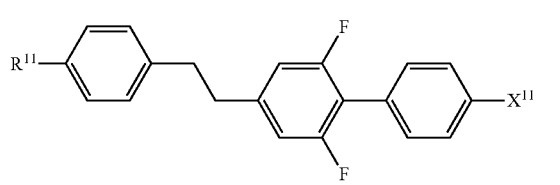
(3-76) 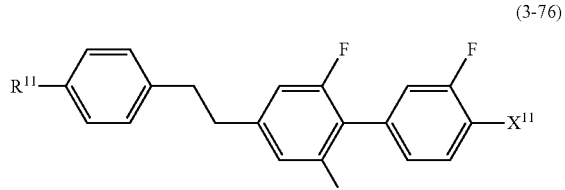
(3-77) 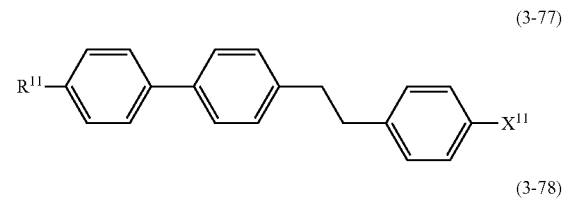
(3-78) 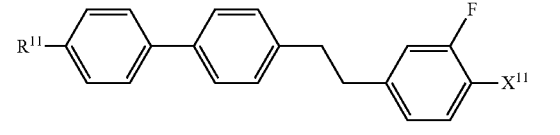
(3-79) 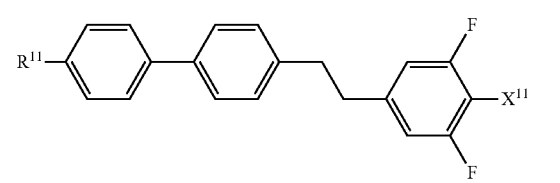
(3-80) 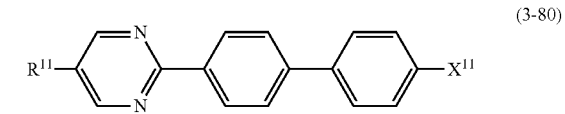
(3-81) 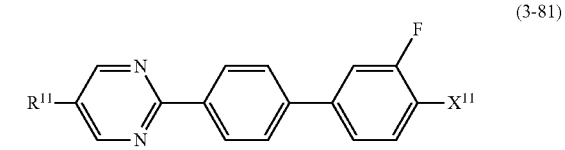
(3-82) 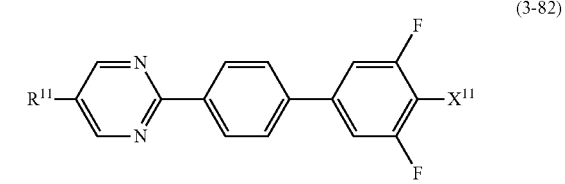

(3-83)
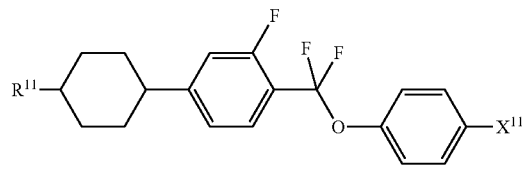
(3-84)
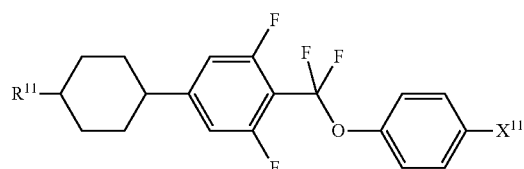
(3-85)
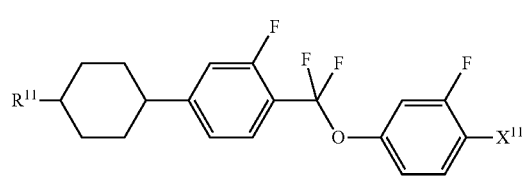
(3-86)
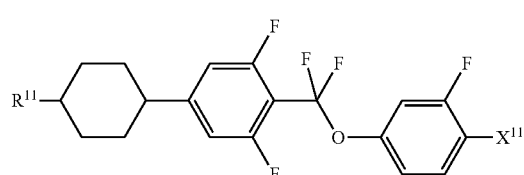
(3-87)
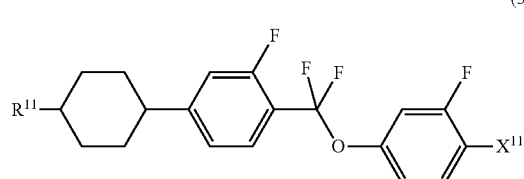
(3-88)
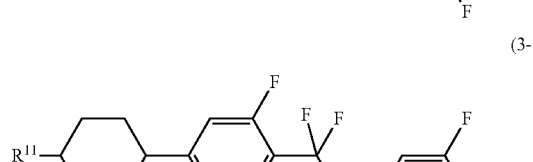
(3-89)
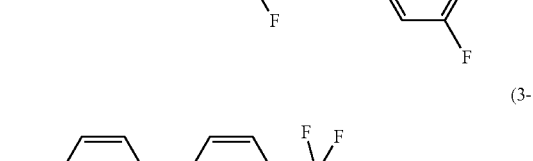
(3-90)
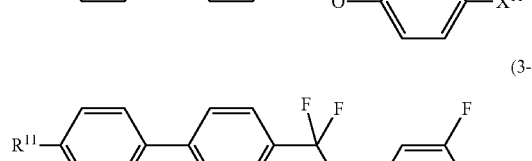
(3-91)
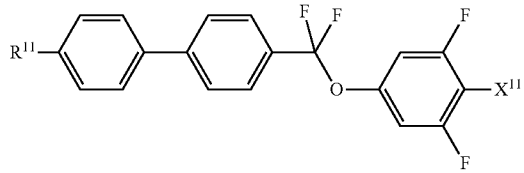
(3-92)
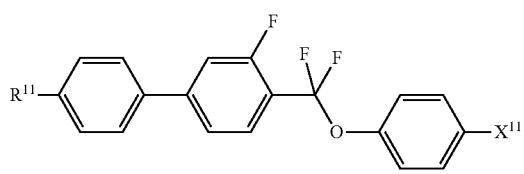
(3-93)
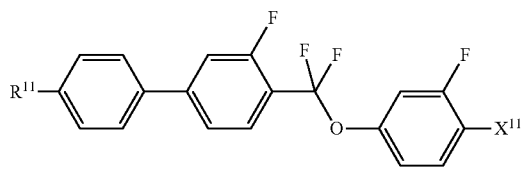
(3-94)
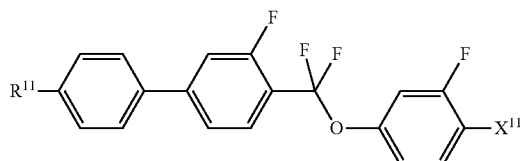
(3-95)
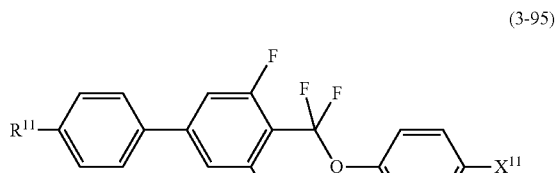
(3-96)
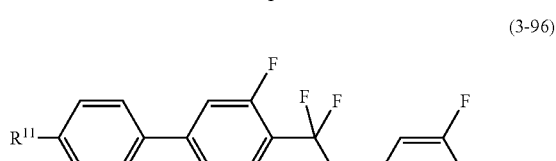
(3-97)
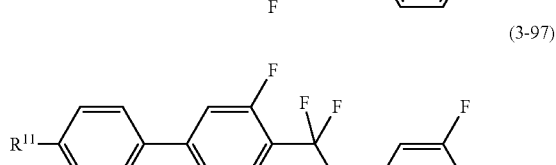
(3-98)
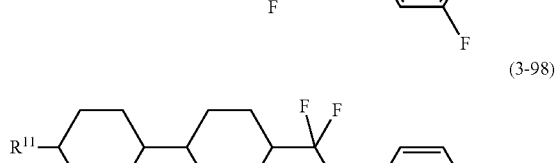

(3-99) 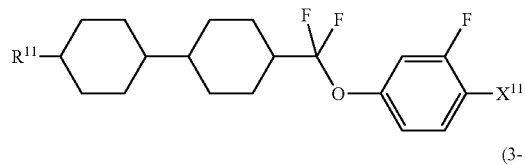
(3-100) 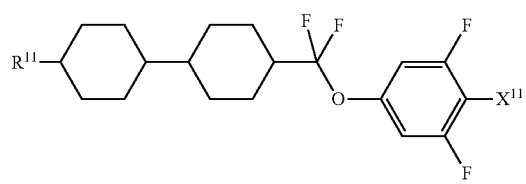
(3-101) 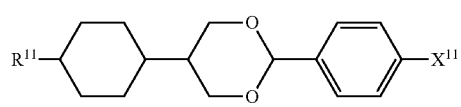
(3-102) 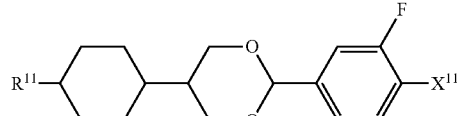
(3-103) 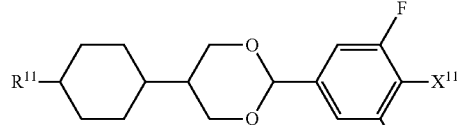
(3-104) 
(3-105) 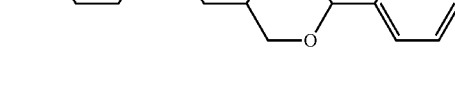
(3-106) 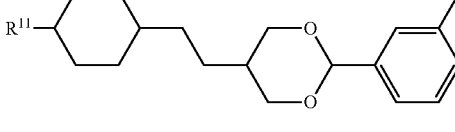
(3-107) 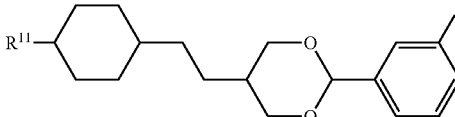
(3-108) 
(3-109) 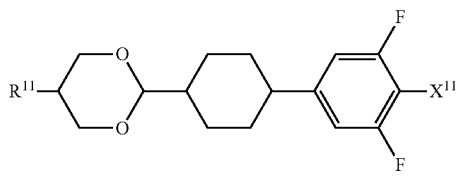
(3-110) 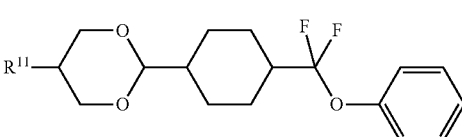
(3-111) 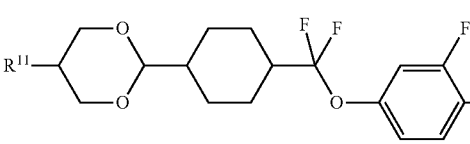
(3-112) 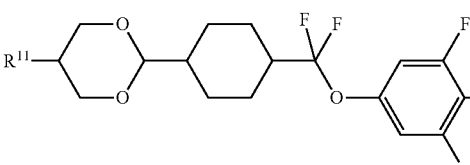
(3-113) 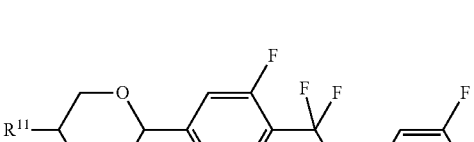
(4-1) 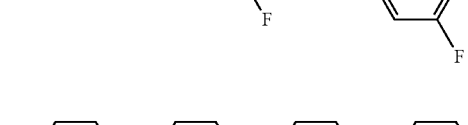
(4-2) 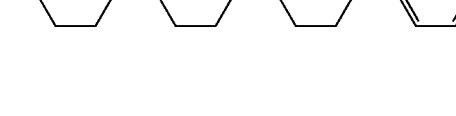
(4-3) 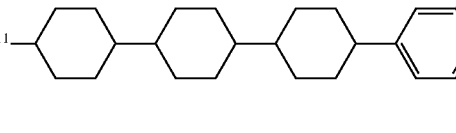
(4-4) 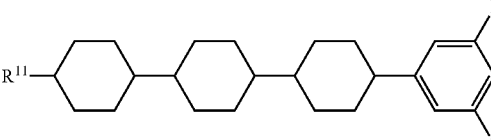
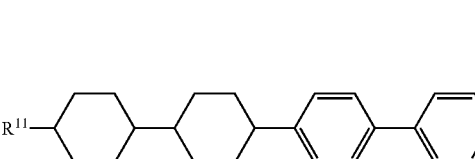

(4-5) 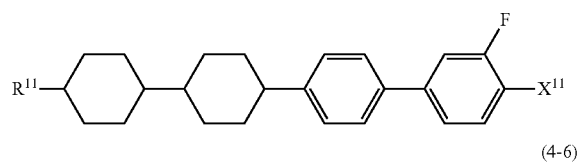
(4-6) 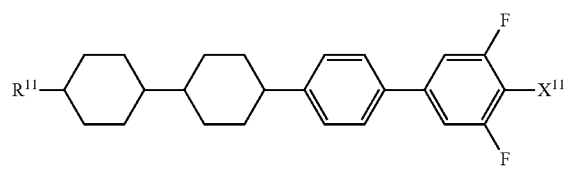
(4-7) 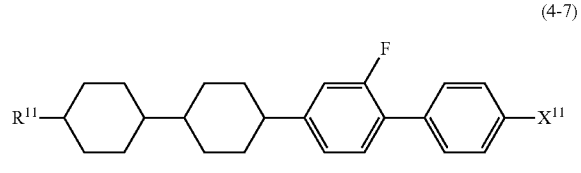
(4-8) 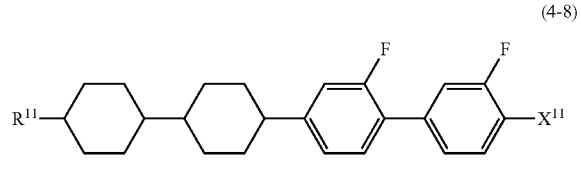
(4-9) 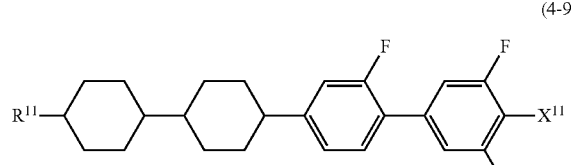
(4-10) 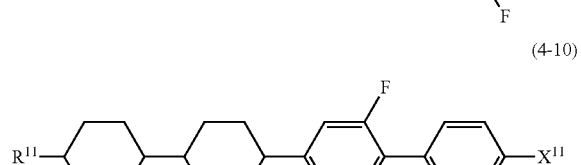
(4-11) 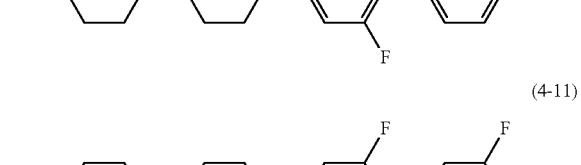
(4-12) 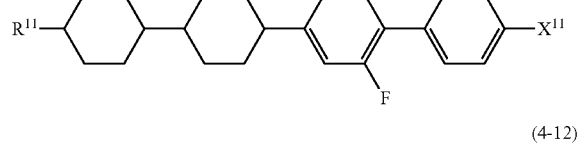
(4-13) 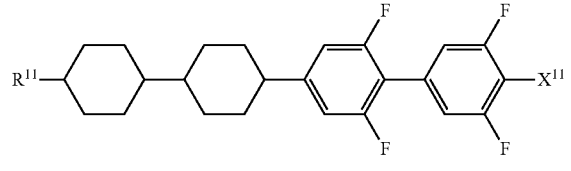
(4-14) 
(4-15) 
(4-16) 
(4-17) 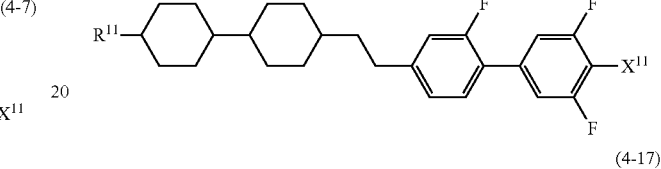
(4-18) 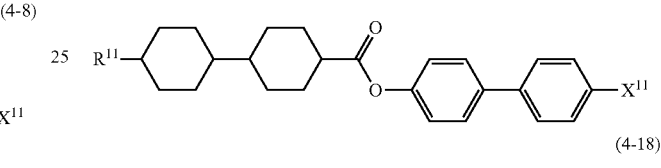
(4-19) 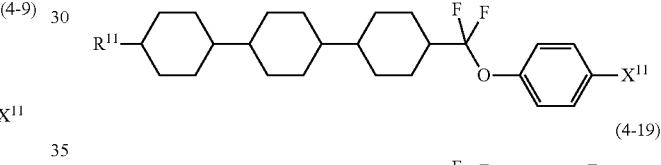
(4-20) 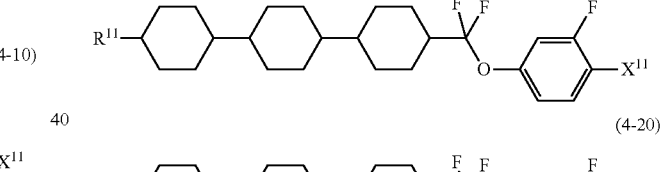
(4-21) 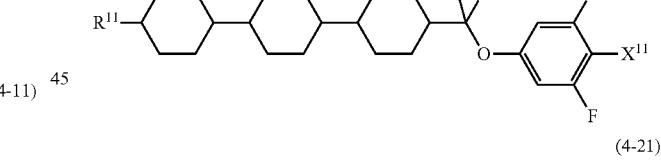
(4-22) 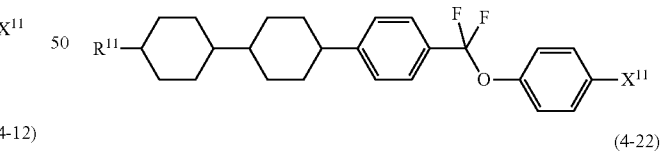
(4-23) 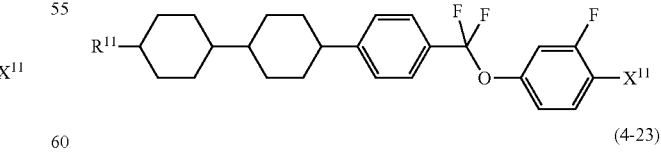

(4-24) 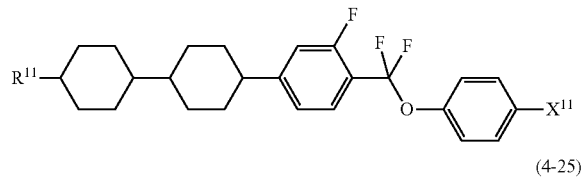
(4-25) 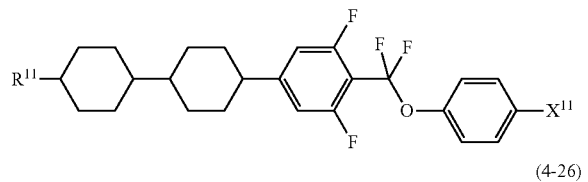
(4-26) 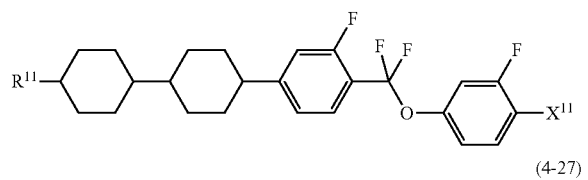
(4-27) 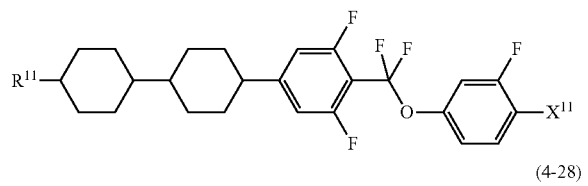
(4-28) 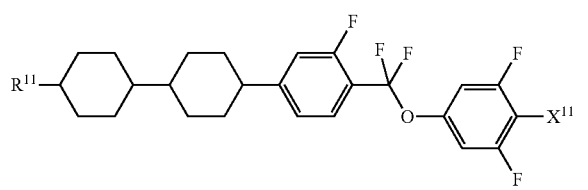
(4-29) 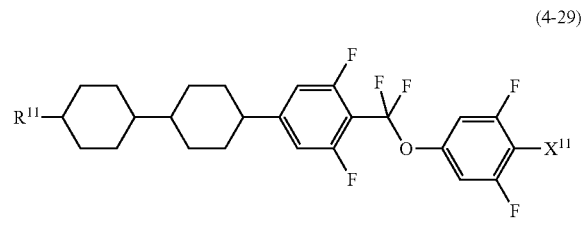
(4-30) 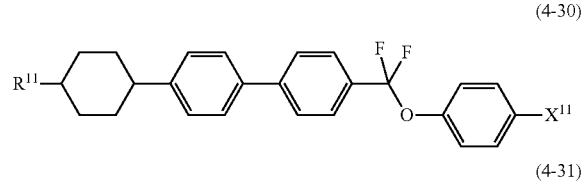
(4-31) 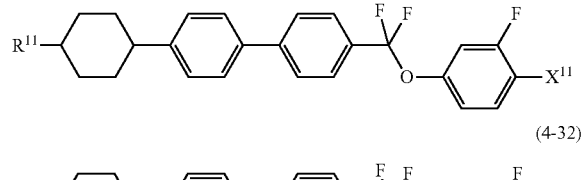
(4-32) 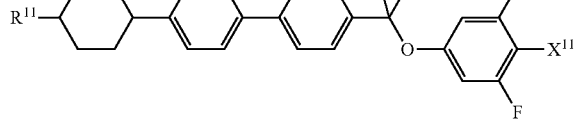
(4-33) 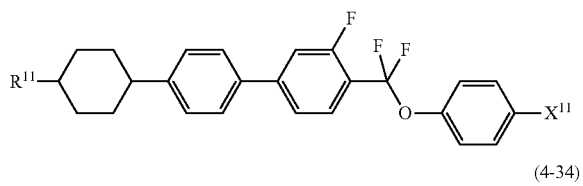
(4-34) 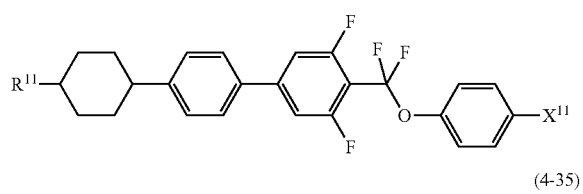
(4-35) 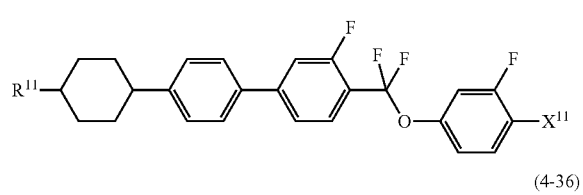
(4-36) 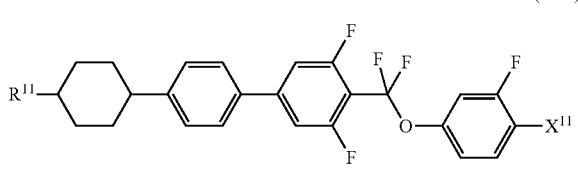
(4-37) 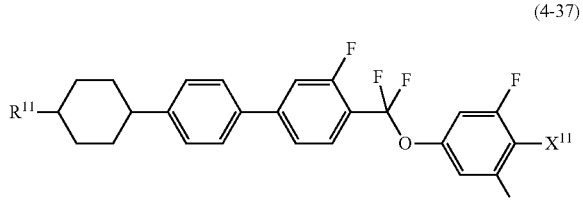
(4-38) 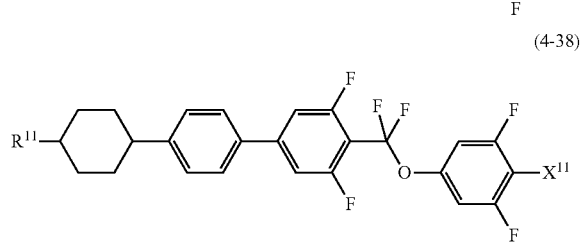
(4-39) 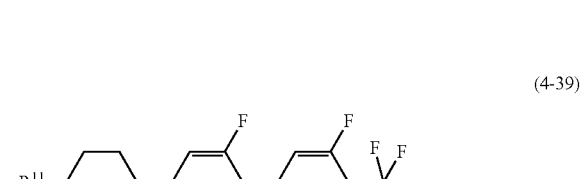
(4-40) 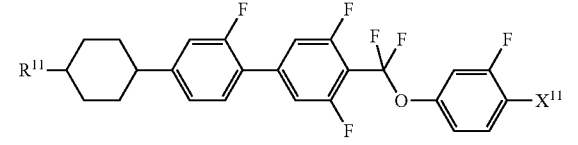

(4-41) 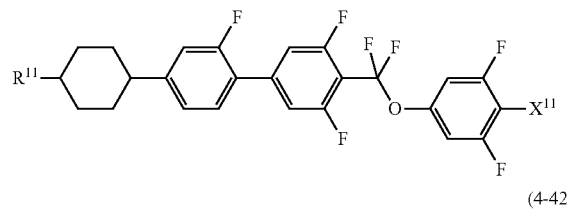
(4-42) 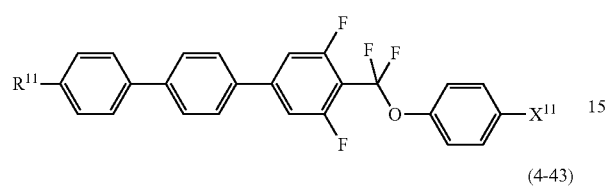
(4-43) 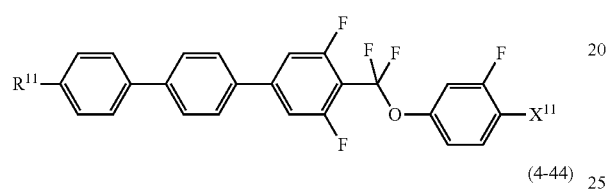
(4-44) 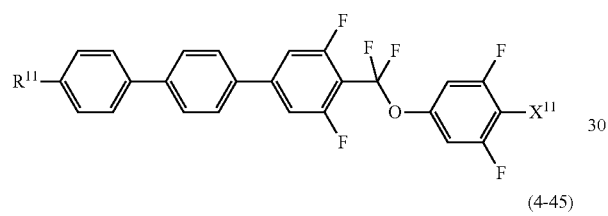
(4-45) 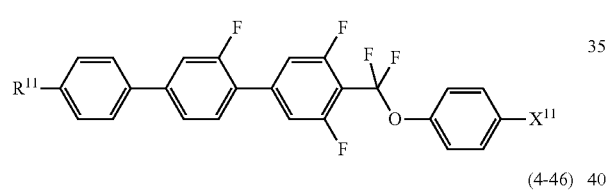
(4-46) 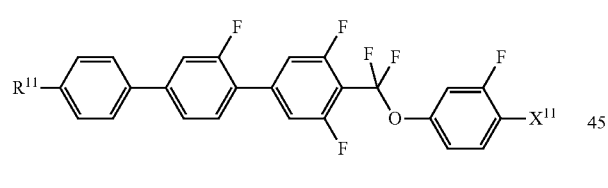
(4-47) 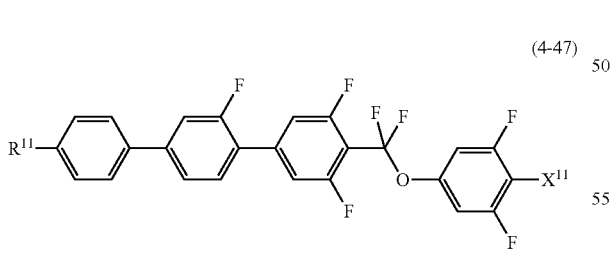
(4-48) 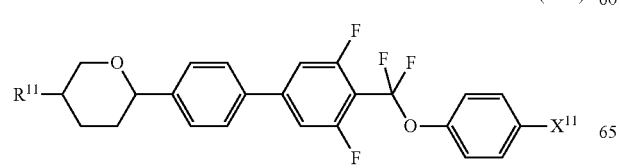
(4-49) 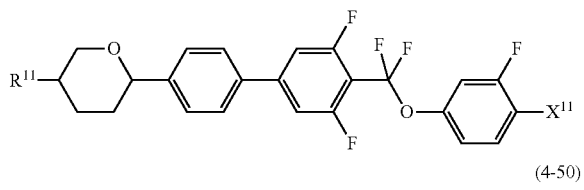
(4-50) 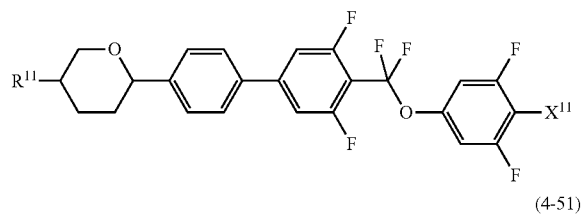
(4-51) 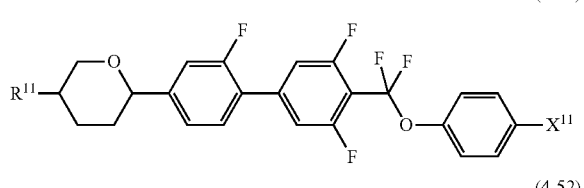
(4-52) 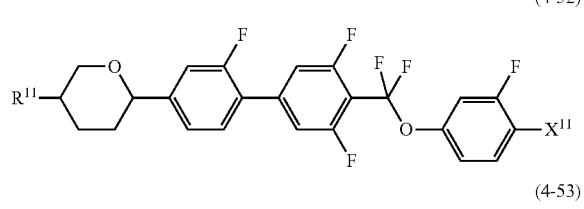
(4-53) 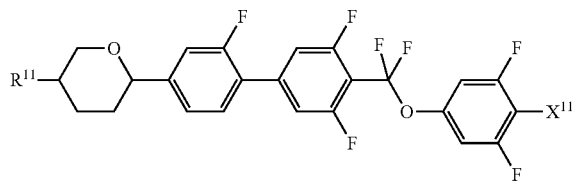
(4-54) 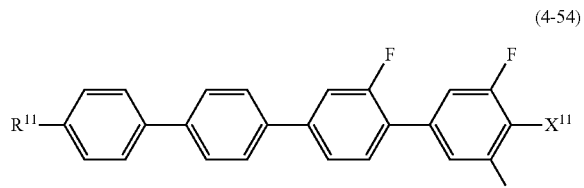
(4-55) 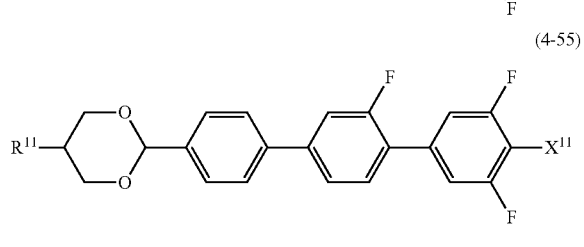
(4-56) 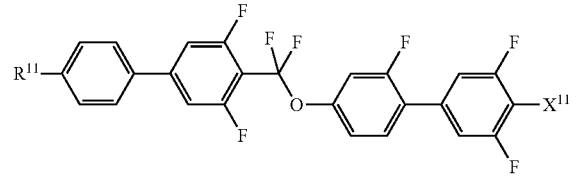

(4-57)

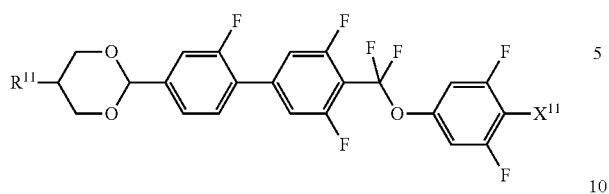

In the compounds (component B), $R^{11}$ and $X^{11}$ are defined in a manner identical with the definitions in the formulas (2) to (4).

Component B has a positive dielectric anisotropy and a superb stability to heat, light and so forth, and therefore is used for preparing a composition for the TFT mode or the PSA mode. The content of component B is suitably in the range of approximately 1 to approximately 99% by weight, preferably, in the range of approximately 10 to approximately 97% by weight, and further preferably, in the range of approximately 40 to approximately 95% by weight, based on the total weight of the composition. Viscosity of the composition can be adjusted by further adding compounds (12) to (14) (component E) thereto.

Component C includes compound (5) having —C≡N or —C≡C—C≡N as a right terminal group. Preferred examples of component C include compounds (5-1) to (5-64).

(5-1)
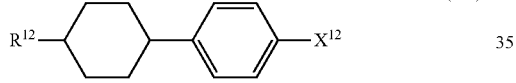

(5-2)
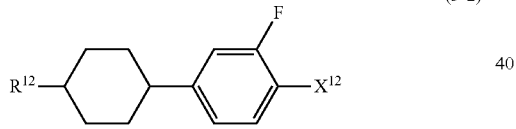

(5-3)
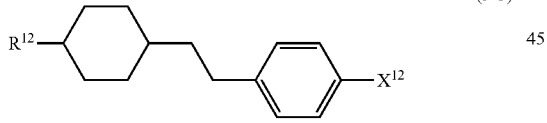

(5-4)
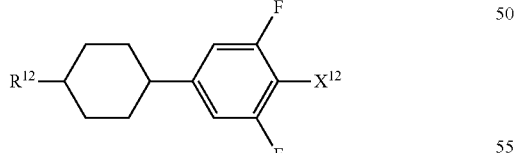

(5-5)
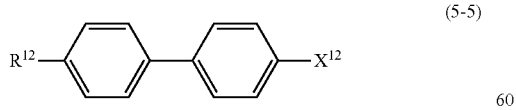

(5-6)
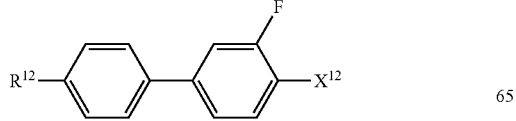

(5-7)
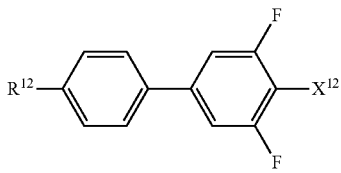

(5-8)
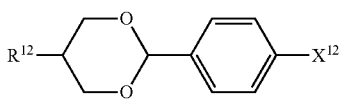

(5-9)
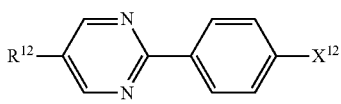

(5-10)
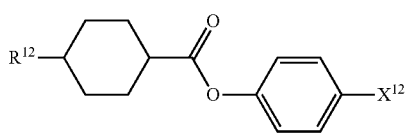

(5-11)
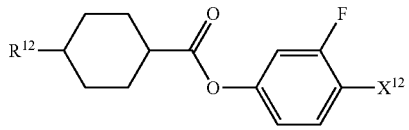

(5-12)
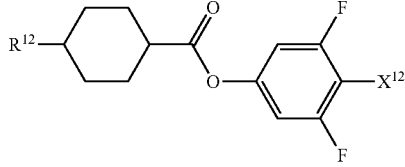

(5-13)
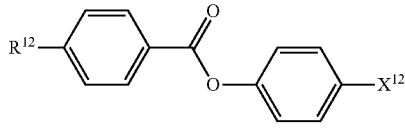

(5-14)
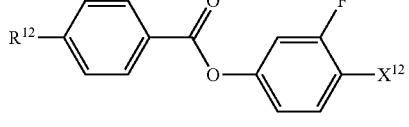

(5-15)
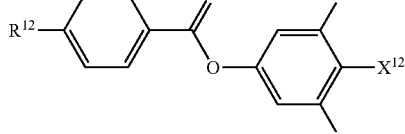

(5-16)
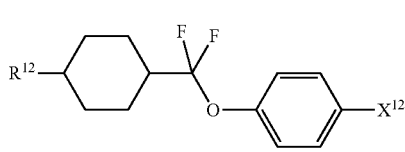

(5-17)
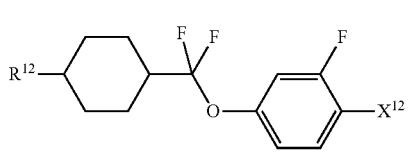

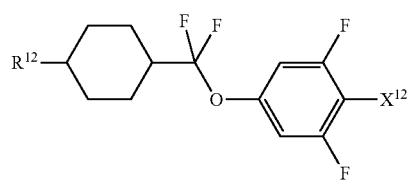 (5-18)
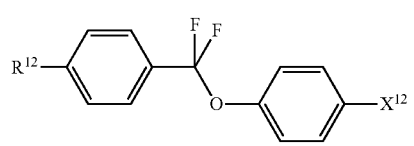 (5-19)
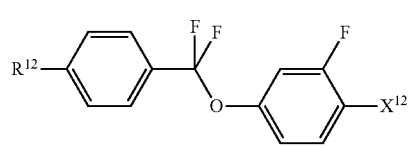 (5-20)
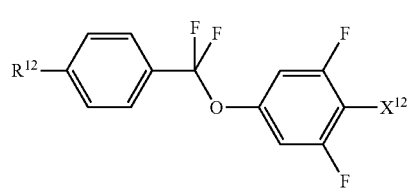 (5-21)
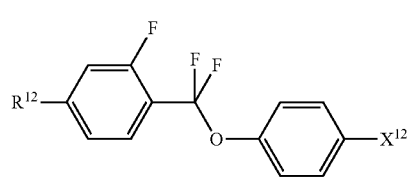 (5-22)
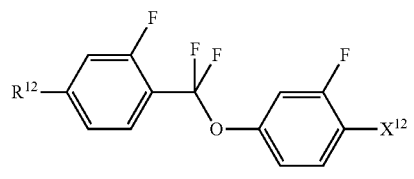 (5-23)
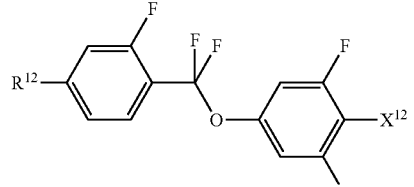 (5-24)
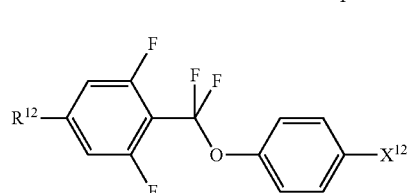 (5-25)
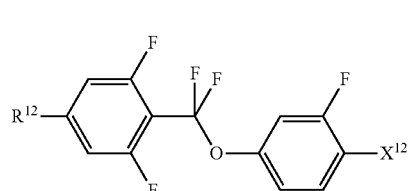 (5-26)
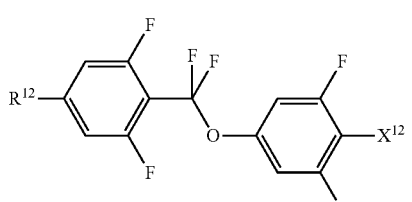 (5-27)
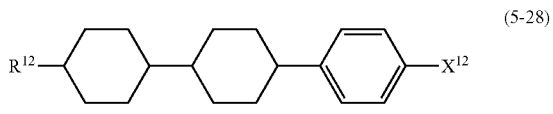 (5-28)
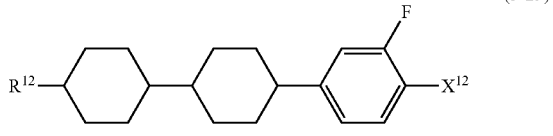 (5-29)
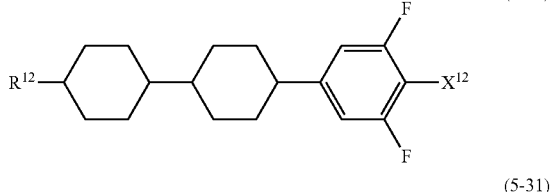 (5-30)
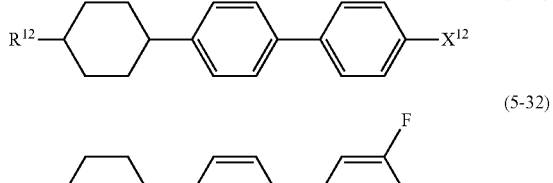 (5-31)
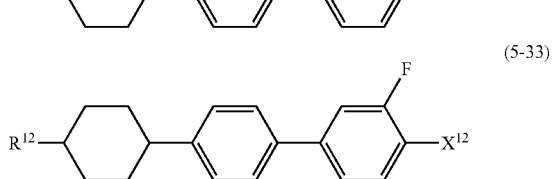 (5-32)
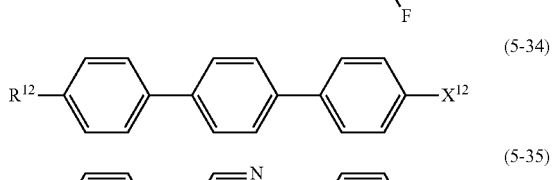 (5-33)
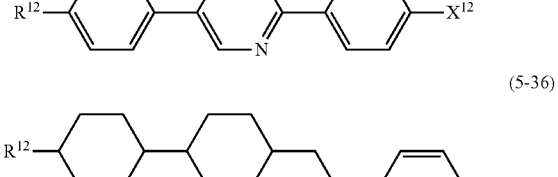 (5-34)
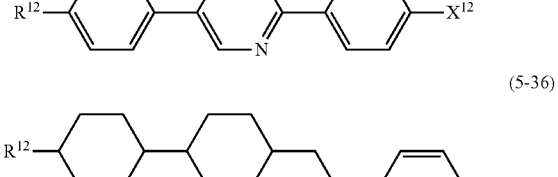 (5-35)
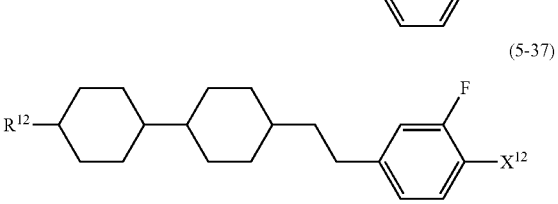 (5-36)
(5-37)

(5-38) 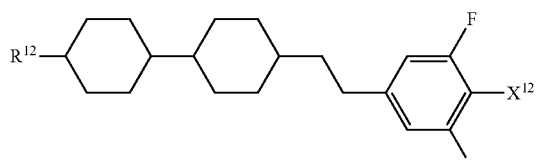
(5-39) 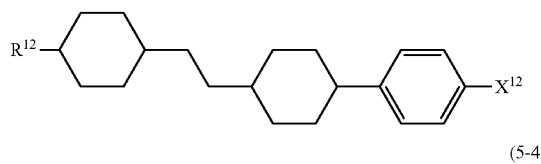
(5-40) 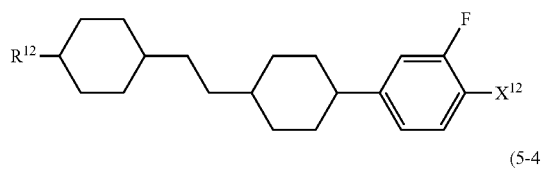
(5-41)
(5-42)
(5-43) 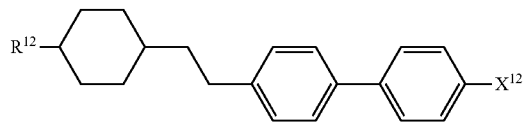
(5-44) 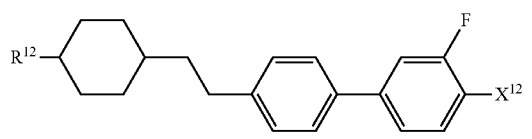
(5-45) 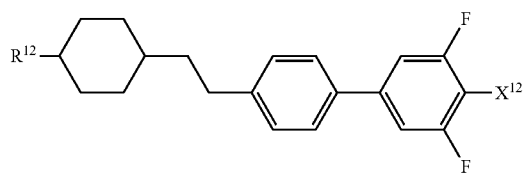
(5-46) 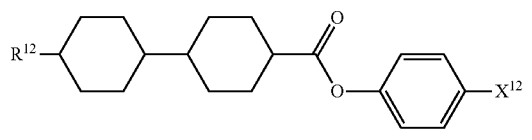
(5-47) 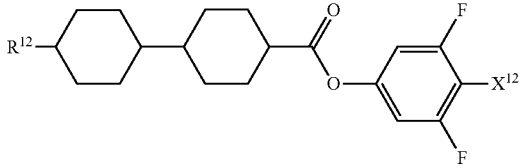
(5-48) 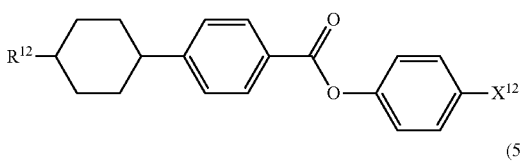
(5-49) 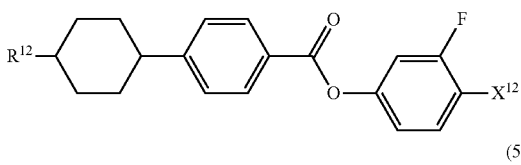
(5-50) 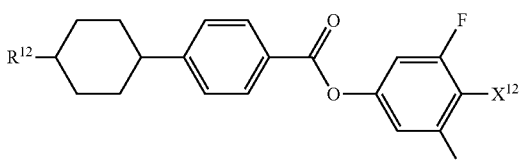
(5-51) 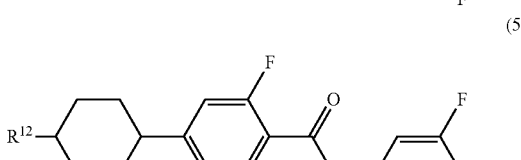
(5-52) 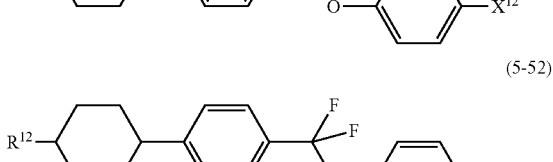
(5-53) 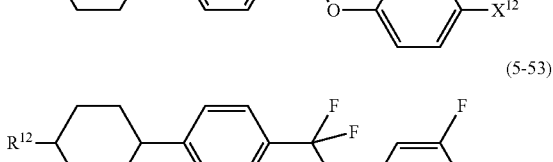
(5-54) 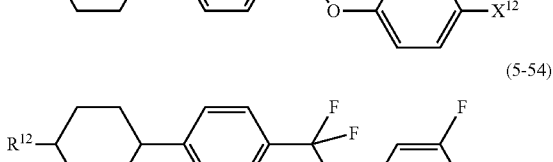
(5-55) 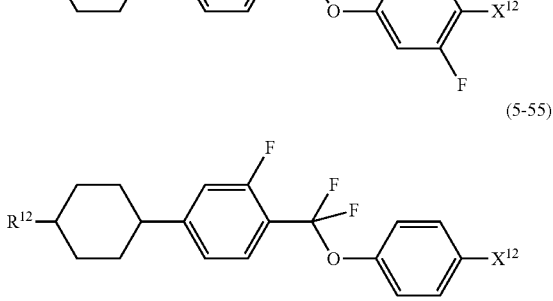

-continued (5-56)
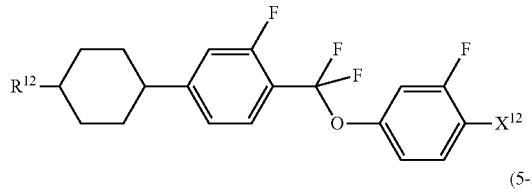

(5-57)
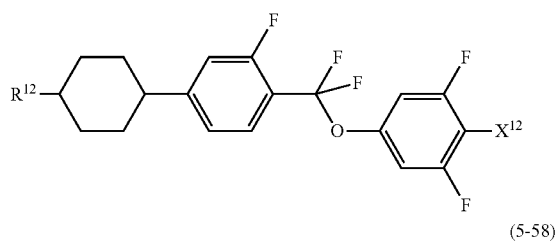

(5-58)
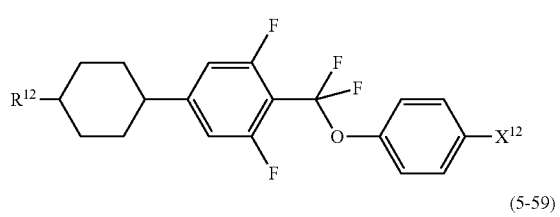

(5-59)
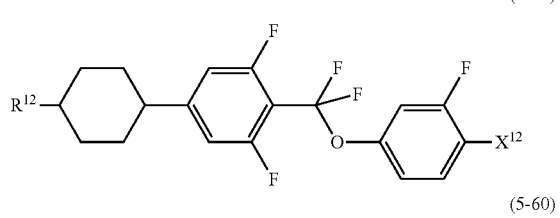

(5-60)
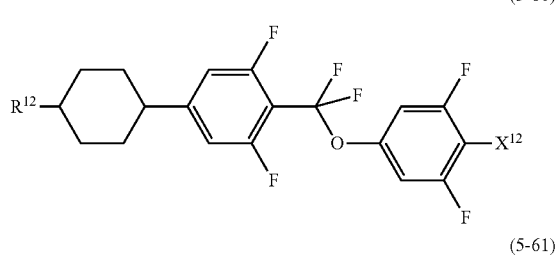

(5-61)
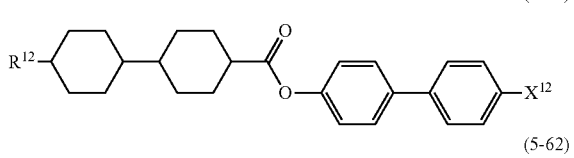

(5-62)
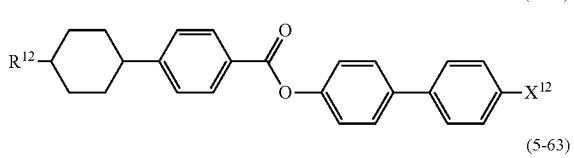

(5-63)
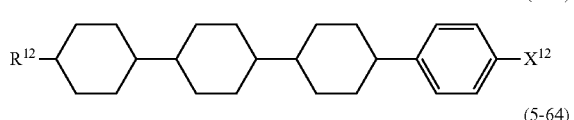

(5-64)
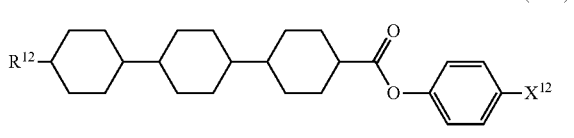

In the compounds (component C), $R^{12}$ and $X^{12}$ are defined in a manner identical with the definitions in the formula (5).

Component C has a large value of positive dielectric anisotropy, and therefore is mainly used for preparing a composition for the STN mode, the TN mode or the PSA mode. Dielectric anisotropy of the composition can be increased by adding the component C thereto. Component C is effective in extending a temperature range of the liquid crystal phase, adjusting viscosity or adjusting optical anisotropy. Component C is useful also for adjustment of a voltage-transmittance curve of the device.

When a composition for the STN mode or the TN mode is prepared, the content of component C is preferably in the range of approximately 1 to approximately 99% by weight, preferably, in the range of approximately 10 to approximately 97% by weight, and further preferably, in the range of approximately 40 to approximately 95% by weight, based on the total weight of the composition. A temperature range of the liquid crystal phase, viscosity, optical anisotropy, dielectric anisotropy or the like of the composition can be adjusted by adding component E thereto.

Component D includes compounds (6) to (12). The compounds have a benzene ring in which lateral positions are substituted by two halogen atoms, such as 2,3-difluoro-1,4-phenylene. Preferred examples of component D include compounds (6-1) to (6-8), compounds (7-1) to (7-17), compound (8-1), compounds (9-1) to (9-3), compounds (10-1) to (10-11), compounds (11-1) to (11-3) and compounds (12-1) to (12-3).

(6-1)
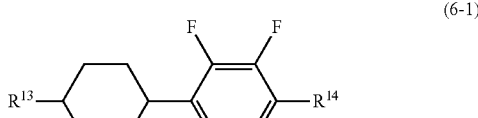

(6-2)
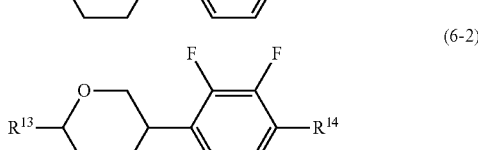

(6-3)
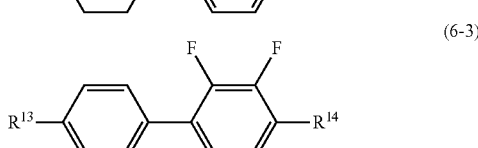

(6-4)
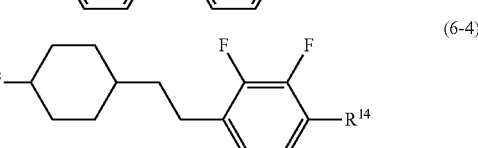

(6-5)
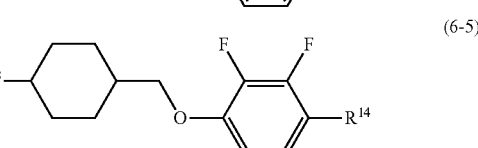

(6-6)
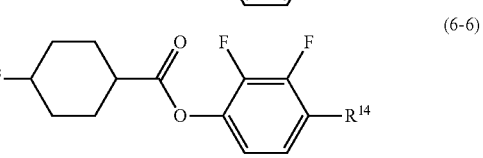

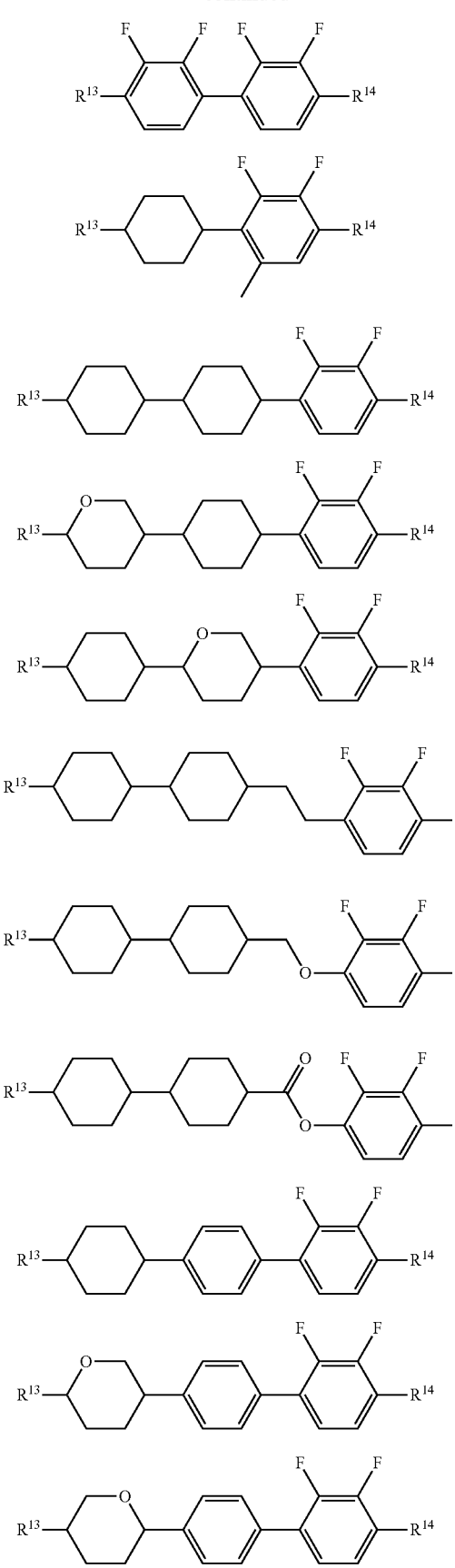
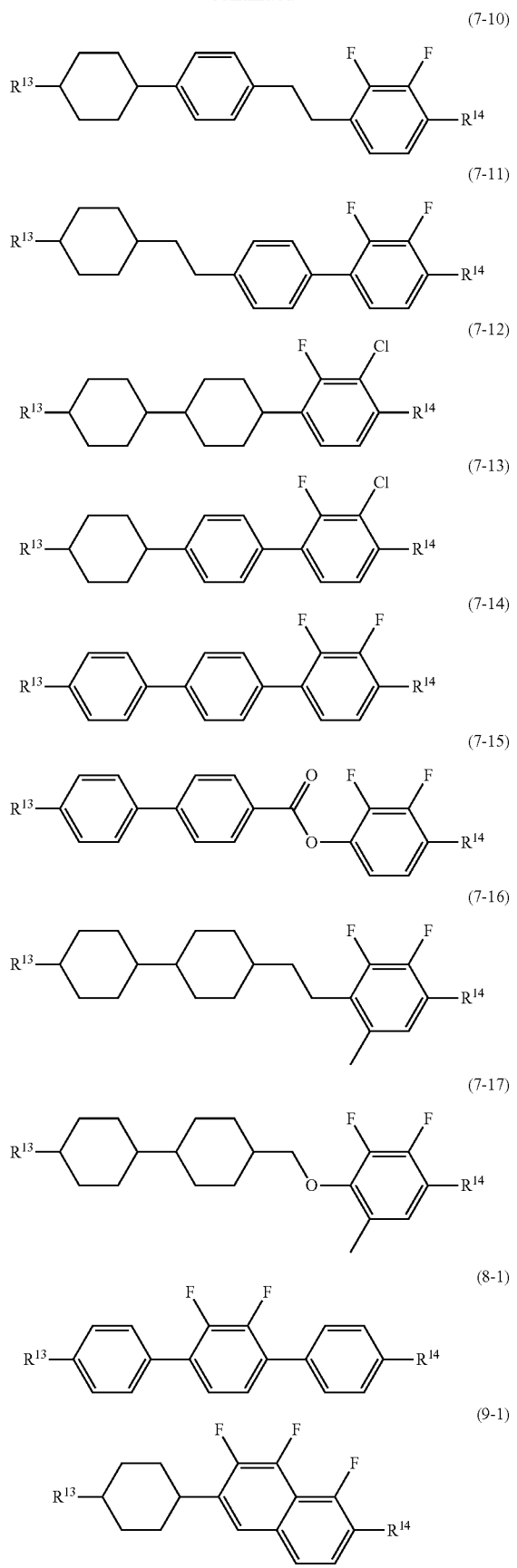

(9-2)
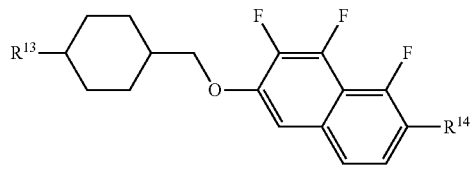
(9-3)
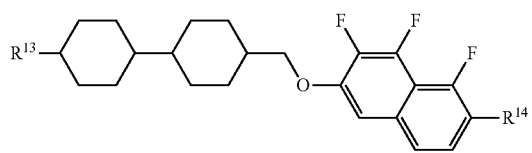
(10-1)
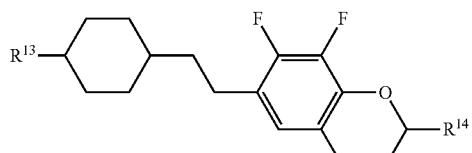
(10-2)
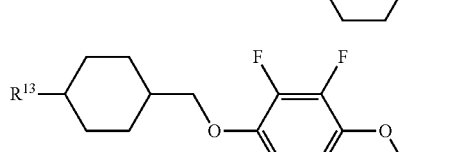
(10-3)
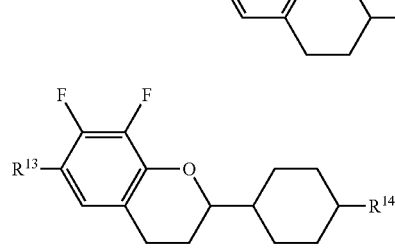
(10-4)
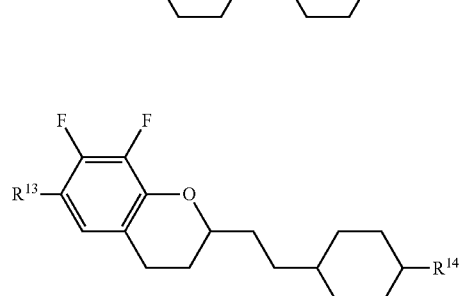
(10-5)
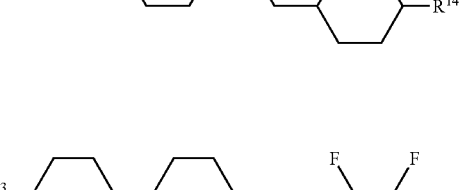
(10-6)
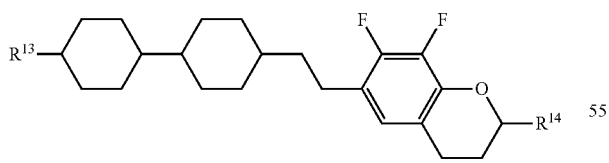
(10-7)
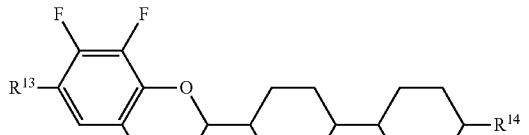
(10-8)
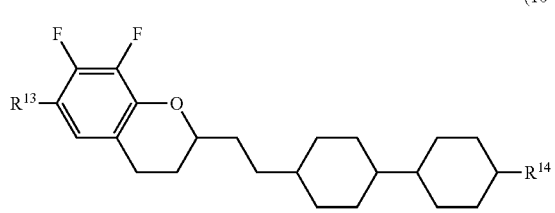
(10-9)
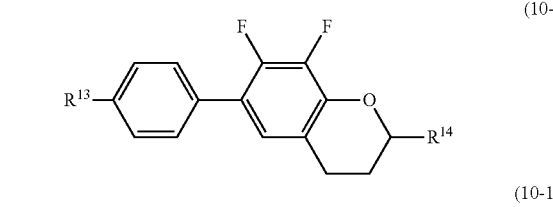
(10-10)
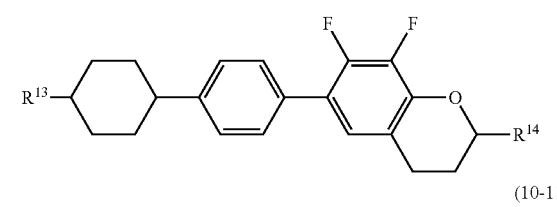
(10-11)
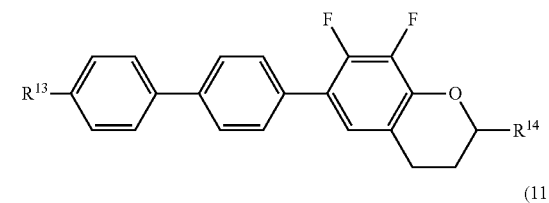
(11-1)
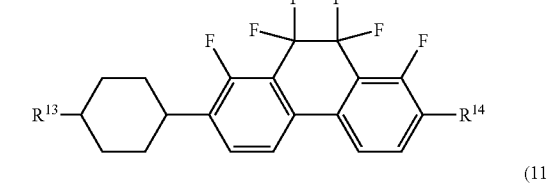
(11-2)
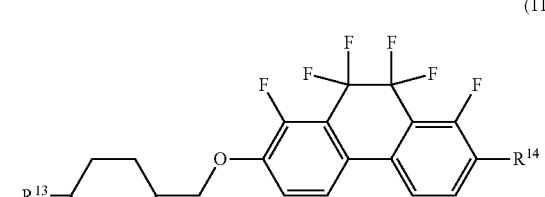
(11-3)
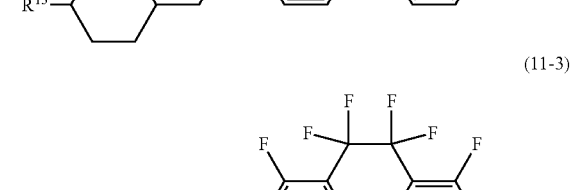

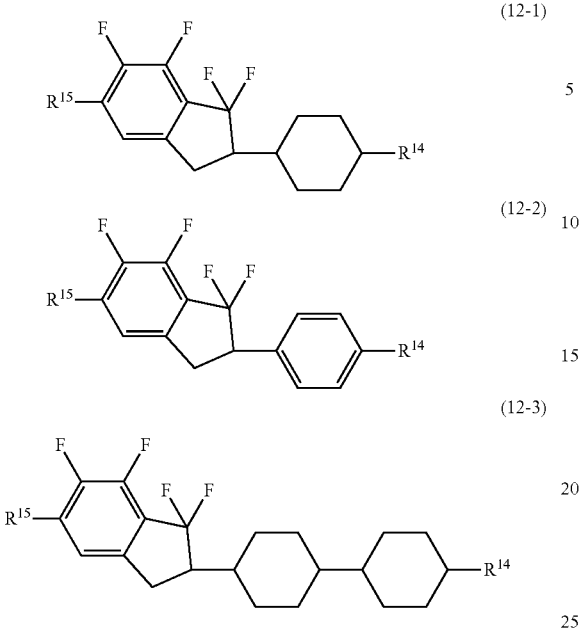

In the compounds (component D), $R^{13}$, $R^{14}$ and $R^{15}$ are defined in a manner identical with the definitions in the formulas (6) to (12).

Component D includes a compound having a negative dielectric anisotropy. Component D is mainly used for preparing a composition for the VA mode or the PSA mode. Among types of component D, compound (6) is a bicyclic compound, and therefore is effective mainly in adjusting viscosity, adjusting optical anisotropy or adjusting dielectric anisotropy. Compounds (7) and (8) are a tricyclic compound, and therefore effective in increasing a maximum temperature, optical anisotropy or dielectric anisotropy. Compounds (9) to (12) are effective in increasing dielectric anisotropy.

When a composition for the VA mode or the PSA mode is prepared, the content of component D is preferably approximately 40% by weight or more, and further preferably, in the range of approximately 50 to approximately 95% by weight, based on the total weight of the composition. When component D is added to a composition having a positive dielectric anisotropy, the content of component D is preferably approximately 30% or less based on the total weight of the composition. When component D is added, an elastic constant of the composition and a voltage-transmittance curve of the device can be adjusted.

Component E includes a compound in which two terminal groups are alkyl or the like. Preferred examples of component E include compounds (13-1) to (13-11), compounds (14-1) to (14-19) and compounds (15-1) to (15-7).

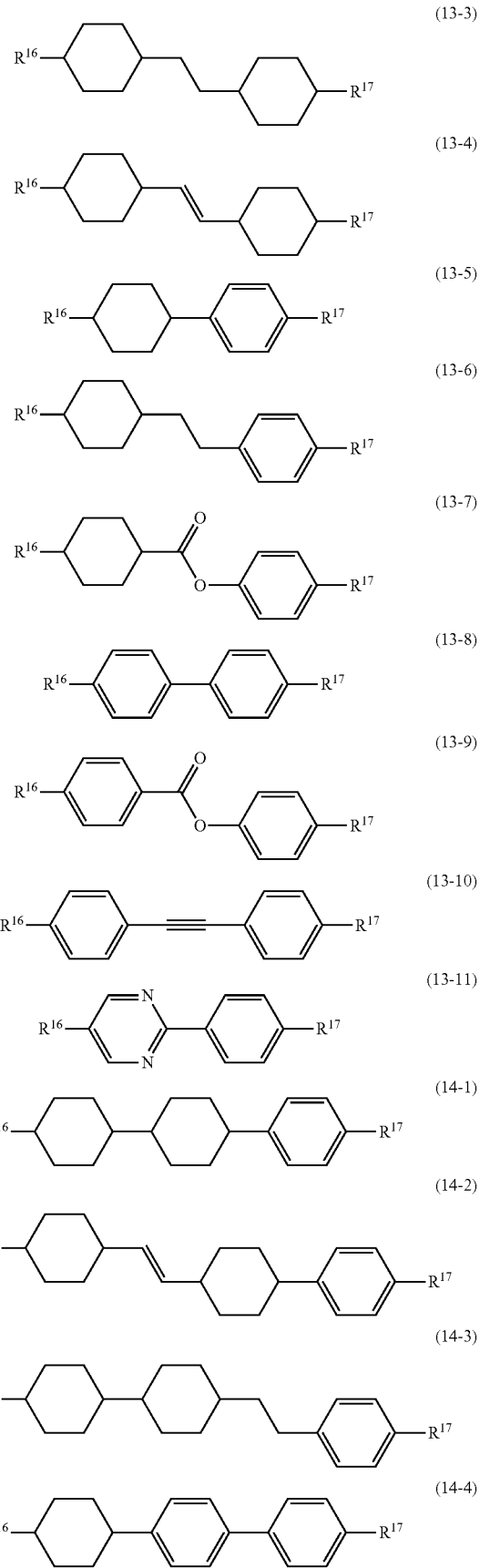

(14-5) 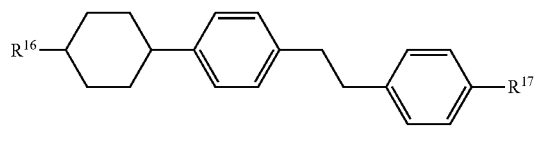
(14-6) 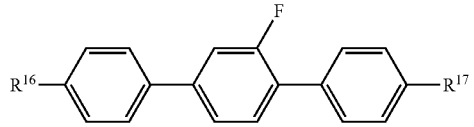
(14-7) 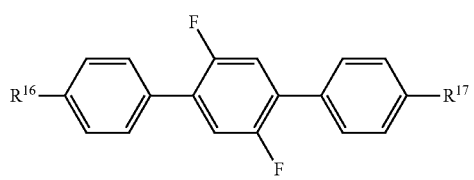
(14-8) 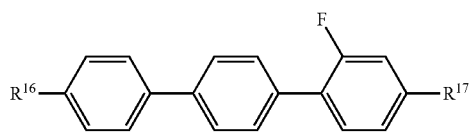
(14-9) 
(14-10) 
(14-11) 
(14-12) 
(14-13) 
(14-14) 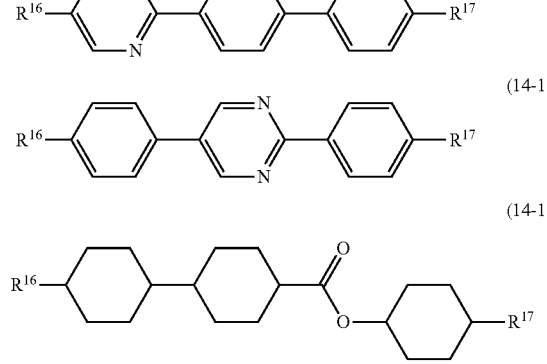
(14-15) 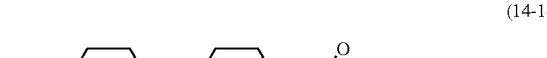
(14-16) 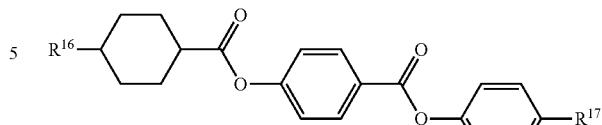
(14-17) 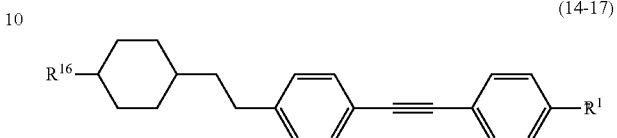
(14-18) 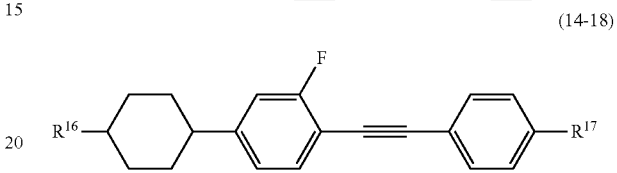
(14-19) 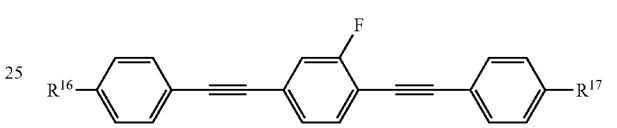
(15-1) 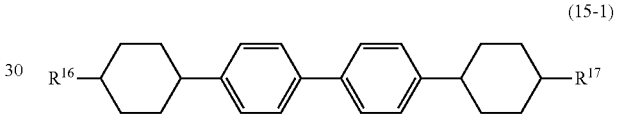
(15-2) 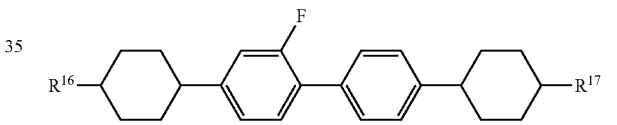
(15-3) 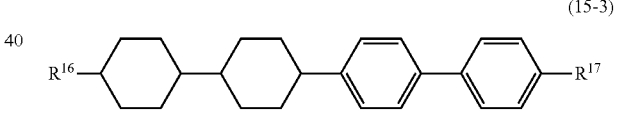
(15-4) 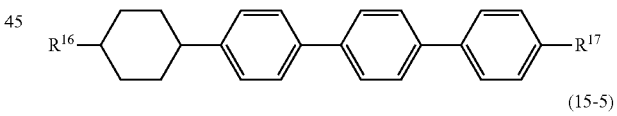
(15-5) 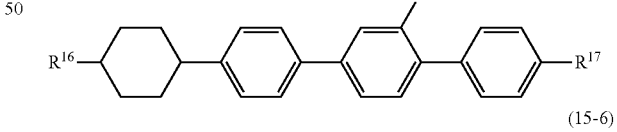
(15-6) 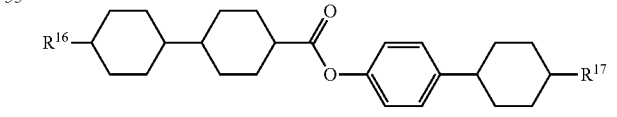
(15-7) 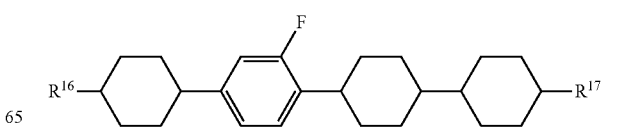

In the compounds (component E), $R^{16}$ and $R^{17}$ are defined in a manner identical with the definitions in the formulas (13) to (15).

Component E has a small absolute value of dielectric anisotropy, and therefore is a compound close to neutrality. Compound (13) is effective mainly in adjusting viscosity or optical anisotropy. Compound (14) and (15) are effective in extending a temperature range of the nematic phase by increasing a maximum temperature, or adjusting optical anisotropy.

When the content of component E is increased, viscosity of a composition decreases, but dielectric anisotropy also decreases. Thus, as long as a desired value of threshold voltage of the device is met, the content is preferably as large as possible. Therefore, when a composition for the VA mode or the PSA mode is prepared, the content of component E is preferably approximately 30% by weight or more, and further preferably, approximately 40% by weight or more, based on the total weight of the composition.

Composition (1) is prepared by a method for dissolving necessary components at a high temperature, or the like. According to an application, an additive may be added to the composition. Examples of the additive include an optically active compound, a polymerizable compound, a polymerization initiator, an antioxidant, an ultraviolet light absorber, a light stabilizer, a heat stabilizer and a defoaming agent. Such additives are well known to those skilled in the art, and are described in literatures.

Composition (1) may further contain at least one optically active compound. A publicly known chiral dopant can be added as the optically active compound. The chiral dopant is effective in inducing a helical structure in liquid crystal molecules to give a necessary twist angle, thereby preventing a reverse twist. Preferred examples of the chiral dopant include compounds (Op-1) to (Op-13) below. In compound (Op-18), ring J is 1,4-cyclohexylene or 1,4-phenylene, and $R^{24}$ is alkyl having 1 to 10 carbons.

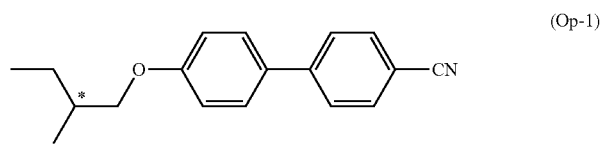

(Op-1)

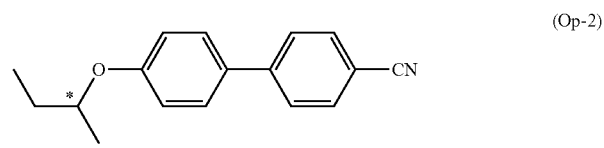

(Op-2)

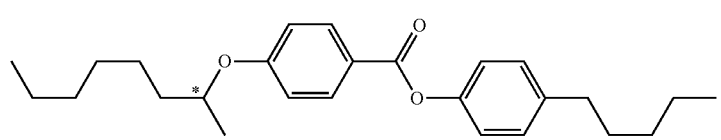

(Op-3)

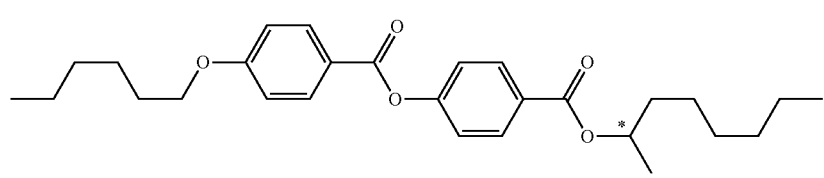

(Op-4)

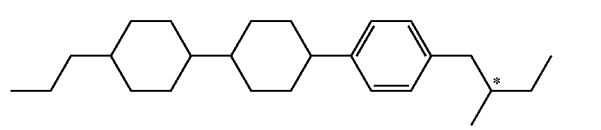

(Op-5)

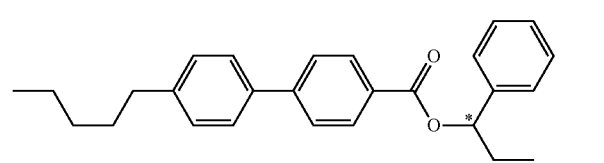

(Op-6)

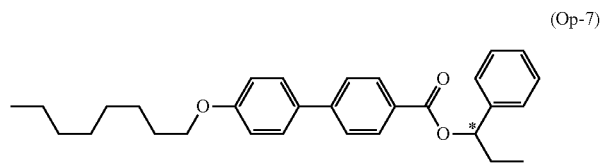

(Op-7)

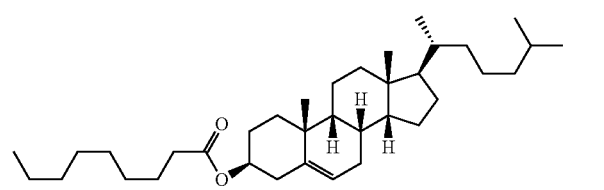

(Op-8)

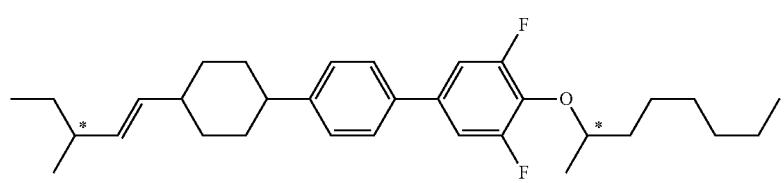

(Op-9)

-continued
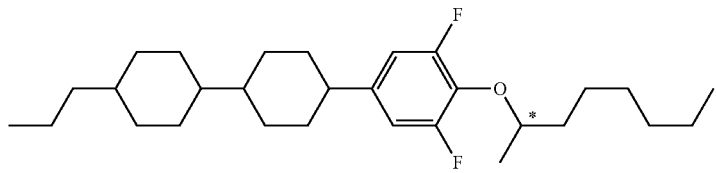
(Op-10)
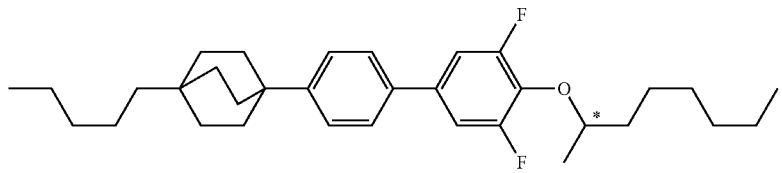
(Op-11)
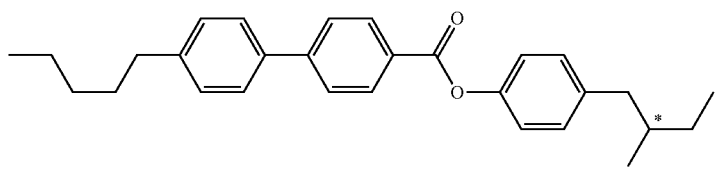
(Op-12)
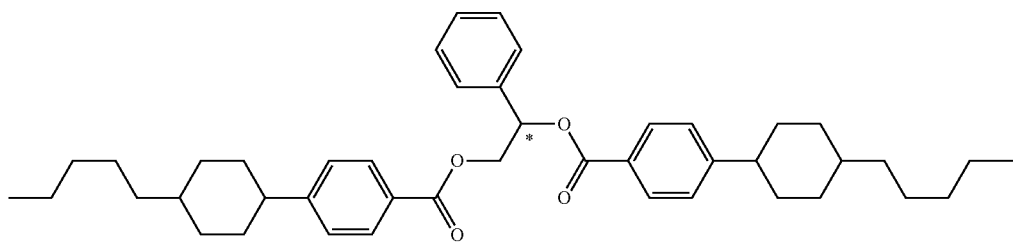
(Op-13)
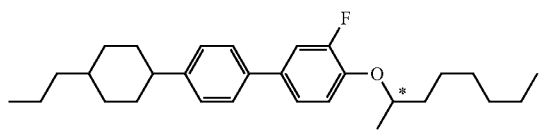
(Op-14)
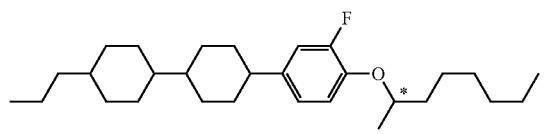
(Op-15)
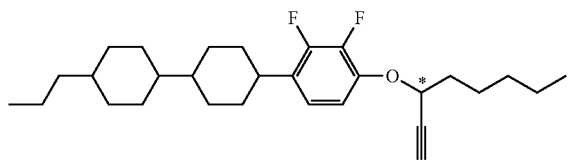
(Op-16)
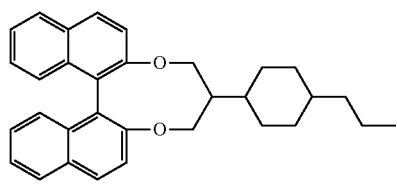
(Op-17)
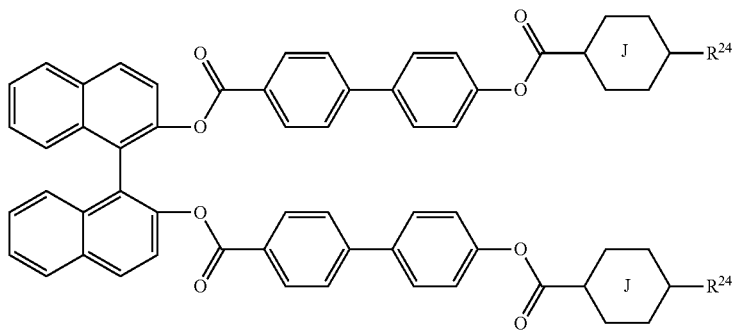
(Op-18)

In composition (1), a helical pitch is adjusted by addition of such an optically active compound. The helical pitch is preferably adjusted to the range of approximately 40 to approximately 200 micrometers in a composition for the TFT mode and the TN mode. The helical pitch is preferably adjusted to the range of approximately 6 to approximately 20 micrometers in a composition for the STN mode. In the case of a composition for the BTN mode, the helical pitch is preferably adjusted to the range of approximately 1.5 to approximately 4 micrometers. Two or more optically active compounds may be added for the purpose of adjusting temperature dependence of the helical pitch.

Composition (1) can also be used for the PSA mode by adding a polymerizable compound. Examples of the polymerizable compound include acrylate, methacrylate, a vinyl compound, a vinyloxy compound, propenyl ether, an epoxy compound (oxirane, oxetane) and vinyl ketone. Preferred examples include compounds (M-1) to (M-12) below. The polymerizable compound polymerizes by irradiation with ultraviolet light or the like. The compound may be polymerized in the presence of a suitable initiator such as a photopolymerization initiator. Suitable conditions for polymerization, suitable types of the initiator and suitable amounts thereof are known to those skilled in the art and are described in literatures.

In compounds (M-1) to (M-12), $R^{20}$ is hydrogen or methyl; s is 0 or 1; and t and u are independently an integer from 1 to 10. A parenthesized symbol F stands for hydrogen or fluorine.

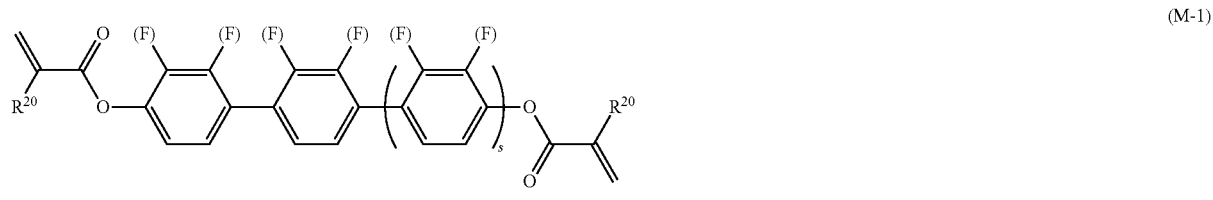

(M-1)

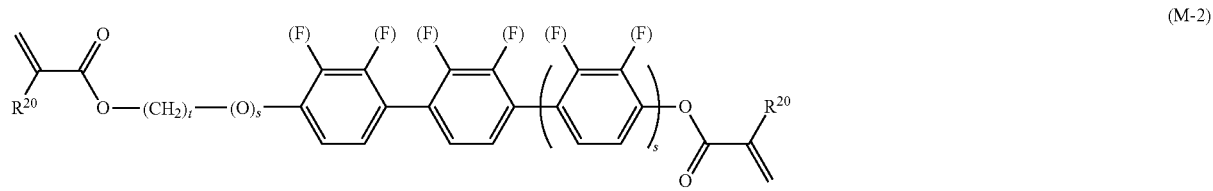

(M-2)

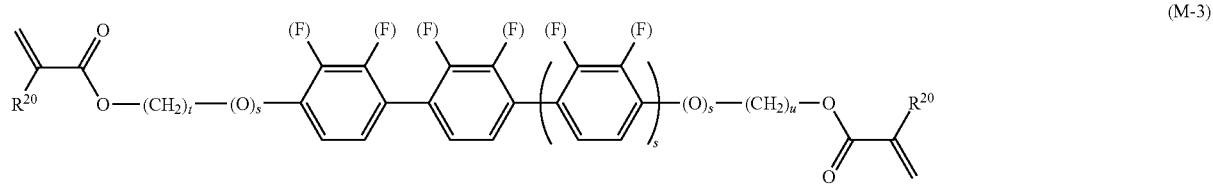

(M-3)

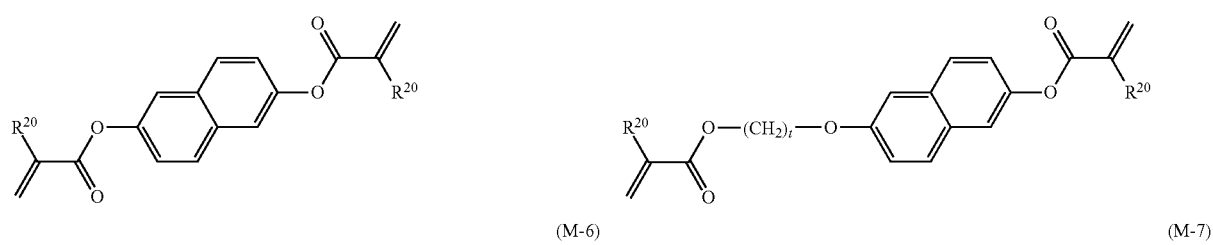

(M-4)                    (M-5)

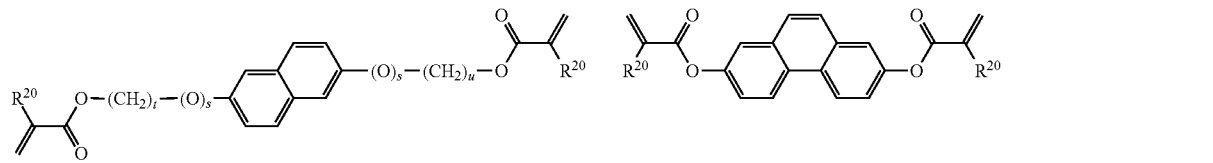

(M-6)                    (M-7)

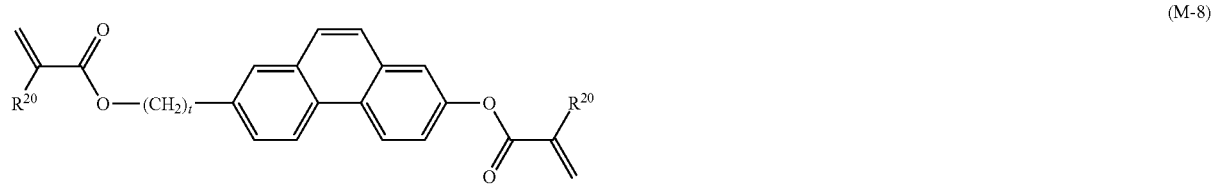

(M-8)

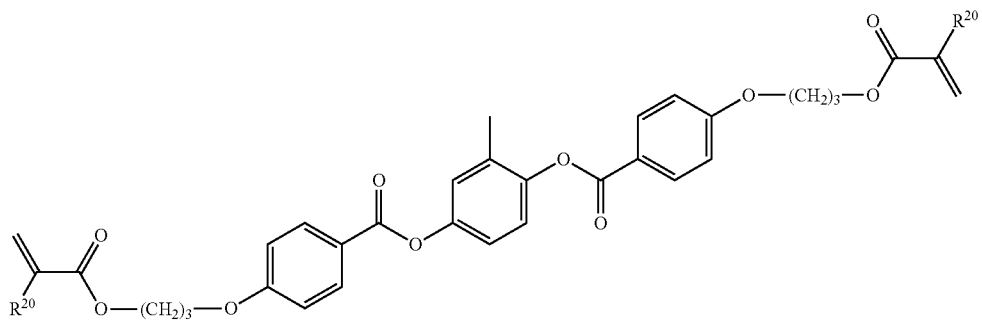 (M-9)

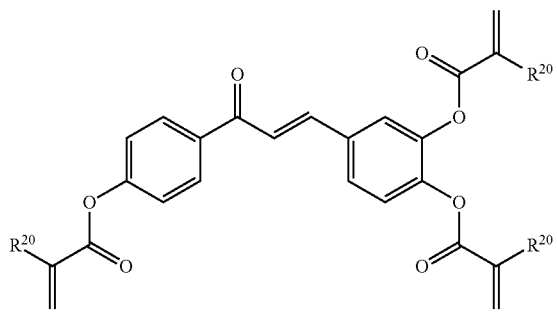 (M-10)

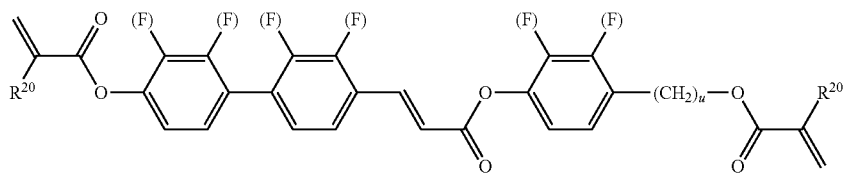 (M-11)

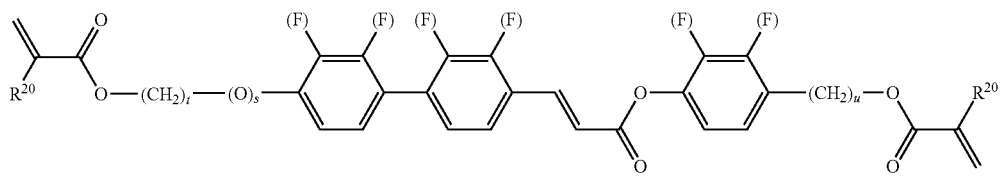 (M-12)

The antioxidant is effective for maintaining a large voltage holding ratio. Preferred examples of the antioxidant include compounds (AO-1) and (AO-2) below; IRGANOX 415, IRGANOX 565, IRGANOX 1010, IRGANOX 1035, IRGANOX 3114 and IRGANOX 1098 (trade names: BASF). The ultraviolet light absorber is effective for preventing a decrease of a maximum temperature. Preferred examples of the ultraviolet light absorber include a benzophenone derivative, a benzoate derivative and a triazole derivative. Specific examples include compounds (AO-3) and (AO-4) below; TINUVIN329, TINUVIN P, TINUVIN 326, TINUVIN 234, TINUVIN 213, TINUVIN 400, TINUVIN 328 and TINUVIN 99-2 (trade names: BASF); and 1,4-diazabicyclo[2.2.2] octane (DABCO).

A light stabilizer such as amine having steric hindrance is preferred for maintaining a large voltage holding ratio. Preferred examples of the light stabilizer include compounds (AO-5) and (AO-6) below; TINUVIN 144, TINUVIN 765 and TINUVIN 770DF (trade names: BASF). The heat stabilizer is also effective for maintaining a large voltage holding ratio, and preferred examples include IRGAFOS 168 (trade name: BASF). The defoaming agent is effective for preventing foam formation. Preferred examples of the defoaming agent include dimethyl silicone oil and methylphenyl silicone oil.

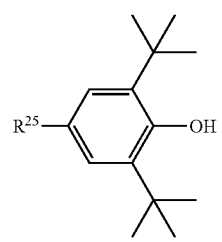 (AO-1)

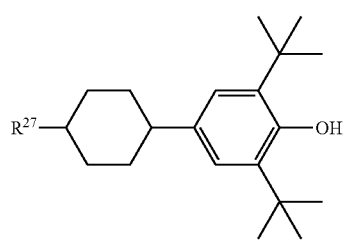 (AO-2)

-continued

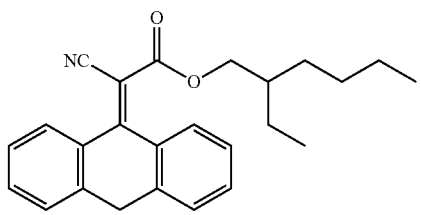
(AO-3)

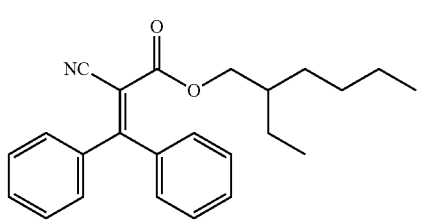
(AO-4)

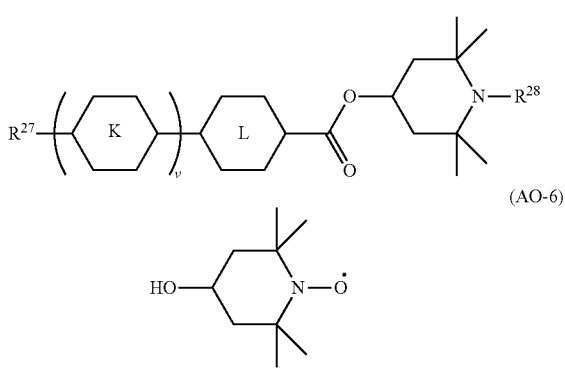
(AO-5)

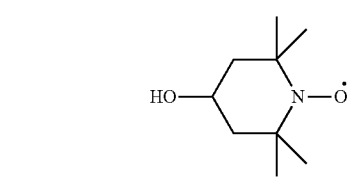
(AO-6)

In compound (AO-1), $R^{25}$ is alkyl having 1 to 20 carbons, alkoxy having 1 to 20 carbons, —COOR$^{26}$ or —CH$_2$CH$_2$COOR$^{26}$; wherein $R^{26}$ is alkyl having 1 to 20 carbons. In compounds (AO-2) and (AO-5), $R^{27}$ is alkyl having 1 to 20 carbons. In compound (AO-5), ring K and ring L are 1,4-cyclohexylene or 1,4-phenylene, v is 0, 1 or 2, and $R^{28}$ is hydrogen, methyl or O.

Composition (1) can be used for a guest host (GH) mode by addition of a dichroic dye of a merocyanine type, a stylyl type, an azo type, an azomethine type, an azoxy type, a quinophthalone type, an anthraquinone type, a tetrazine type or the like.

In composition (1), a maximum temperature can be adjusted to be approximately 70° C. or higher and a minimum temperature can be adjusted to be approximately −10° C. or lower by appropriately adjusting a kind and a ratio of component compounds, and thus a temperature range of the nematic phase is wide. Accordingly, a liquid crystal display device including the composition can be used in a wide temperature range.

In composition (1), optical anisotropy can be adjusted into the range of approximately 0.10 to approximately 0.13 or into the range of approximately 0.05 to approximately 0.18 by appropriately adjusting a kind and a ratio of component compounds. In a similar manner, dielectric anisotropy can be adjusted into the range of approximately −5.0 to approximately −2.0. Preferred dielectric anisotropy is in the range of approximately −4.5 to approximately −2.5. Composition (1) having the dielectric anisotropy in the range can be suitably used for a liquid crystal display device that operates by means of the IPS mode, VA mode or PSA mode.

3. Liquid Crystal Display Device

Composition (1) can be used for an AM device and also for a PM device. The composition can be used for an AM device and a PM device having a mode such as PC, TN, STN, ECB, OCB, IPS, FFS, VA, PSA or FPA. Use for an AM device having the TN, OCB, IPS or FFS mode is particularly preferred. In an AM device having the IPS mode or FFS mode, alignment of liquid crystal molecules in a state in which no voltage is applied may be parallel or perpendicular to a panel substrate. The devices may be of a reflective type, a transmissive type or a transflective type. Use for a transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, or a polymer dispersed (PD) device in which a three-dimensional network-polymer is formed in the composition.

Composition (1) has a negative dielectric anisotropy, and therefore can be suitably used for a liquid crystal display device that has an operating mode such as the VA mode, the IPS mode or the PSA mode, and is driven by an AM mode. The composition can be particularly suitably used for a liquid crystal display device that has the VA mode and driven by the AM mode.

In a liquid crystal display device that operates in the TN mode, VA mode or the like, a direction of an electric field is perpendicular to a direction of a liquid crystal layer. On the other hand, in a liquid crystal display device that operates in the IPS mode or the like, the direction of the electric field direction is parallel to the direction of the liquid crystal layer. A structure of a liquid crystal display device that operates in the VA mode is reported by K. Ohmuro, S. Kataoka, T. Sasaki and Y. Koike, SID '97 Digest of Technical Papers, 28, 845 (1997). A structure of a liquid crystal display device that operates in the IPS mode is reported in WO 91/10936 A (family: U.S. Pat. No. 5,576,867 B).

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be explained in greater detail by way of Examples. The invention is not restricted by the Examples.

1-1. Example of Compound (1-1)

Compound (1-1) was prepared by procedures as described below. A prepared compound was identified by a method such as NMR analysis. Physical properties of the compound were measured by methods as described below.

NMR Analysis

As a measuring apparatus, DRX-500 (made by Bruker BioSpin Corporation) was used. In $^1$H-NMR measurement, a sample was dissolved in a deuterated solvent such as CDCl$_3$, and measurement was carried out under conditions of room temperature, 500 MHz and 16 times of accumulation. Tetramethylsilane was used as an internal standard. In $^{19}$F-NMR measurement, measurement was carried out under conditions of 24 times of accumulation using CFCl$_3$ as an internal standard. In the explanation of nuclear magnetic resonance spectra, s, d, t, q, quin, sex, m stand for a singlet, a doublet, a triplet, a quartet, a quintet, a sextet and a multiplet, respectively, and br means broad.

Measurement Sample

In measuring a phase structure and a transition temperature, a liquid crystal compound per se was used as a sample. In measuring physical properties such as a maximum temperature of a nematic phase, viscosity, optical anisotropy and dielectric anisotropy, a composition prepared by mixing the compound with a base liquid crystal was used as a sample.

In the case where a sample prepared by mixing the compound with the base liquid crystal was used, measurement was carried out according to the method described below. A sample was prepared by mixing 15% by weight of the compound and 85% of the base liquid crystal. An extrapolated value was calculated from a measured value of the sample according to an extrapolation method based on an equation below, and the value was described. (Extrapolated value)= (100×(measured value of a sample)−(% of a base liquid crystal)×(measured value of a base liquid crystal))/(% of a compound).

When crystals (or a smectic phase) precipitated at 25° C. even at the ratio of the compound to the base liquid crystal, a ratio of the compound to the base liquid crystal was changed in the order of (10% by weight:90% by weight), (5% by weight:95% by weight) and (1% by weight:99% by weight). Physical properties of a sample were measured at a ratio in which the crystals (or the smectic phase) did not precipitate at 25° C. In addition, unless otherwise noted, the ratio of the compound to the base liquid crystal is 15% by weight: 85% by weight.

As the base liquid crystal, base liquid crystal (i) below was used. Ratios of components of base liquid crystal (i) are expressed in terms of % by weight.

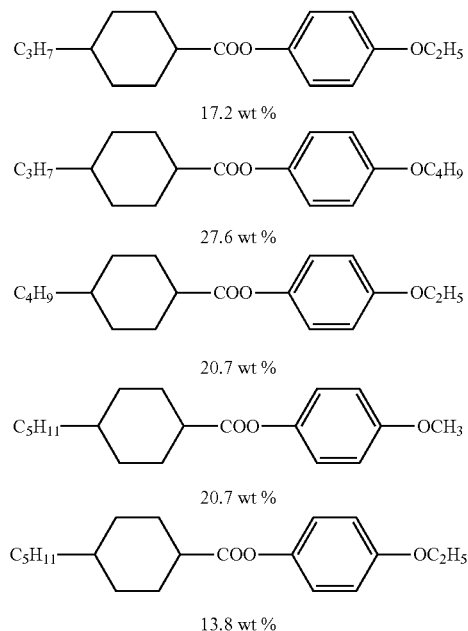

Measurement Method

Physical properties of a compound were measured according to the methods described below. Most of the measurement methods are applied as described in the Standard of the Japan Electronics and Information Technology Industries Association (hereinafter, abbreviated as JEITA) (JEITA EIAJ ED-2521A) discussed and established by JEITA, or modified thereon. No TFT was attached to a TN device used for measurement.

(1) Phase Structure

A sample was placed on a hot plate of a melting point apparatus (FP52 Hot Stage made by Mettler-Toledo International Inc.) equipped with a polarizing microscope, and a state of a phase and a change thereof were observed with the polarizing microscope while the sample was heated at a rate of 3° C. per minute, and a kind of the phase was specified.

(2) Transition Temperature (° C.)

A sample was heated and then cooled at a rate of 3° C. per minute using a differential scanning calorimeter, DSC-7 System or Diamond DSC System, made by PerkinElmer, Inc. A starting point of an endothermic peak or an exothermic peak caused by a phase change of the sample was determined by means of extrapolation, and thus a transition temperature was determined. Temperature at which a compound undergoes transition from a solid to a liquid crystal phase such as a smectic phase and a nematic phase may be occasionally abbreviated as "minimum temperature of the liquid crystal phase." Temperature at which a compound undergoes transition from a liquid crystal phase to a liquid may be occasionally abbreviated as a "clearing point."

Crystals were expressed as C, and when kinds of the crystals were distinguishable, each of the crystals was expressed as $C_1$ or $C_2$. A smectic phase or a nematic phase was expressed as S or N. When smectic A phase, smectic B phase, smectic C phase or smectic F phase was distinguishable among the smectic phases, the phases were expressed as $S_A$, $S_B$, $S_C$ or $S_F$, respectively. A liquid (isotropic) was expressed as I. A transition temperature was expressed as "C 50.0 N 100.0 I," for example. The expression indicates that a transition temperature from a crystal to a nematic phase is 50.0° C., and a transition temperature from the nematic phase to a liquid is 100.0° C.

(3) Compatibility at a Low Temperature:

Samples in which the base liquid crystal and a compound were mixed for the compound to be 20% by weight, 15% by weight, 10% by weight, 5% by weight, 3% by weight and 1% by weight were prepared, and put in glass vials. After the glass vials were kept in freezers at −10° C. or −20° C. for a predetermined period of time, whether or not crystals (or a smectic phase) precipitated was observed.

(4) Maximum Temperature of a Nematic Phase ($T_{NI}$ or NI; ° C.)

A sample was placed on a hot plate of a melting point apparatus equipped with a polarizing microscope and was heated at a rate of 1° C. per minute. Temperature was measured when part of the sample began to change from a nematic phase to an isotropic liquid. A higher limit of a temperature range of the nematic phase may be occasionally abbreviated as "maximum temperature." When the sample was a mixture of a compound and the base liquid crystal, the maximum temperature was expressed as a symbol $T_{NI}$. When the sample was a mixture of a compound and component B and so forth, the maximum temperature was expressed as a symbol NI.

(5) Minimum Temperature of a Nematic Phase ($T_C$; ° C.)

Samples each having a nematic phase were kept in freezers at temperatures of 0° C., −10° C., −20° C., −30° C. and −40° C. for 10 days, and then liquid crystal phases were observed. For example, when a sample maintained the nematic phase at −20° C. and changed to crystals or a smectic phase at −30° C., Tc was expressed as Tc≤−20° C. A lower limit of the temperature range of the nematic phase may be occasionally abbreviated as "minimum temperature."

(6) Viscosity (Bulk Viscosity; η; Measured at 20° C.; mPa·s)

A cone-plate (E-type) rotational viscometer was used for measurement.

(7) Viscosity (Rotational Viscosity; γ1; Measured at 25° C.; mPa·s)

Measurement was carried out according to the method described in M. Imai et al., Molecular Crystals and Liquid Crystals, Vol. 259, p. 37 (1995). A sample was put in a VA device in which a distance (cell gap) between two glass substrates was 20 micrometers. A voltage was applied stepwise to the device in the range of 30 V to 50 V at an increment of 1 V. After a period of 0.2 second with no voltage, a voltage was applied repeatedly under the conditions of only one rectangular wave (rectangular pulse; 0.2 second) and no voltage (2 seconds). A peak current and a peak time of a transient current generated by the applied voltage were measured. A value of rotational viscosity was obtained from the measured values and calculation equation (8) on page 40 of the paper presented by M. Imai et al. As dielectric anisotropy required for the calculation, a value measured in a section of dielectric anisotropy described below was used.

(8) Optical Anisotropy (Refractive Index Anisotropy; Δn; Measured at 25° C.)

Measurement was carried out by means of an Abbe refractometer with a polarizing plate mounted on an ocular by using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of refractive index anisotropy was calculated from an equation: Δn=n∥−n⊥.

(9) Dielectric Anisotropy (Δ∈; Measured at 25° C.)

A value of dielectric anisotropy was calculated from an equation: Δ∈=∈∥−∈⊥. A dielectric constant (∈∥ and ∈⊥) was measured as described below.

1) Measurement of dielectric constant (∈∥): An ethanol (20 mL) solution of octadecyl triethoxysilane (0.16 mL) was applied to a well-washed glass substrate. The glass substrate was rotated with a spinner, and then heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant (∈∥) in the major axis direction of liquid crystal molecules was measured.

2) Measurement of dielectric constant (∈⊥): A polyimide solution was applied to a well-washed glass substrate. After calcining the glass substrate, rubbing treatment was applied to the alignment film obtained. A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant (∈⊥) in the minor axis direction of the liquid crystal molecules was measured.

(10) Elastic Constant ($K_{11}$ and $K_{33}$; Measured at 25° C.; pN)

Elastic Constant Measurement System Model EC-1 made by TOYO Corporation was used for measurement. A sample was put in a vertical alignment device in which a distance (cell gap) between two glass substrates was 20 micrometers. An electric charge of 20 V to 0 V was applied to the device, and electrostatic capacity and applied voltage were measured. Values of electrostatic capacity (C) and applied voltage (V) were fitted to equation (2.98) and equation (2.101) on page 75 of the "Liquid Crystal Device Handbook (Ekisho Debaisu Handobukku, in Japanese)" (The Nikkan Kogyo Shimbun, Ltd.), and a value of elastic constant was obtained from equation (2.100).

(11) Threshold Voltage (Vth; Measured at 25° C.; V)

An LCD-5100 luminance meter made by Otsuka Electronics Co., Ltd. was used for measurement. A light source is a halogen lamp. A sample was put in a normally black mode VA device in which a distance (cell gap) between two glass substrates was 4 micrometers and a rubbing direction was antiparallel, and the device was sealed with an ultraviolet-curable adhesive. A voltage (60 Hz, rectangular waves) applied to the device was increased stepwise from 0 V to 20 V at an increment of 0.02 V. On the occasion, the device was irradiated with light from a perpendicular direction, and an amount of light transmitted through the device was measured. A voltage-transmittance curve was prepared, in which the maximum value of the amount of light corresponded to 100% transmittance and the minimum value of the amount of light corresponded to 0% transmittance. A threshold voltage is a voltage at 10% transmittance.

(12) Voltage Holding Ratio (VHR-1; Measured at 25° C.; %)

A TN device used for measurement had a polyimide alignment film and a distance (cell gap) between two glass plates was 5 micrometers. A sample was put in the device, and then the device was sealed with an ultraviolet-curable adhesive. The TN device was charged by applying pulse voltage (60 microseconds at 5 V). A decaying voltage was measured for 16.7 milliseconds with a high-speed voltmeter, and area A between a voltage curve and a horizontal axis in a unit cycle was obtained. Area B was an area without decay. A voltage holding ratio is a percentage of area A to area B.

(13) Voltage Holding Ratio (VHR-2; Measured at 80° C.; %)

A TN device used for measurement had a polyimide alignment film and a distance (cell gap) between two glass plates was 5 micrometers. A sample was put in the device, and then the device was sealed with an ultraviolet-curable adhesive. The TN device was charged by applying pulse voltage (60 microseconds at 5 V). A decaying voltage was measured for 16.7 milliseconds with a high-speed voltmeter, and area A between a voltage curve and a horizontal axis in a unit cycle was obtained. Area B was an area without the decay. A voltage holding ratio is a percentage of area A to area B.

Raw Material

Solmix A-11 (registered trade name) is a mixture of ethanol (85.5% by weight), methanol (13.4% by weight) and isopropanol (1.1% by weight), and was purchased from Japan Alcohol Trading Company Ltd.

Example 1

Synthesis of Compound (No. 23)

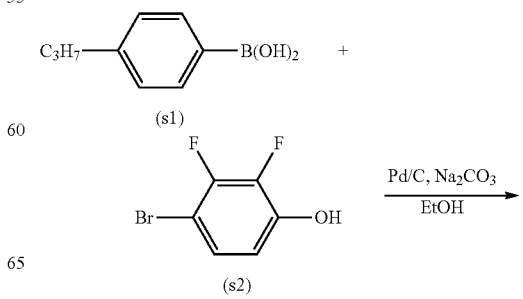

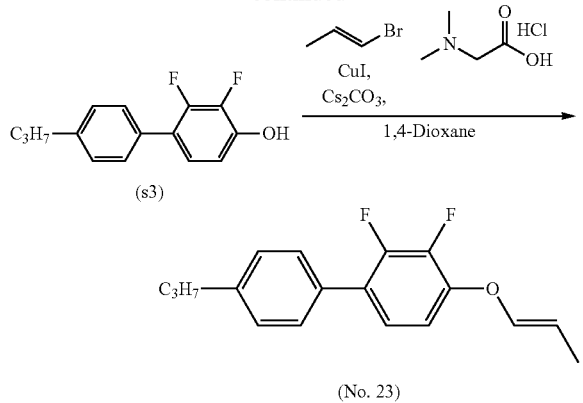

First Step

Under a nitrogen atmosphere, 4-propylphenylboronic acid (s1) (5.0 g), 4-bromo-2,3-difluorophenol (s2) (7.0 g), sodium carbonate (6.5 g), Pd/C (0.48 g) and Solmix A-11 (150 mL) were put in a reaction vessel, and the resultant mixture was heated and refluxed for 2 hours. The resultant reaction mixture was poured into water and subjected to extraction with toluene. A combined organic layer was washed with water, and dried over anhydrous magnesium sulfate. The resulting solution was concentrated under reduced pressure, and the resulting residue was purified by silica gel chromatography (toluene). The resulting residue was further purified by recrystallization from heptane, and thus compound (s3) (5.4 g; 71.7%) was obtained.

Second Step

Under a nitrogen atmosphere, compound (s3) (5.4 g), trans-1-bromo-1-propene (4.0 g), cesium carbonate (14.9 g), copper iodide (1.7 g), N,N-dimethylglycine hydrochloride (1.4 g) and 1,4-dioxane (150 mL) were put in a reaction vessel, and the resultant mixture was heated and refluxed for 25 hours. The resultant reaction mixture was poured into water and subjected to extraction with toluene. A combined organic layer was washed with water, and dried over anhydrous magnesium sulfate. The resulting solution was concentrated under reduced pressure, and the resulting residue was purified by silica gel chromatography (heptane). The resulting residue was further purified by recrystallization from Solmix A-11, and thus compound (No. 23) (2.7 g; 43.1%) was obtained.

$^1$H-NMR (δ ppm; CDCl$_3$): 7.30 (d, 2H), 7.25 (d, 2H), 7.10 (t, 1H), 6.87 (t, 1H), 6.42 (d, 1H), 5.45 (m, 1H), 2.63 (t, 2H), 1.68 (m, 5H), 0.97 (t, 3H).

Physical properties of compound (No. 23) were as described below. Transition temperature: C 47.3 I. $T_{NI}$=−29.4° C.; Δn=0.139; Δ∈=−3.96; η=34.8 mPa·s.

Example 2

Synthesis of Compound (No. 136)

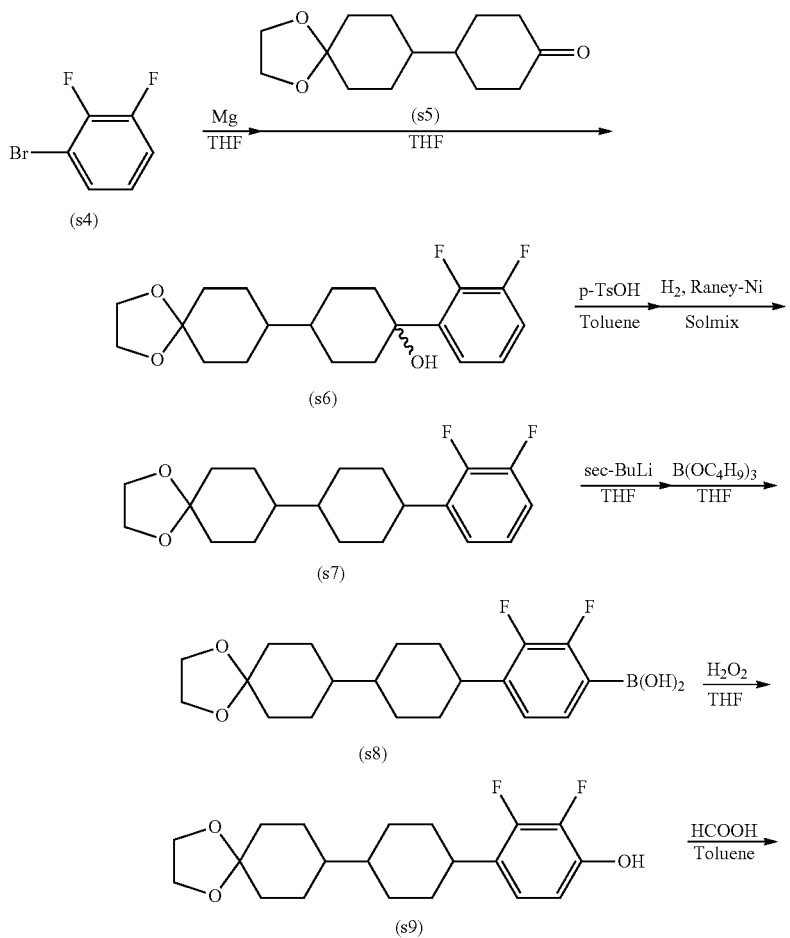

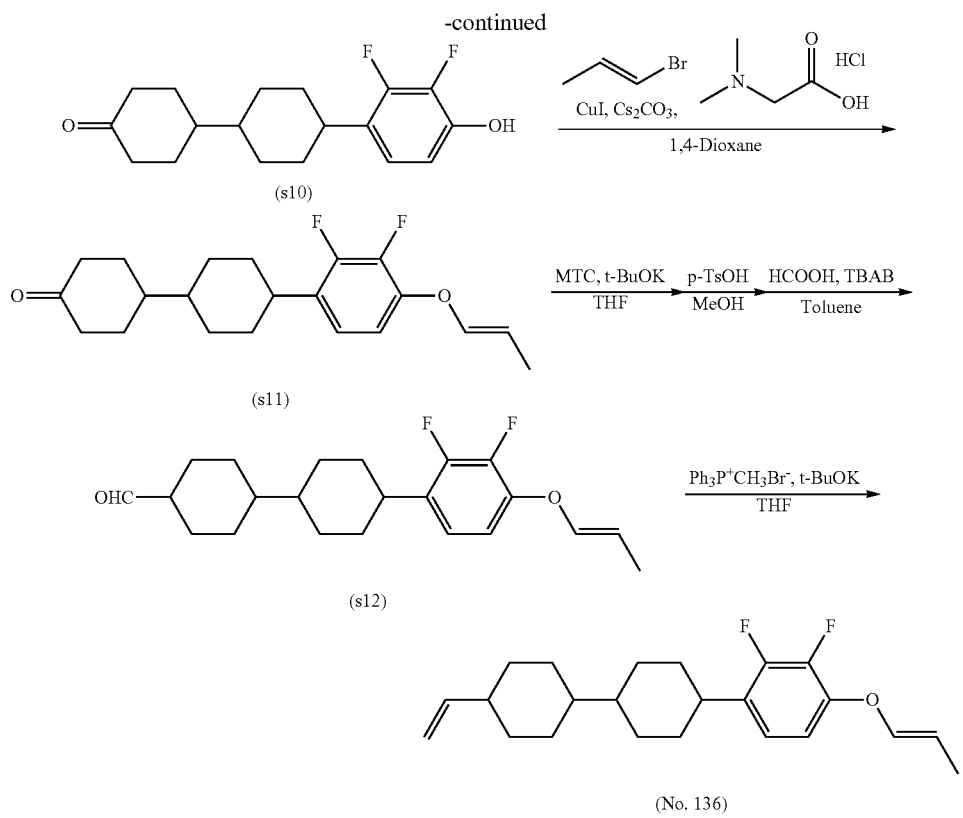

(No. 136)

First Step

Under a nitrogen atmosphere, well-dried magnesium (5.0 g) and THF (20 mL) were put in a reaction vessel, and the resultant mixture was heated to 50° C. Thereto, 3-fluorobromobenzene (s4) (30.0 g) dissolved in THF (100 mL) was slowly added dropwise in the temperature range of 40° C. to 60° C., and the resultant mixture was further stirred for 60 minutes. Then, 4-(1,4-dioxaspiro[4.5]deca-8-yl)-cyclohexanone (s5) (24.7 g) dissolved in THF (150 mL) was slowly added dropwise in the temperature range of −10° C. to 0° C., and the resultant mixture was returned to room temperature and further stirred for 60 minutes. The resulting reaction mixture was poured into an HCl aqueous solution (1 N), and subjected to extraction with ethyl acetate. A combined organic layer was washed with water, a saturated aqueous solution of sodium bicarbonate, and water, and dried over anhydrous magnesium sulfate. Then, the solvent was distilled off under reduced pressure, and thus compound (s6) (36.5 g) was obtained. Compound (s6) obtained was a yellow liquid matter.

Second Step

Compound (s6) (36.5 g), p-toluenesulfonic acid (0.7 g) and toluene (250 mL) were mixed, and the resultant mixture was heated and refluxed for 2 hours while removing water distilled therefrom. The resultant reaction mixture was cooled to 30° C., and then poured into water and subjected to extraction with toluene. A combined organic layer was washed with water, a saturated aqueous solution of sodium bicarbonate, and water, and dried over anhydrous magnesium sulfate. The resulting solution was concentrated and the resulting residue was purified by silica gel chromatography (toluene). Toluene (200 mL), Solmix A-11 (200 mL) and Raney nickel (3.6 g) were added thereto, and under a hydrogen atmosphere, stirring was carried out at room temperature until hydrogen was not absorbed any more. After reaction completion, Raney nickel was removed, and further the solvent was distilled off. The resulting residue was purified by silica gel chromatography (toluene) and further purified by recrystallization from Solmix A-11, and thus compound (s7) (19.8 g; 56.8%) was obtained.

Third Step

Under a nitrogen atmosphere, compound (s7) (19.8 g) and THF (100 mL) were put in a reaction vessel and the resultant mixture was cooled to −74° C. Thereto, n-butyl lithium (1.65 M; n-hexane solution; 42.8 mL) was added dropwise in the temperature range of −74° C. to −70° C., and the resultant mixture was further stirred for 2 hours. Then, a THF solution (50 mL) of tri-n-butyl borate (20.3 g) was added dropwise thereto in the temperature range of −75° C. to −70° C., and the resultant mixture was stirred for 8 hours while returning the mixture to room temperature. The resultant reaction mixture was poured into an aqueous solution of ammonium chloride and subjected to extraction with ethyl acetate. A combined organic layer was washed with water, a saturated aqueous solution of sodium bicarbonate, and water, and dried over anhydrous magnesium sulfate. The resulting solution was concentrated under reduced pressure, and thus compound (s8) (22.4 g) was obtained.

Fifth Step

Under a nitrogen atmosphere, compound (s8) (22.4 g) and THF (50 mL) were put in a reaction vessel, and a hydrogen peroxide solution (31%; 45 mL) was added dropwise thereto in the temperature range of 25° C. to 30° C., and the resultant mixture was further stirred for 20 hours. The resultant reaction mixture was poured into water and subjected to extraction with ethyl acetate. A combined organic layer was washed with water and dried over anhydrous magnesium sulfate. The resulting solution was concentrated under reduced pressure and purified by recrystallization (toluene:Solmix A-11=4:1 in a volume ratio), and thus compound (s9) (9.9 g; 53.7%) was obtained.

Sixth Step

Under a nitrogen atmosphere, compound (s9) (9.9 g), formic acid (87%; 30.0 g) and toluene (50 mL) were put in a reaction vessel, and the resultant mixture was stirred at room temperature for 2 hours. The resultant reaction mixture was poured into water and subjected to extraction with toluene. A combined organic layer was washed with water, a saturated aqueous solution of sodium bicarbonate, and water, and dried over anhydrous magnesium sulfate. The resulting solution was concentrated under reduced pressure, and the resulting residue was purified by silica gel chromatography (toluene), and thus compound (s10) (7.9 g; 91.7%) was obtained.

Seventh Step

Under a nitrogen atmosphere, compound (s10) (7.9 g), trans-1-bromo-1-propene (4.7 g), cesium carbonate (17.5 g), copper iodide (2.0 g), N,N-dimethylglycine hydrochloride (1.1 g) and DMF (160 mL) were put in a reaction vessel, and the resultant mixture was heated and refluxed for 24 hours. The resultant reaction mixture was cooled to 25° C., poured into water and subjected to extraction with dichloromethane. A combined organic layer was washed with water, a saturated aqueous solution of sodium bicarbonate, and water, and dried over anhydrous magnesium sulfate. The resulting solution was concentrated under reduced pressure, the resulting residue was purified by column chromatography using toluene as an eluent and silica gel as a packing agent and dried, and thus compound (s11) (6.0 g; 67.6%) was obtained.

Eighth Step

Under a nitrogen atmosphere, a solution of THF (50 mL) of well-dried methoxymethyltriphenylphosphonium chloride (MTC; 10.0 g) was cooled to −30° C. Thereto, potassium t-butoxide (3.2 g) was charged in the temperature range of −30° C. to −20° C. The resultant mixture was stirred at −20° C. for 60 minutes, and then a solution of THF (20 mL) of compound (s11) (6.0 g) was added dropwise in the temperature range of −30° C. to −20° C. The resultant mixture was further stirred for 2 hours while returning the mixture to room temperature. The resultant reaction mixture was poured into water and subjected to extraction with toluene. A combined organic layer was washed with water and dried over anhydrous magnesium sulfate. The resulting solution was concentrated under reduced pressure, and the resulting residue was purified by silica gel chromatography (toluene). To the compound, p-toluenesulfonic acid hydrate (2.7 g) and methanol (60 mL) were added, and the resultant mixture was heated and refluxed for 2 hours. The resultant reaction mixture was poured into water and subjected to extraction with toluene. A combined organic layer was washed with water, a saturated aqueous solution of sodium bicarbonate, and water, and dried over anhydrous magnesium sulfate. Formic acid (87%; 4.8 g) and toluene (100 mL) were added to the compound, and the resultant mixture was stirred at room temperature for 2 hours. The resultant reaction mixture was poured into water and subjected to extraction with toluene. A combined organic layer was washed with water, a saturated aqueous solution of sodium bicarbonate, and water, and dried over anhydrous magnesium sulfate. The resulting solution was concentrated under reduced pressure, the resulting residue was purified by silica gel chromatography (toluene), and thus compound (s12) (1.1 g; 16.1%) was obtained.

Ninth Step

Under a nitrogen atmosphere, a solution of THF (10 mL) of well-dried methyltriphenylphosphonium bromide (1.6 g) was cooled to −30° C. Thereto, potassium t-butoxide (0.5 g) was charged in the temperature range of −30° C. to −20° C. The resultant mixture was stirred at −20° C. for 60 minutes, and then a solution of THF (10 mL) of compound (s12) (1.1 g) was added dropwise in the temperature range of −30° C. to −20° C. The resultant mixture was further stirred for 2 hours while returning the mixture to room temperature. The resultant reaction mixture was poured into water and subjected to extraction with toluene. A combined organic layer was washed with water and dried over anhydrous magnesium sulfate. The resulting solution was concentrated under reduced pressure, the resulting residue was purified by silica gel chromatography (toluene), and further purified by recrystallization from Solmix A-11, and thus compound (No. 136) (0.59 g; 53.9%) was obtained.

$^1$H-NMR (δ ppm; CDCl$_3$): 6.86 (td, 1H), 6.74 (td, 1H), 6.36 (dd, 1H), 5.78 (m, 1H), 5.37 (m, 1H), 4.96 (dt, 1H), 4.88 (dt, 1H), 2.74 (tt, 1H), 1.94-1.75 (m, 9H), 1.65 (dd, 3H), 1.48-1.37 (m, 2H), 1.24-1.03 (m, 8H).

Physical properties of compound (No. 136) were as described below. Transition temperature: C 78.4 N 127.4 I. $T_{NI}$=100.6° C.; Δn=0.123; Δ∈=−4.63; η=68.0 mPa·s.

Example 3

Synthesis of Compound (No. 203)

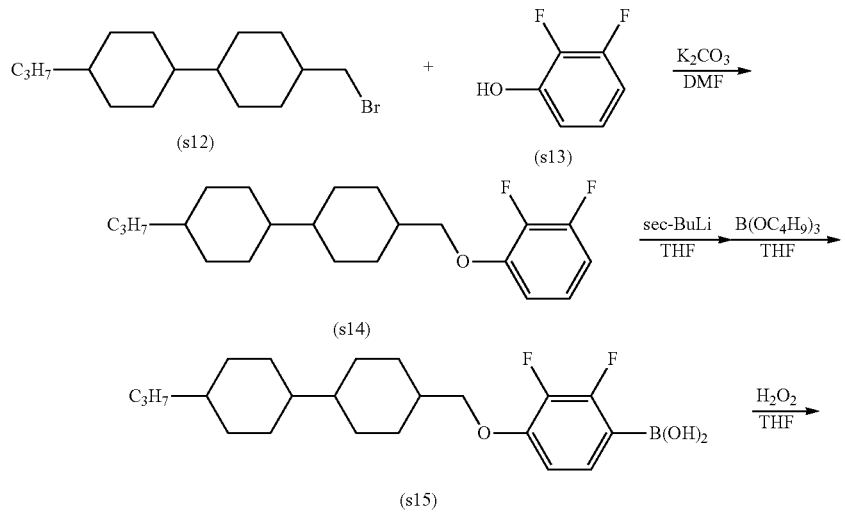

-continued

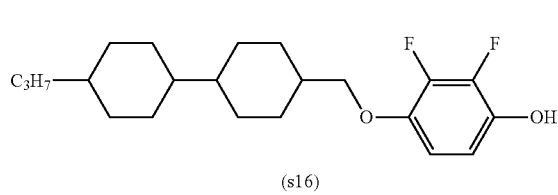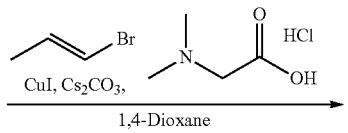

(s16)

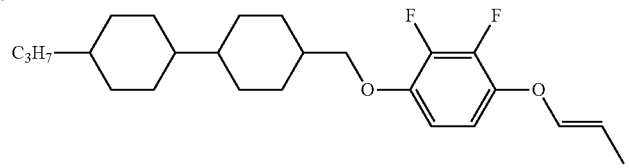

(No. 203)

First Step

Under a nitrogen atmosphere, compound (s12) (24.3 g), 2,3-difluorophenol (s13) (10.0 g), potassium carbonate ($K_2CO_3$; 15.9 g) and DMF (100 mL) were put in a reaction vessel, and the resultant mixture was stirred at 100° C. for 2 hours. The resultant reaction mixture was cooled to 25° C., and then a precipitate was filtered off and a filtrate was concentrated. The resulting residue was purified by silica gel chromatography (heptane), further purified by recrystallization from heptane, and thus compound (s14) (20.4 g; 75.8%) was obtained.

Second Step

Under a nitrogen atmosphere, compound (s14) (20.4 g) and THF (50 mL) were put in a reaction vessel, and the resultant mixture was cooled to −74° C. Thereto, n-butyl lithium (1.65 M; n-hexane solution; 42.3 mL) was added dropwise in the temperature range of −74° C. to −70° C., and the resultant mixture was further stirred for 2 hours. Then, a solution of THF (50 mL) of tri-n-butyl borate (15.9 g) was added dropwise in the temperature range of −75° C. to −70° C., and the resultant mixture was stirred for 8 hours while returning the mixture to 25° C. The resultant reaction mixture was poured into an aqueous solution of ammonium chloride and subjected to extraction with ethyl acetate. A combined organic layer was washed with water, a saturated aqueous solution of sodium bicarbonate, and water, and dried over anhydrous magnesium sulfate. The resulting solution was concentrated under reduced pressure, and further purified by recrystallization from heptane, and thus compound (s15) (11.0 g; 48.0%) was obtained.

Third Step

Under a nitrogen atmosphere, compound (s15) (11.0 g) and THF (55 mL) were put in a reaction vessel, a hydrogen peroxide solution (31% by weight; 14 mL) was added dropwise thereto in the temperature range of 25° C. to 30° C., and the resultant mixture was further stirred for 20 hours. The resultant reaction mixture was poured into water and subjected to extraction with ethyl acetate. A combined organic layer was washed with water and dried over anhydrous magnesium sulfate. The resulting solution was concentrated under reduced pressure and purified by recrystallization (heptane: Solmix A-11=2:1 in a volume ratio), and thus compound (s16) (5.6 g; 54.8%) was obtained.

Fourth Step

Under a nitrogen atmosphere, compound (s16) (5.6 g), trans-1-bromo-1-propene (2.7 g), cesium carbonate (10.5 g), copper iodide (1.2 g), N,N-dimethylglycine hydrochloride (0.6 g) and DMF (80 mL) were put in a reaction vessel, and the resultant mixture was heated and refluxed for 24 hours. The resultant reaction mixture was cooled to 25° C., and then poured into water and subjected to extraction with dichloromethane. A combined organic layer was washed with water, a saturated aqueous solution of sodium bicarbonate, and water, and dried over anhydrous magnesium sulfate. The resulting solution was concentrated under reduced pressure, the resulting residue was purified by silica gel chromatography (toluene), further purified by recrystallization (toluene: Solmix A-11=1:1 in a volume ratio), and thus compound (No. 203) (2.9 g; 46.4%) was obtained.

$^1$H-NMR (δ ppm; $CDCl_3$): 6.71 (td, 1H), 6.61 (td, 1H), 6.33 (dd, 1H), 5.28 (m, 1H), 3.77 (d, 2H), 1.91 (m, 2H), 1.81-1.67 (m, 7H), 1.63 (dd, 3H), 1.30 (m, 2H), 1.18-0.79 (m, 16H).

Physical properties of compound (No. 203) were as described below. Transition temperature: C 104.2 N 134.7 I. $T_{NI}$=118.6° C.; Δn=0.107; Δ∈=−6.56; η=67.6 mPa·s.

Example 4

According to the synthesis methods presented in Examples 1 to 3, compounds below were prepared from starting materials corresponding to the compounds.

Compound (No. 3)

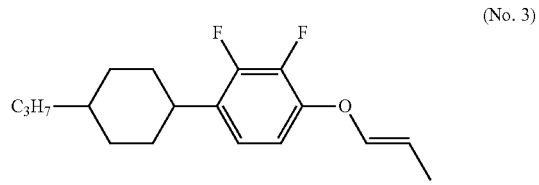

(No. 3)

$^1$H-NMR (δ ppm; $CDCl_3$): 6.86 (t, 1H), 6.75 (t, 1H), 6.36 (d, 1H), 5.37 (m, 1H), 2.76 (m, 1H), 1.84 (m, 4H), 1.65 (d, 3H), 1.49-1.38 (m, 2H), 1.38-1.17 (m, 5H), 1.12-1.00 (m, 2H), 0.91 (t, 3H).

Physical properties of compound (No. 3) were as described below. Transition temperature: C 28.5 I. $T_{NI}$=−31.4° C.; Δn=0.068; Δ∈=−9.90; η=30.0 mPa·s.

Compound (No. 83)

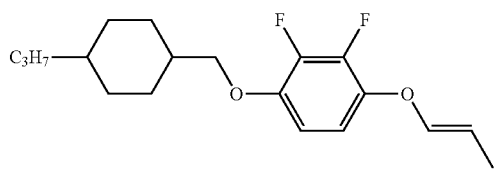
(No. 83)

$^1$H-NMR (δ ppm; CDCl$_3$): 6.71 (t, 1H), 6.62 (t, 1H), 6.33 (d, 1H), 5.28 (m, 1H), 3.78 (d, 2H), 1.89 (m, 2H), 1.83-1.70 (m, 3H), 1.63 (m, 3H), 1.32 (m, 2H), 1.28-1.14 (m, 3H), 1.10-1.00 (m, 2H), 0.98-0.85 (m, 5H).

The physical properties of compound (No. 83) were as described below. Transition temperature: C 79.3 I. $T_{NI}$=−15.4° C.; Δn=0.074; Δϵ=−6.50; η=42.4 mPa·s.

Example 5

Compounds (No. 1) to (No. 320) shown below can be prepared in a manner similar to the synthesis methods as described in Examples 1 to 3. Attached data were determined in accordance with the methods described above. When a transition temperature was measured, a compound per se was used as a sample. When a maximum temperature ($T_{NI}$), optical anisotropy (Δn) and dielectric anisotropy (Δϵ) were measured, a mixture of the compound (15% by weight) and the base liquid crystal (i) (85% by weight) was used as a sample. From the measured values, extrapolated values were calculated according to the extrapolation method described above, and the calculated values were described. In compound (No. 136), a sample for measurement was prepared from 5% by weight of compound (No. 136), and 95% by weight of the base liquid crystal (i) because crystals precipitated when an ordinary ratio (15% by weight:85% by weight) was applied.

| No. | |
|---|---|
| 1 | H$_3$C—cyclohexyl—C$_6$H$_2$(F)(F)—O—CH=CH—CH$_3$ |
| 2 | C$_2$H$_5$—cyclohexyl—C$_6$H$_2$(F)(F)—O—CH=CH—CH$_3$ |
| 3 | C$_3$H$_7$—cyclohexyl—C$_6$H$_2$(F)(F)—O—CH=CH—CH$_3$ |
| | C 28.5 I<br>$T_{NI}$; −31.4 Δn; 0.068, Δε; −3.9, η; 30.0 |
| 4 | C$_4$H$_9$—cyclohexyl—C$_6$H$_2$(F)(F)—O—CH=CH—CH$_3$ |
| 5 | C$_5$H$_{11}$—cyclohexyl—C$_6$H$_2$(F)(F)—O—CH=CH—CH$_3$ |
| 6 | C$_6$H$_{13}$—cyclohexyl—C$_6$H$_2$(F)(F)—O—CH=CH—CH$_3$ |

| No. | |
|---|---|
| 7 | 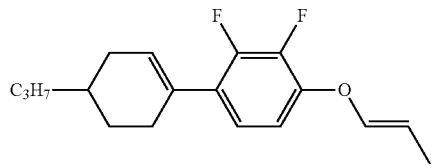 |
| 8 | 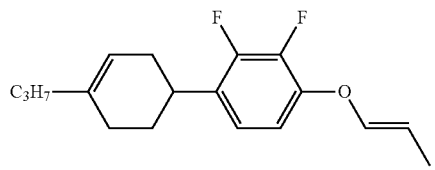 |
| 9 | 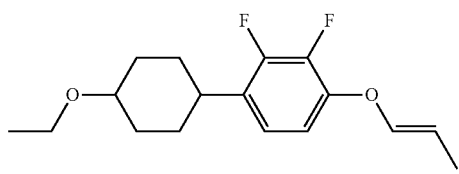 |
| 10 | 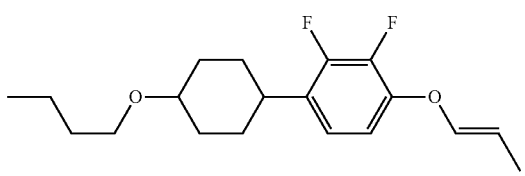 |
| 11 | 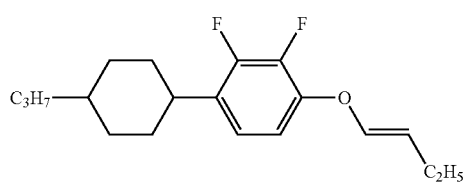 |
| 12 | 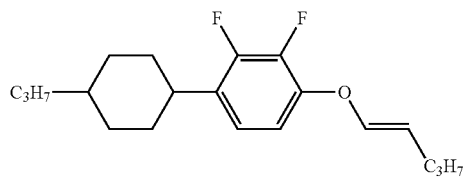 |
| 13 | 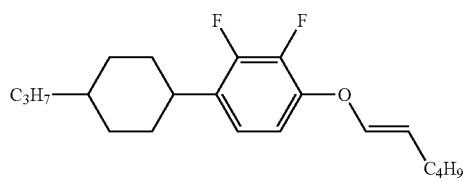 |
| 14 | 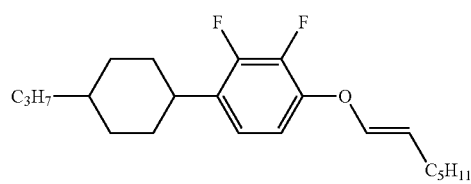 |

-continued
| No. | |
|---|---|
| 15 | 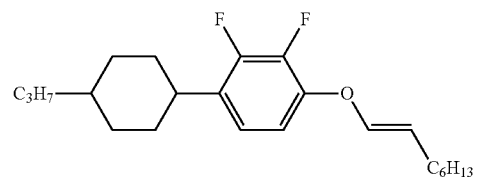 |
| 16 | 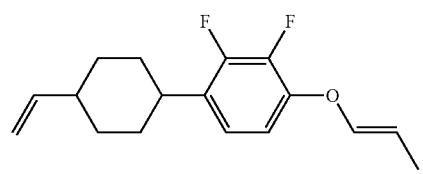 [SMILES: C=CC1CCC(c2ccc(O/C=C/C)c(F)c2F)CC1] |
| 17 | 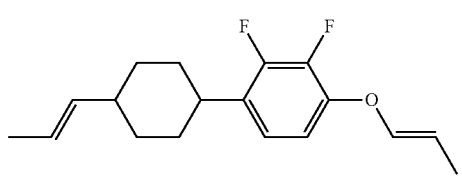 [SMILES: C/C=C/Oc1ccc(C2CCC(/C=C/C)CC2)c(F)c1F] |
| 18 | 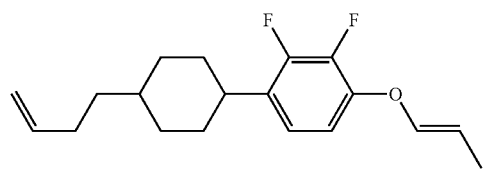 [SMILES: C=CCCC1CCC(c2ccc(O/C=C/C)c(F)c2F)CC1] |
| 19 | 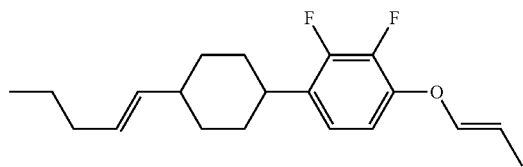 |
| 20 | 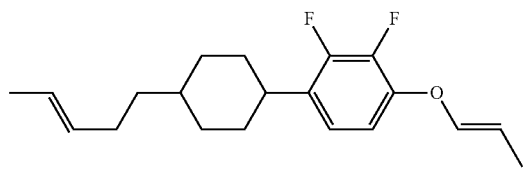 |
| 21 | 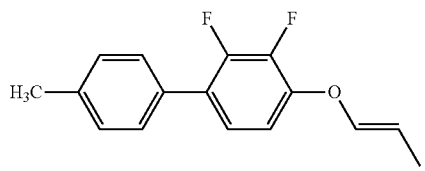 [SMILES: C/C=C/Oc1ccc(-c2ccc(C)cc2)c(F)c1F] |
| 22 | 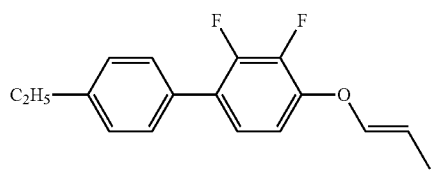 [SMILES: C/C=C/Oc1ccc(-c2ccc(CC)cc2)c(F)c1F] |

-continued
| No. | |
|---|---|
| 23 | 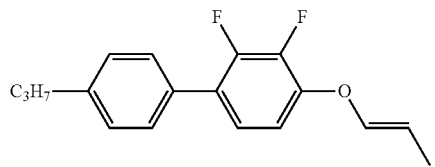<br>C 47.3 I<br>$T_{NI}$; -29.4, Δ n; 0.139, Δ ε; -4.0, η; 34.8 |
| 24 | 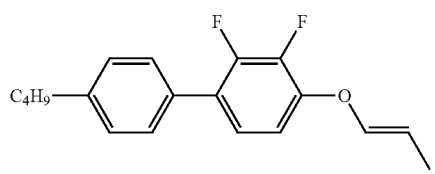 |
| 25 | 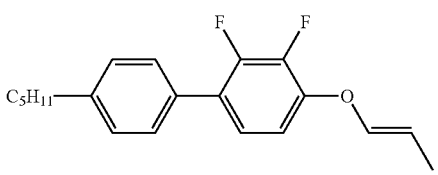 |
| 26 | 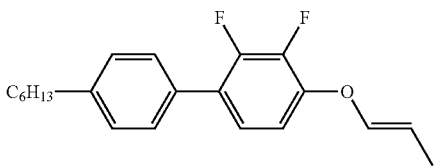 |
| 27 | 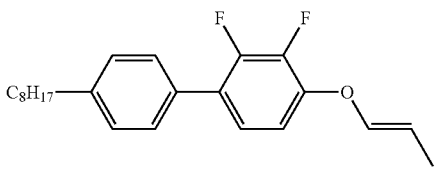 |
| 28 | 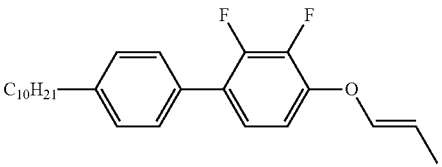 |
| 29 | 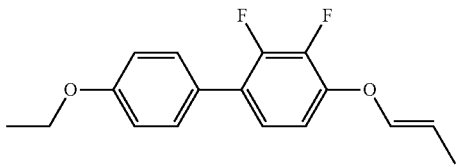 [SMILES: C/C=C/Oc1ccc(-c2ccc(OCC)cc2)c(F)c1F] |
| 30 | 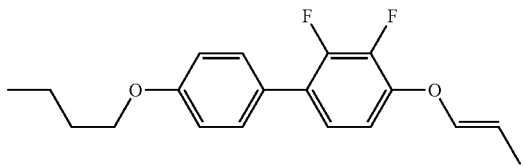 |

| No. | |
|---|---|
| 31 | 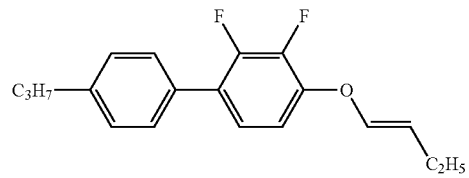 |
| 32 | 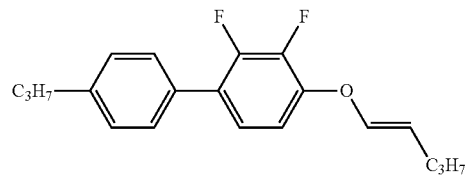 |
| 33 | 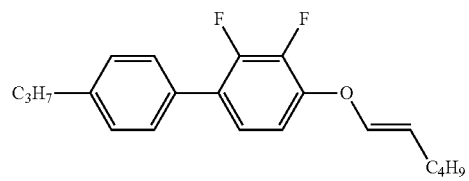 |
| 34 | 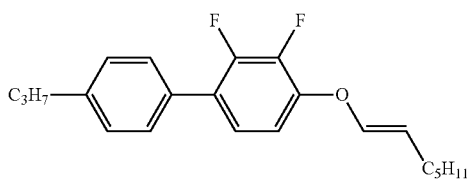 |
| 35 | 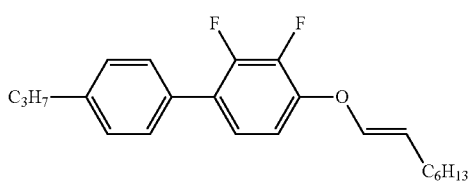 |
| 36 | 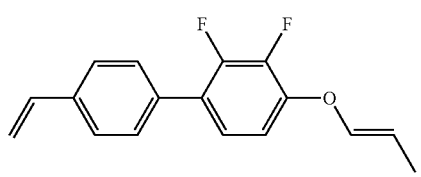 |
| 37 | 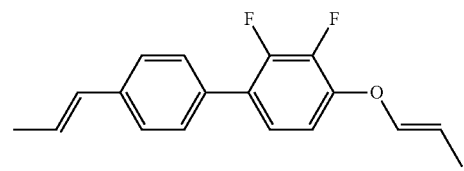 [SMILES: C/C=C/Oc1ccc(-c2ccc(/C=C/C)cc2)c(F)c1F] |
| 38 | 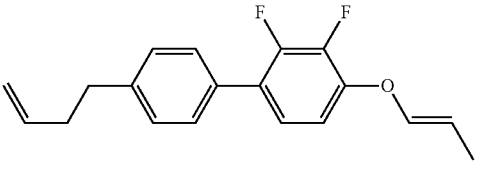 |

-continued
| No. | |
|---|---|
| 39 | 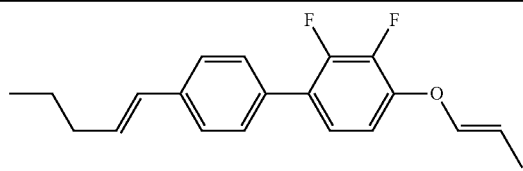 |
| 40 | 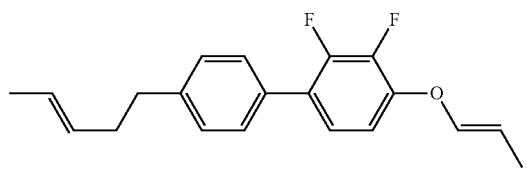 [SMILES: C/C=C/CCc1ccc(-c2ccc(O/C=C/C)c(F)c2F)cc1] |
| 41 | 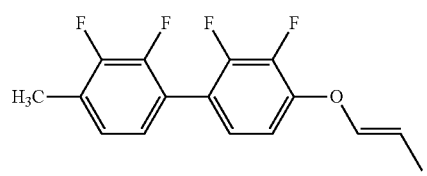 [SMILES: C/C=C/Oc1ccc(-c2ccc(C)c(F)c2F)c(F)c1F] |
| 42 | 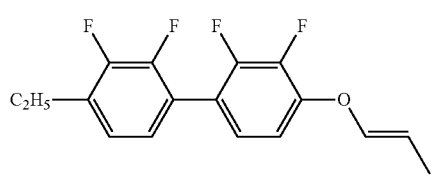 |
| 43 | 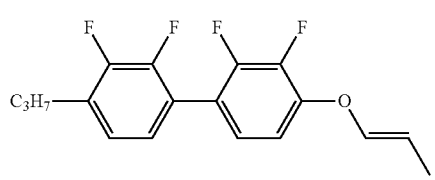 |
| 44 | 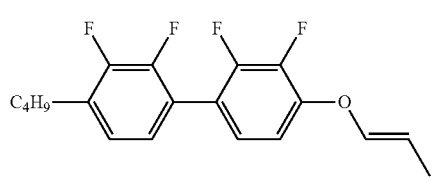 |
| 45 | 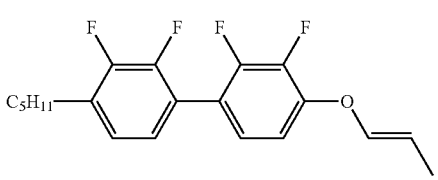 |
| 46 | 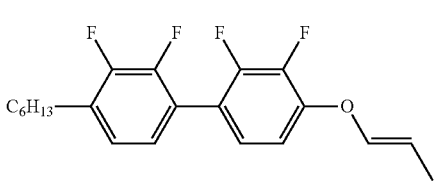 |
| 47 | 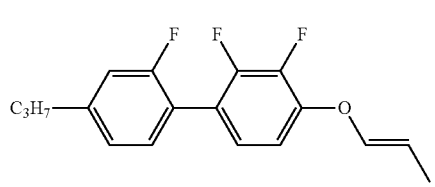 |

| No. | |
|---|---|
| 48 | 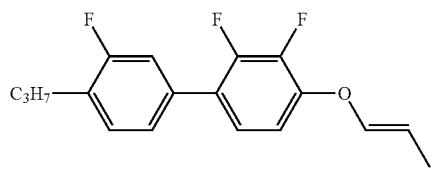 |
| 49 | 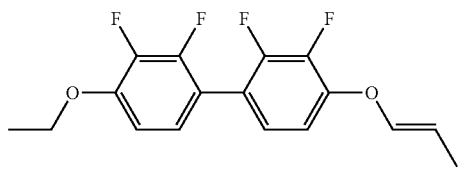 |
| 50 | 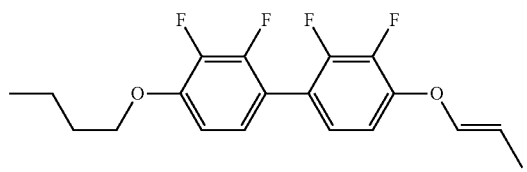 |
| 51 | 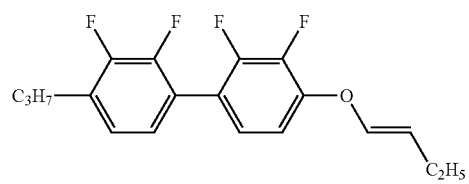 |
| 52 | 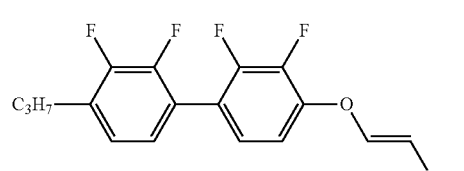 |
| 53 | 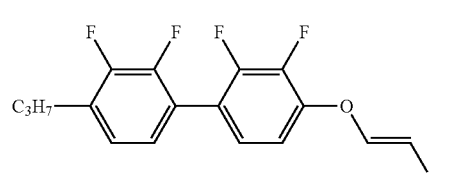 |
| 54 | 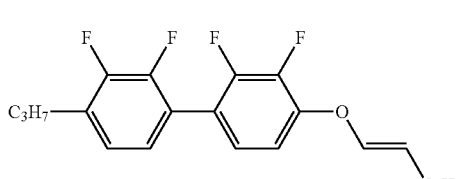 |
| 55 | 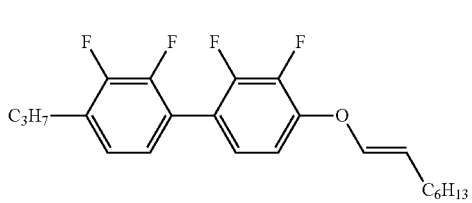 |

-continued
| No. | |
|---|---|
| 56 | 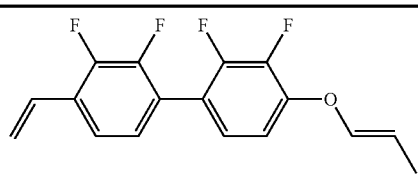 |
| 57 | 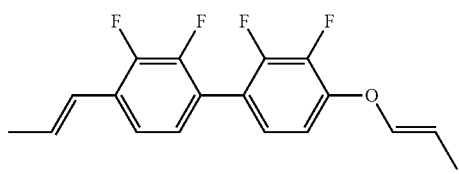 [SMILES: C/C=C/Oc1ccc(-c2ccc(/C=C/C)c(F)c2F)c(F)c1F] |
| 58 | 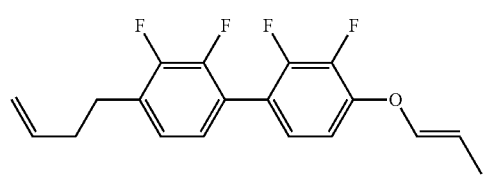 |
| 59 | 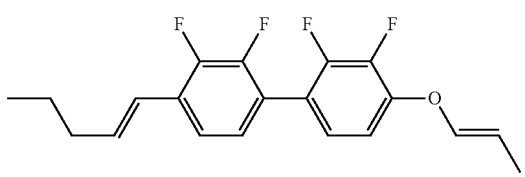 [SMILES: C/C=C/Oc1ccc(-c2ccc(/C=C/CCC)c(F)c2F)c(F)c1F] |
| 60 | 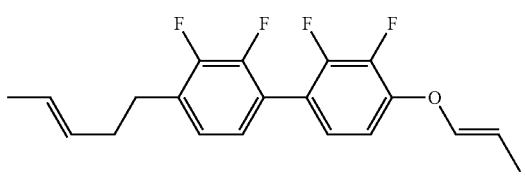 |
| 61 | 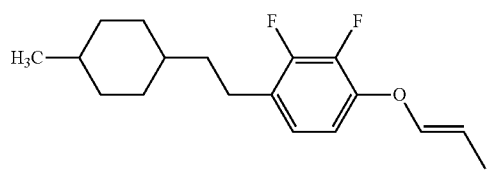 |
| 62 | 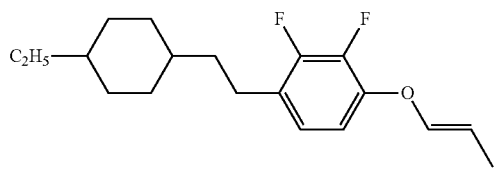 [SMILES: C/C=C/Oc1ccc(CCC2CCC(CC)CC2)c(F)c1F] |
| 63 | 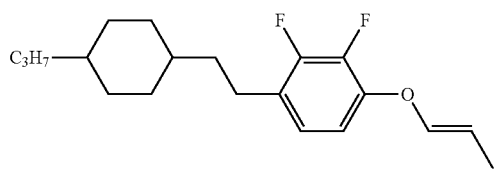 |
| 64 | 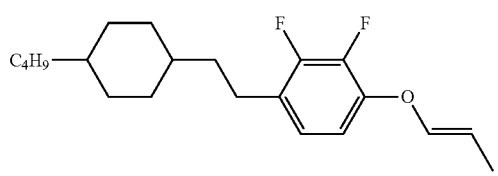 |

-continued
| No. | |
|---|---|
| 65 | 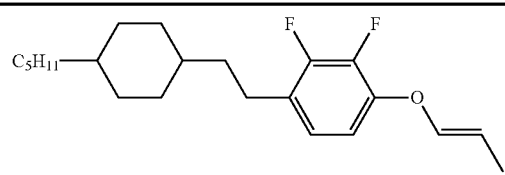 |
| 66 | 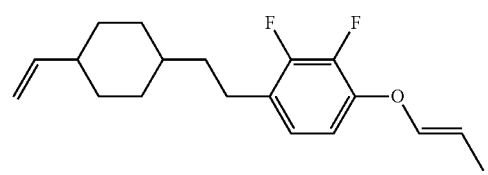 |
| 67 | 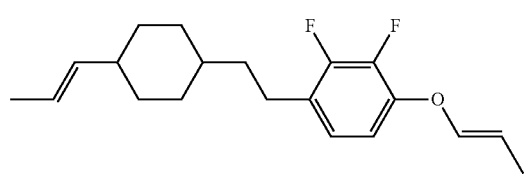 |
| 68 | 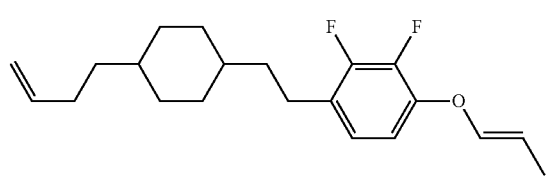 [SMILES: C=CCCC1CCC(CCc2ccc(O/C=C/C)c(F)c2F)CC1] |
| 69 | 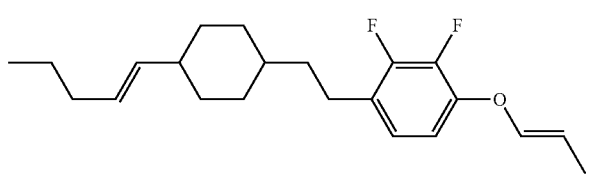 [SMILES: C/C=C/Oc1ccc(CCC2CCC(/C=C/CCC)CC2)c(F)c1F] |
| 70 | 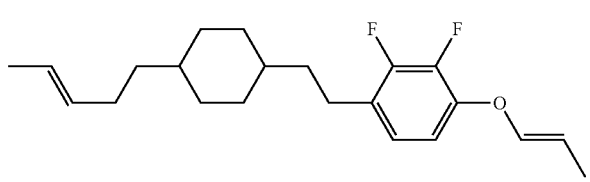 |
| 71 | 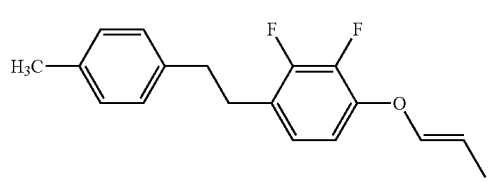 [SMILES: C/C=C/Oc1ccc(CCc2ccc(C)cc2)c(F)c1F] |
| 72 | 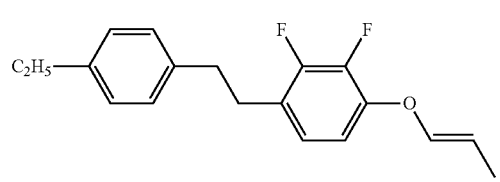 |
| 73 | 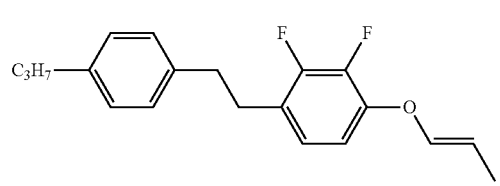 |

| No. | |
|---|---|
| 74 | 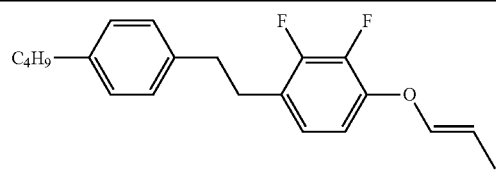 |
| 75 | 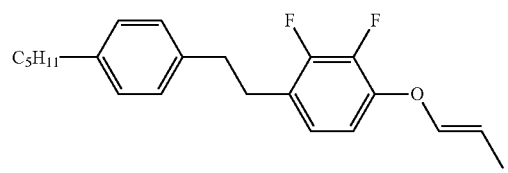 |
| 76 | 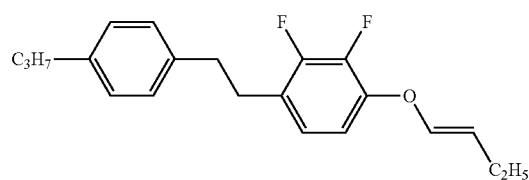 |
| 77 | 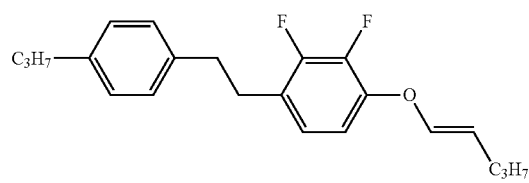 |
| 78 | 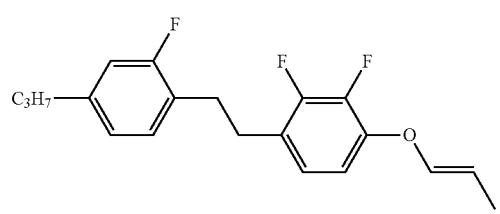 |
| 79 | 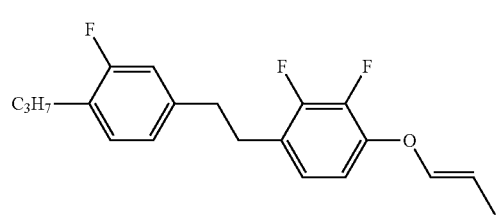 |
| 80 | 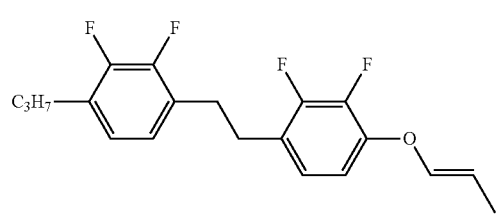 |
| 81 | 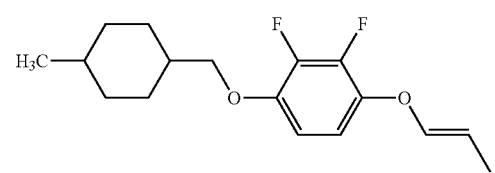 |

| No. | |
|---|---|
| 82 | 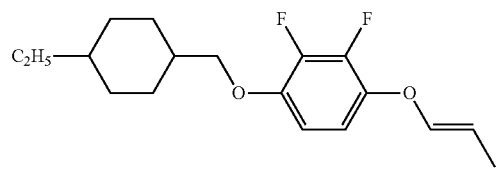 |
| 83 | 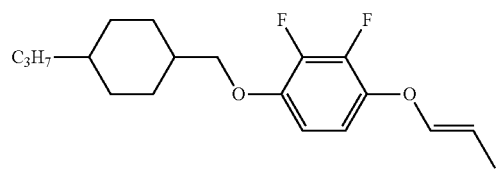 C 79.3 I<br>$T_{NI}$; -15.4, Δ n; 0.074, Δ ε; -4.0, η; 42.4 |
| 84 | 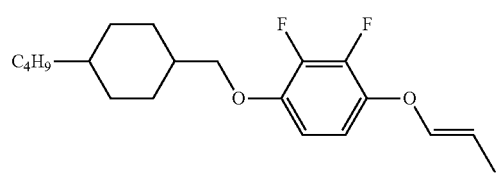 |
| 85 | 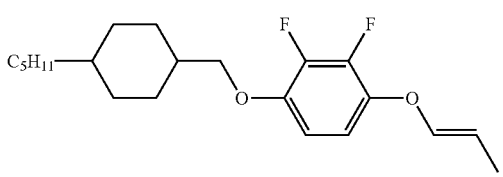 |
| 86 | 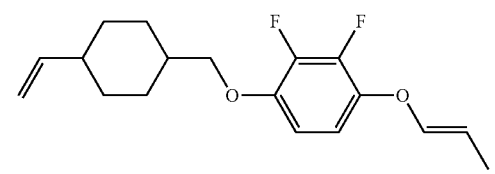 |
| 87 | 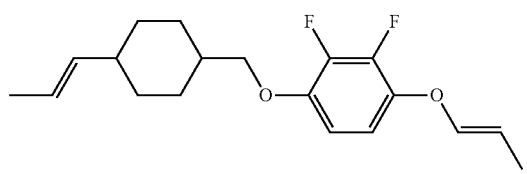 [SMILES: C/C=C/Oc1ccc(OCC2CCC(/C=C/C)CC2)c(F)c1F] |
| 88 | 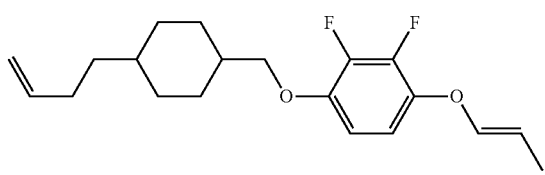 [SMILES: C=CCCC1CCC(COc2ccc(O/C=C/C)c(F)c2F)CC1] |
| 89 | 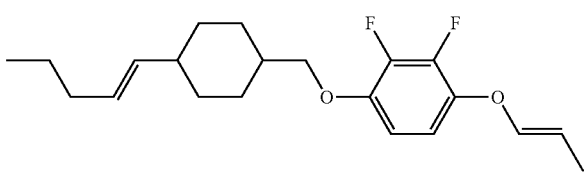 [SMILES: C/C=C/Oc1ccc(OCC2CCC(/C=C/CCC)CC2)c(F)c1F] |

-continued
| No. | |
|---|---|
| 90 | 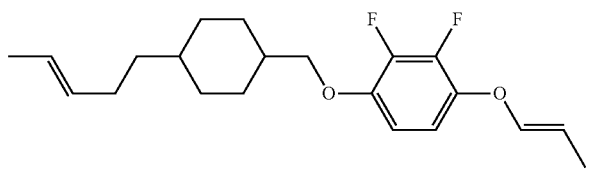 |
| 91 | 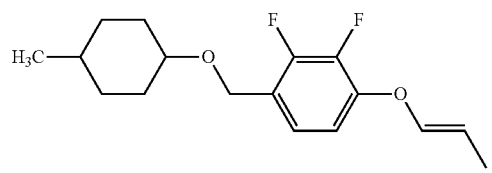 |
| 92 | 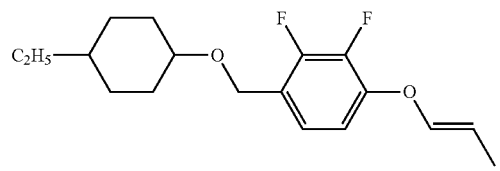 |
| 93 | 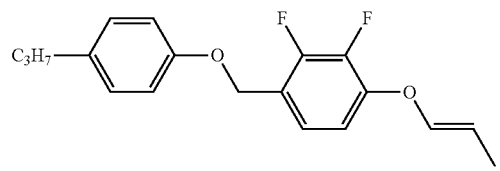 |
| 94 | 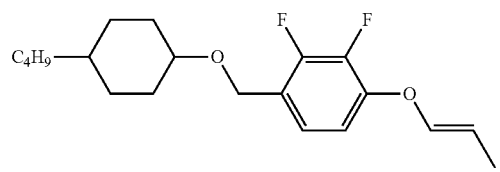 |
| 95 | 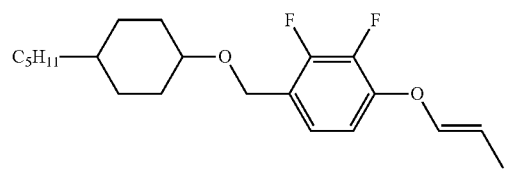 |
| 96 | 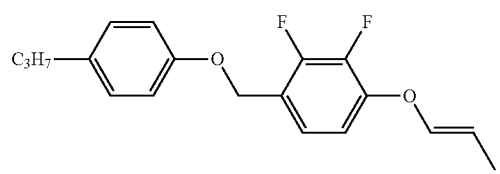 |
| 97 | 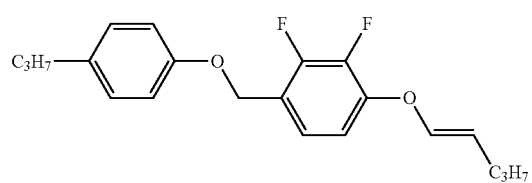 |

| No. |
|---|
| 98 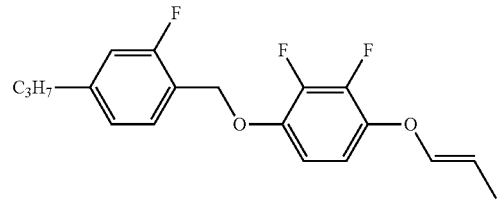 |
| 99 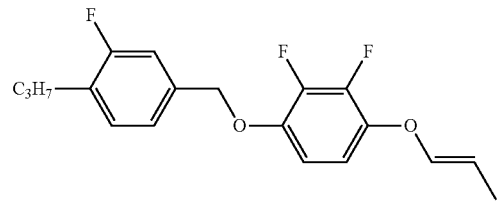 |
| 100 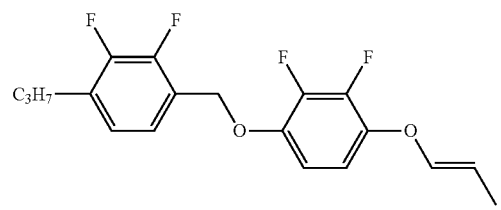 |
| 101 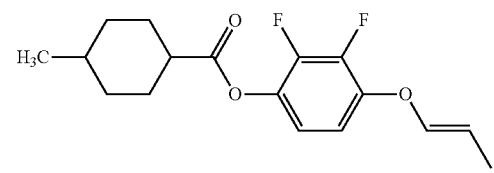 [SMILES: C/C=C/Oc1ccc(OC(=O)C2CCC(C)CC2)c(F)c1F] |
| 102 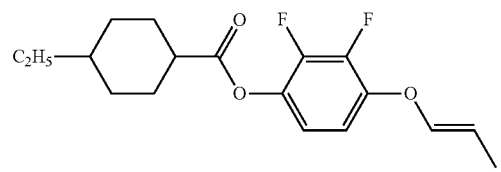 |
| 103 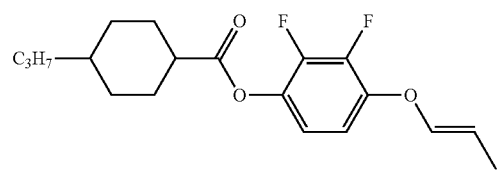 |
| 104 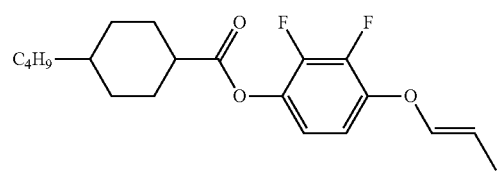 |
| 105 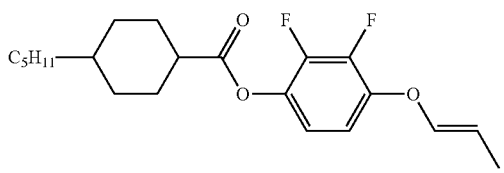 |

-continued
| No. | |
|---|---|
| 106 | 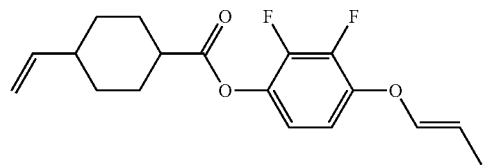 [SMILES: C=CC1CCC(C(=O)Oc2ccc(O/C=C/C)c(F)c2F)CC1] |
| 107 | 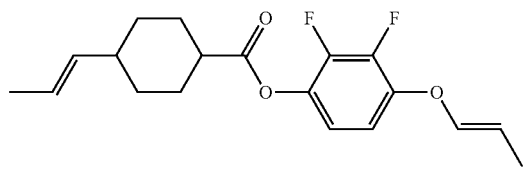 [SMILES: C/C=C/Oc1ccc(OC(=O)C2CCC(/C=C/C)CC2)c(F)c1F] |
| 108 | 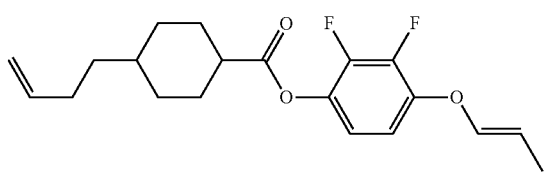 [SMILES: C=CCCC1CCC(C(=O)Oc2ccc(O/C=C/C)c(F)c2F)CC1] |
| 109 | 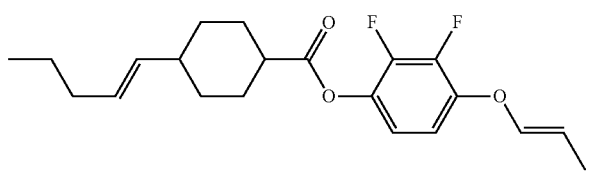 |
| 110 | 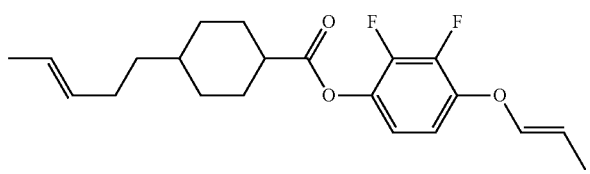 [SMILES: C/C=C/CCC1CCC(C(=O)Oc2ccc(O/C=C/C)c(F)c2F)CC1] |
| 111 | 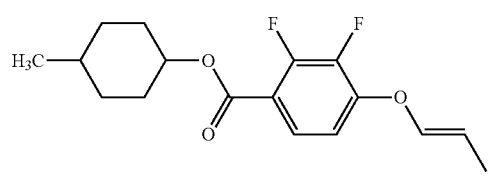 [SMILES: C/C=C/Oc1ccc(C(=O)OC2CCC(C)CC2)c(F)c1F] |
| 112 | 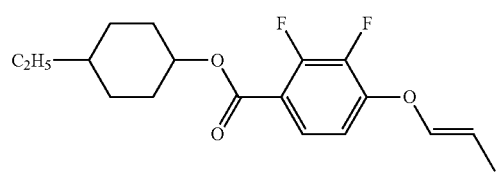 |
| 113 | 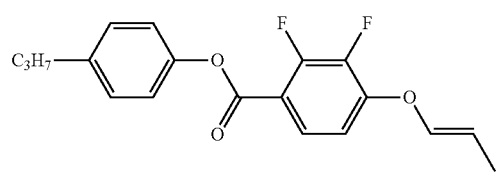 |
| 114 | 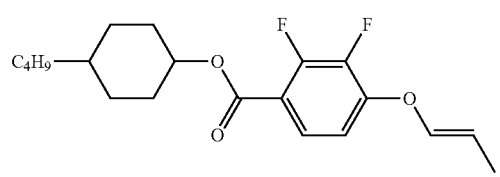 [SMILES: C/C=C/Oc1ccc(C(=O)OC2CCC(CC)CC2)c(F)c1F] |

-continued
| No. | |
|---|---|
| 115 | 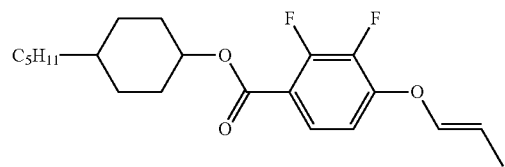 |
| 116 | 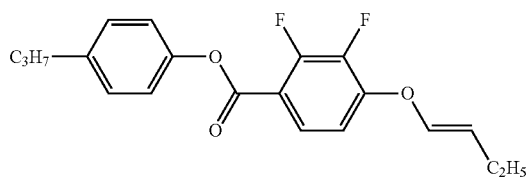 |
| 117 | 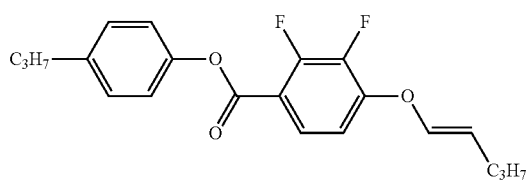 |
| 118 | 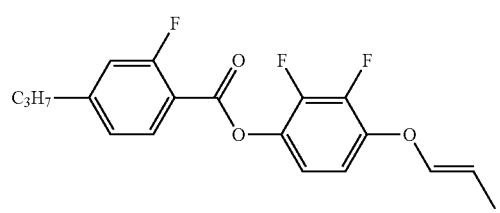 |
| 119 | 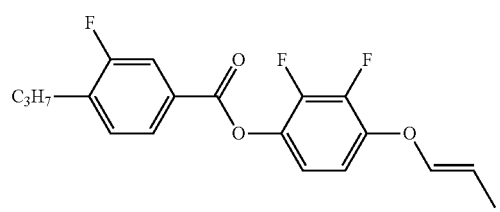 |
| 120 | 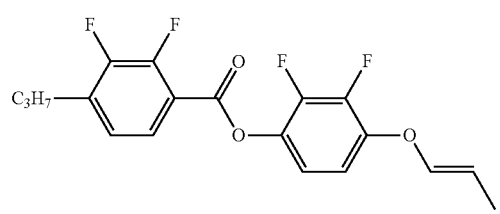 |
| 121 | 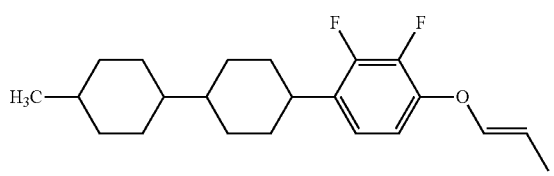 [SMILES: C/C=C/Oc1ccc(C2CCC(C3CCC(C)CC3)CC2)c(F)c1F] |
| 122 | 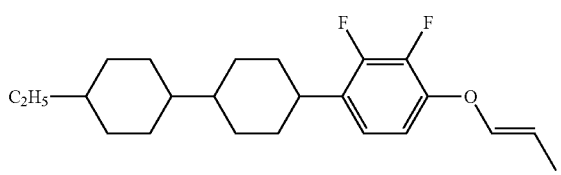 |

| No. |
|---|
| 123 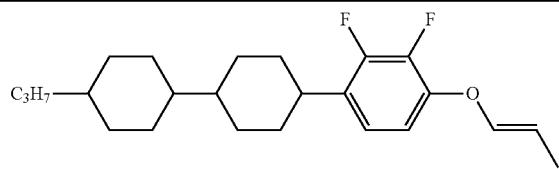 |
| 124 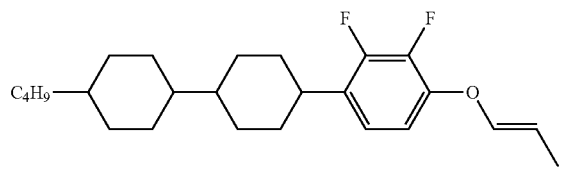 [SMILES: C/C=C/Oc1ccc(C2CCC(C3CCC(CC)CC3)CC2)c(F)c1F] |
| 125 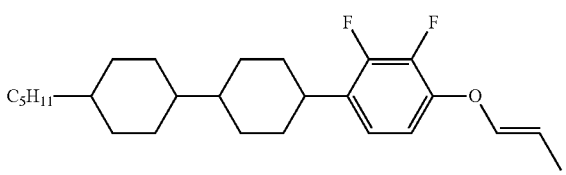 |
| 126 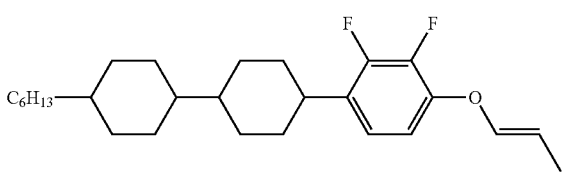 |
| 127 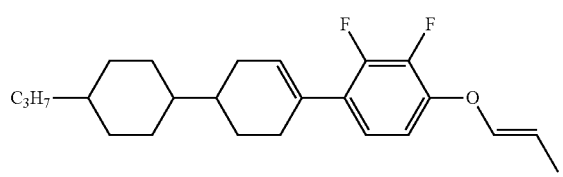 |
| 128 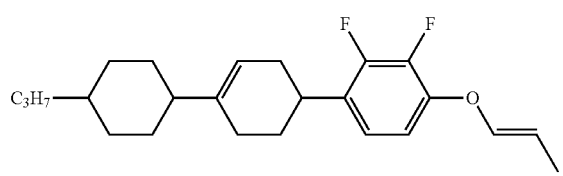 |
| 129 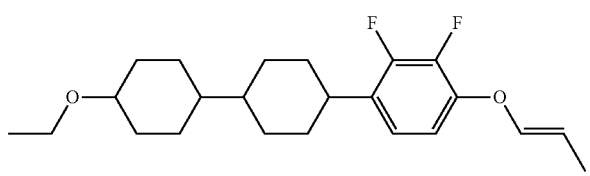 |
| 130 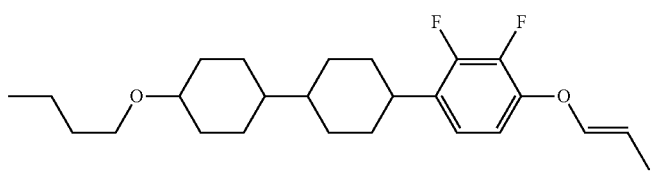 [SMILES: C/C=C/Oc1ccc(C2CCC(C3CCC(OCCCC)CC3)CC2)c(F)c1F] |
| 131 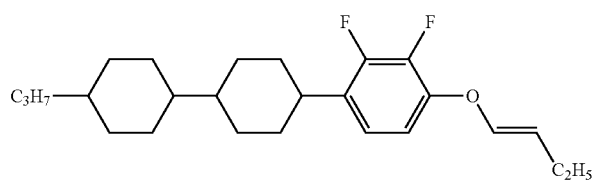 |

| No. | |
|---|---|
| 132 | 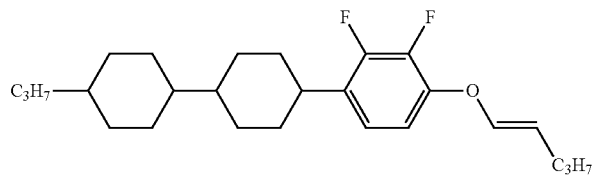 |
| 133 | 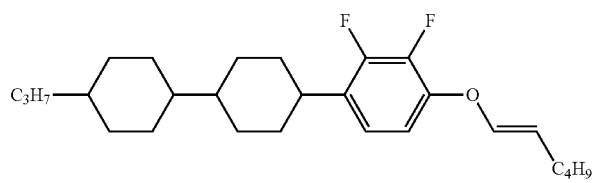 |
| 134 | 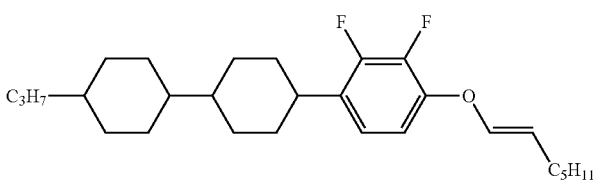 |
| 135 | 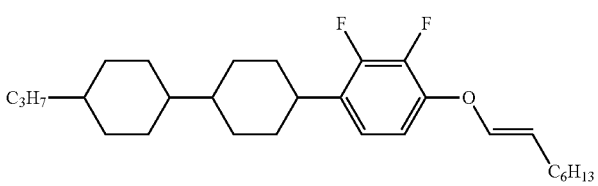 |
| 136 | 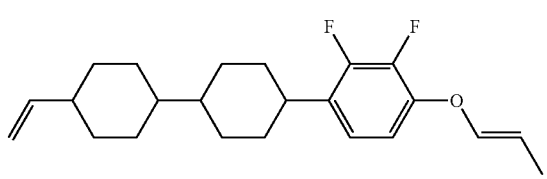<br>C 78.4 N 127.4 I<br>$T_{NI}$; 100.6 Δn; 0.123, Δε; -4.6, η; 68.0 |
| 137 | 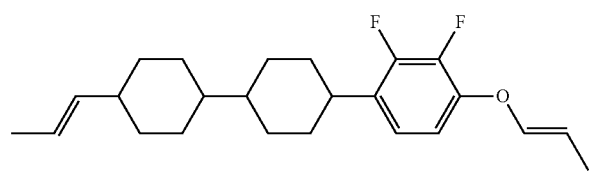 [SMILES: C/C=C/Oc1ccc(C2CCC(C3CCC(/C=C/C)CC3)CC2)c(F)c1F] |
| 138 | 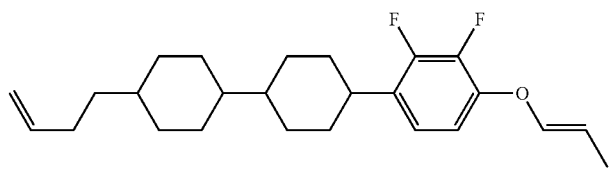 [SMILES: C=CCCC1CCC(C2CCC(c3ccc(O/C=C/C)c(F)c3F)CC2)CC1] |
| 139 | 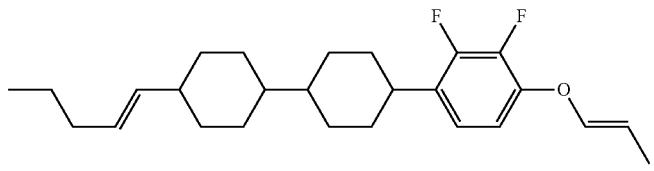 |

-continued
| No. | |
|---|---|
| 140 | 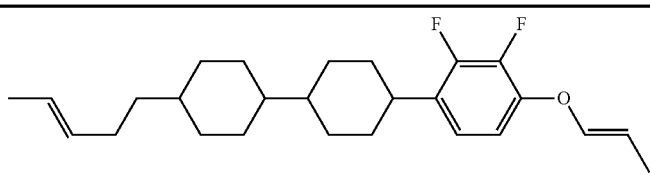 |
| 141 | 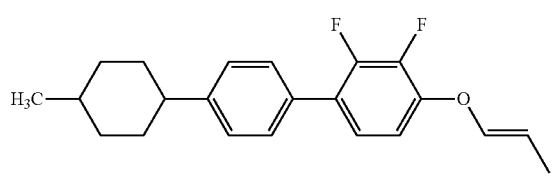 [SMILES: C/C=C/Oc1ccc(-c2ccc(C3CCC(C)CC3)cc2)c(F)c1F] |
| 142 | 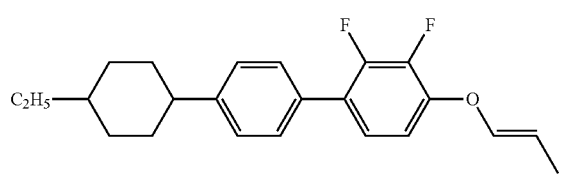 |
| 143 | 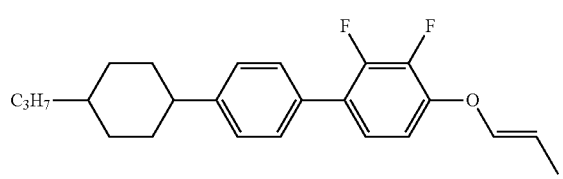 |
| 144 | 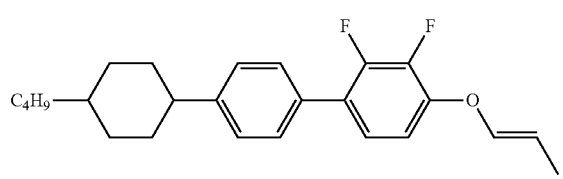 |
| 145 | 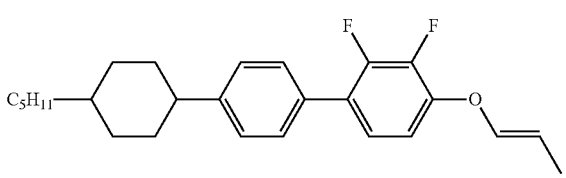 |
| 146 | 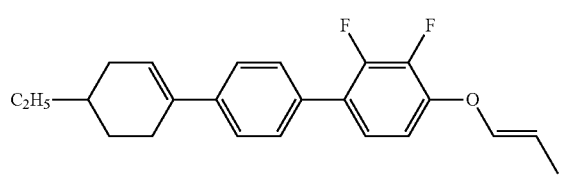 |
| 147 | 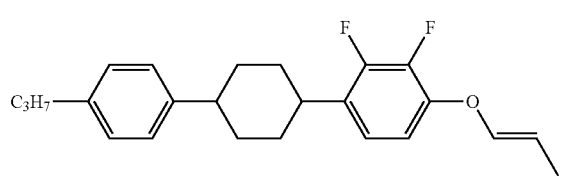 |
| 148 | 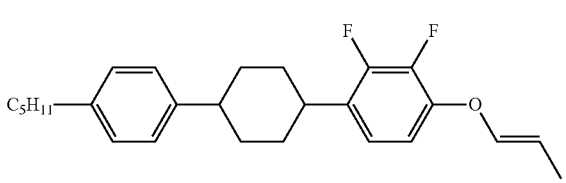 |

-continued
| No. | |
|---|---|
| 149 | 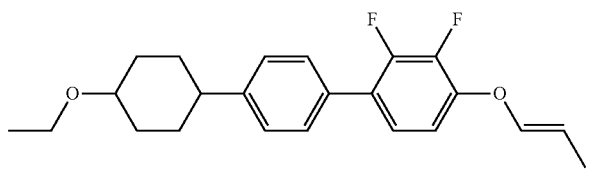 [SMILES: C/C=C/Oc1ccc(-c2ccc(C3CCC(OCC)CC3)cc2)c(F)c1F] |
| 150 | 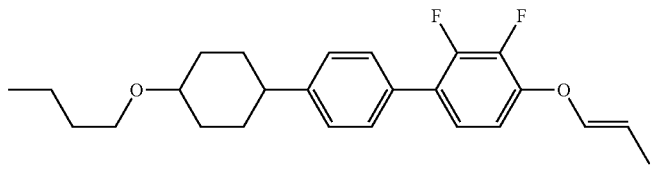 |
| 151 | 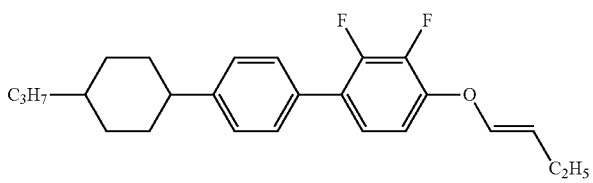 |
| 152 | 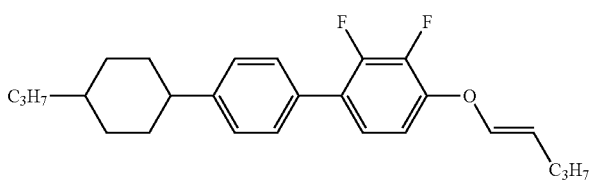 |
| 153 | 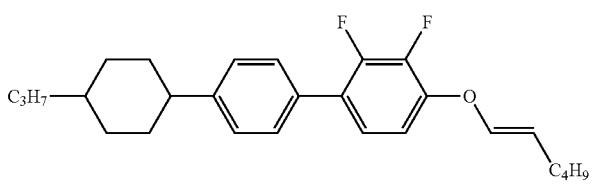 |
| 154 | 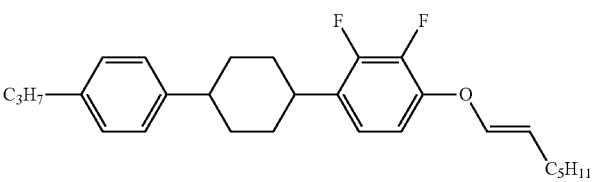 |
| 155 | 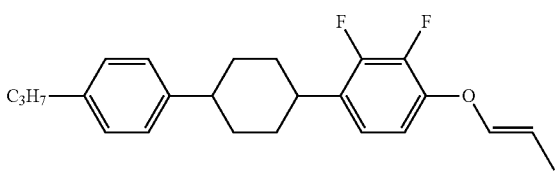 |
| 156 | 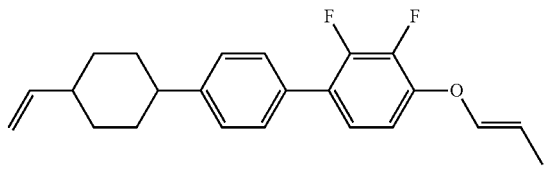 |

| No. | |
|---|---|
| 157 | 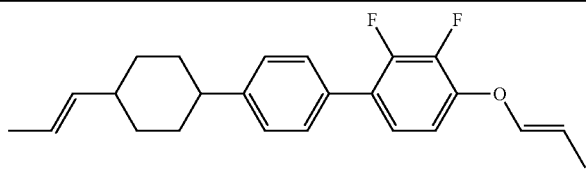 |
| 158 | 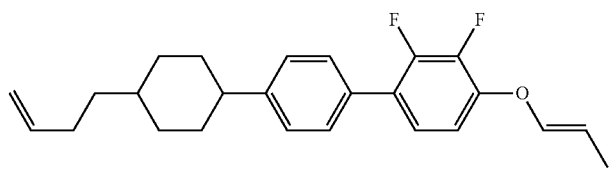 [SMILES: C=CCCC1CCC(c2ccc(-c3ccc(O/C=C/C)c(F)c3F)cc2)CC1] |
| 159 | 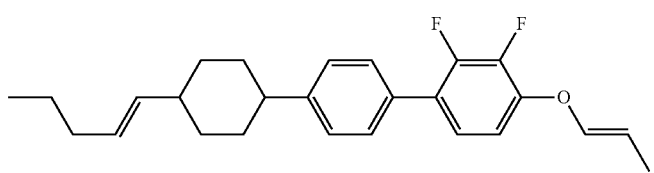 |
| 160 | 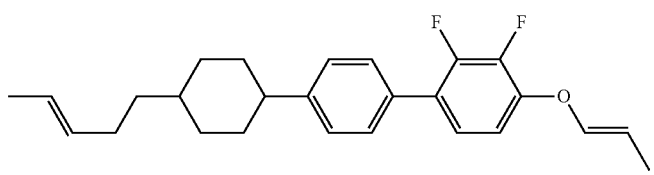 [SMILES: C/C=C/CCC1CCC(c2ccc(-c3ccc(O/C=C/C)c(F)c3F)cc2)CC1] |
| 161 | 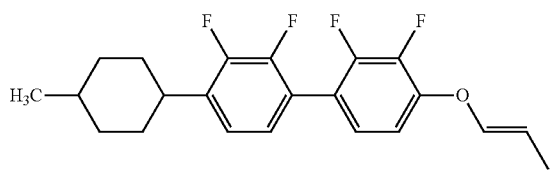 [SMILES: C/C=C/Oc1ccc(-c2ccc(C3CCC(C)CC3)c(F)c2F)c(F)c1F] |
| 162 | 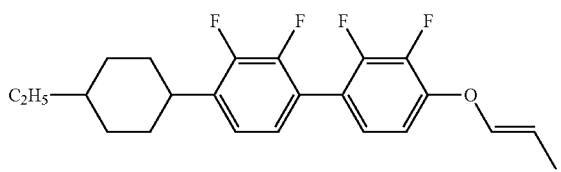 |
| 163 | 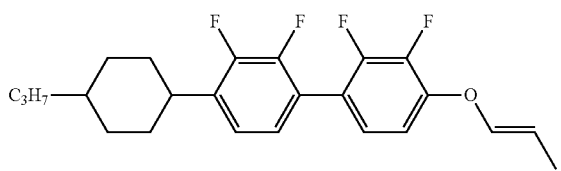 |
| 164 | 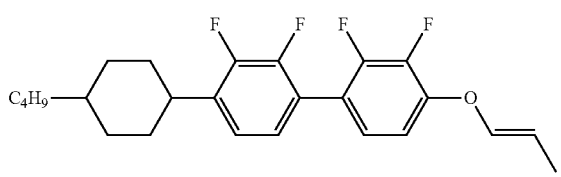 [SMILES: C/C=C/Oc1ccc(-c2ccc(C3CCC(CC)CC3)c(F)c2F)c(F)c1F] |
| 165 | 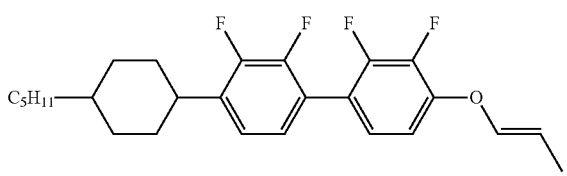 |

| No. | |
|---|---|
| 166 | 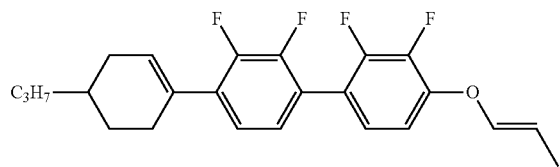 |
| 167 | 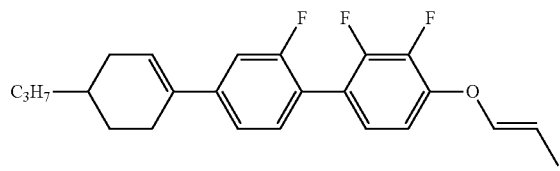 |
| 168 | 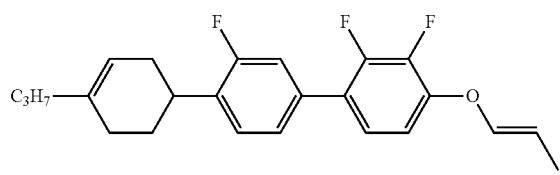 |
| 169 | 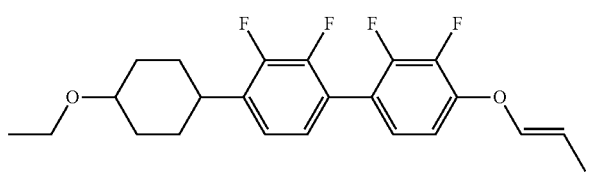 [SMILES: C/C=C/Oc1ccc(-c2ccc(C3CCC(OCC)CC3)c(F)c2F)c(F)c1F] |
| 170 | 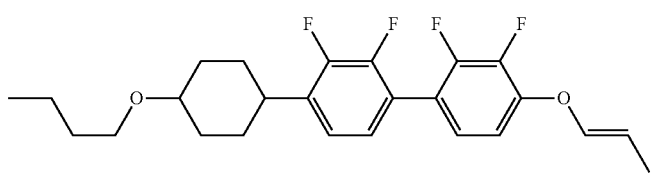 |
| 171 | 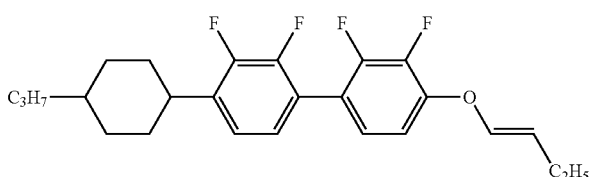 |
| 172 | 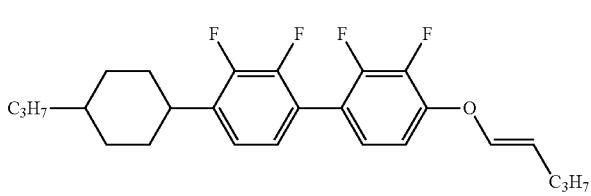 |
| 173 | 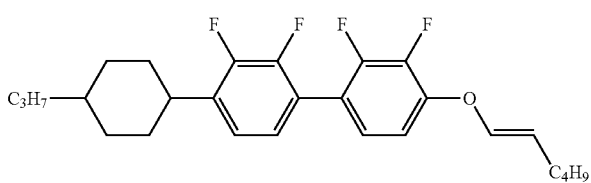 |

| No. | |
|---|---|
| 174 | 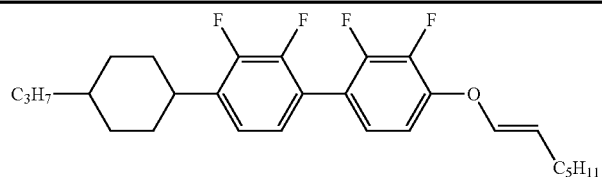 |
| 175 | 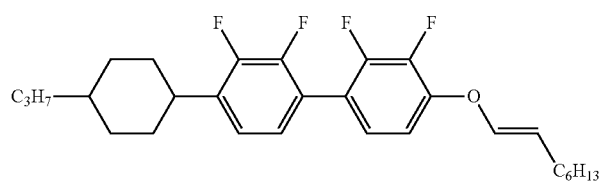 |
| 176 | 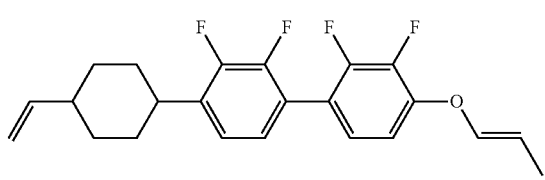 [SMILES: C=CC1CCC(c2ccc(-c3ccc(O/C=C/C)c(F)c3F)c(F)c2F)CC1] |
| 177 | 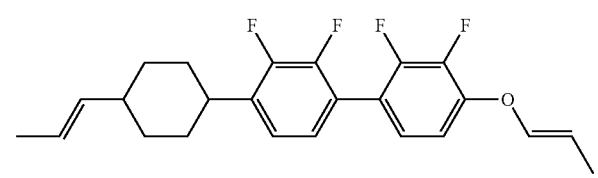 [SMILES: C/C=C/Oc1ccc(-c2ccc(C3CCC(/C=C/C)CC3)c(F)c2F)c(F)c1F] |
| 178 | 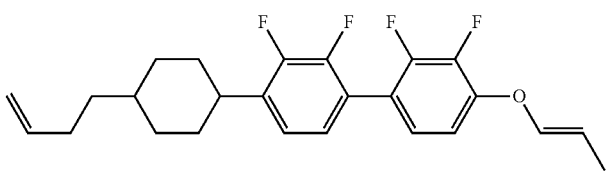 [SMILES: C=CCCC1CCC(c2ccc(-c3ccc(O/C=C/C)c(F)c3F)c(F)c2F)CC1] |
| 179 | 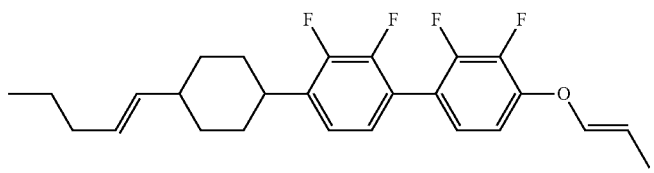 [SMILES: C/C=C/CCC1CCC(c2ccc(-c3ccc(O/C=C/C)c(F)c3F)c(F)c2F)CC1] |
| 180 | 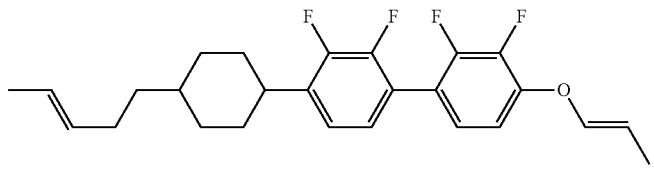 |
| 181 | 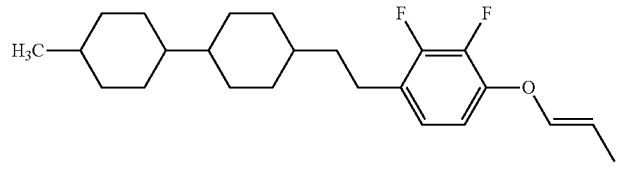 |
| 182 | 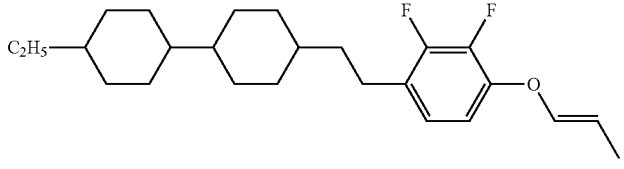 |

-continued
| No. |  |
|---|---|
| 183 | 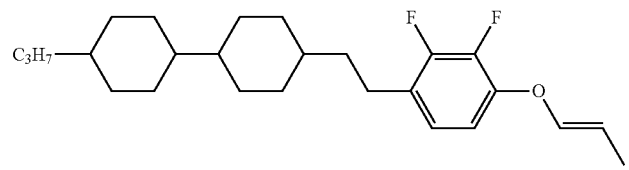 |
| 184 | 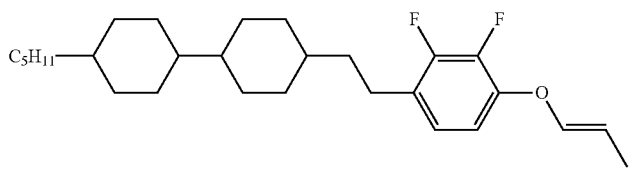 |
| 185 | 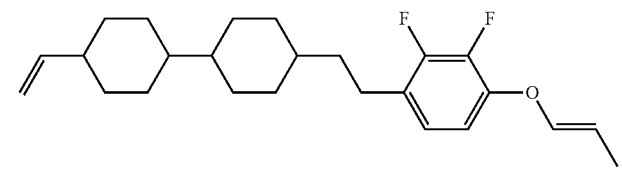 |
| 186 | 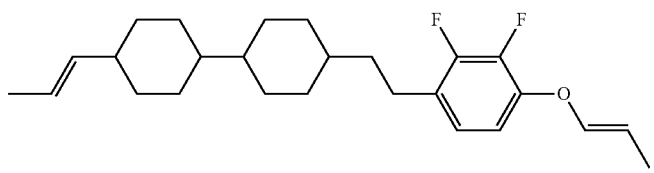 |
| 187 | 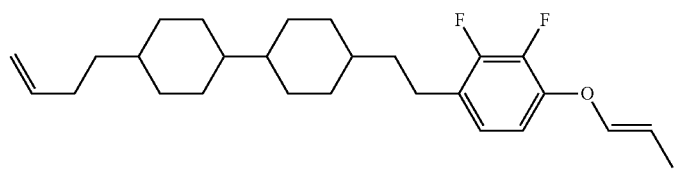 |
| 188 | 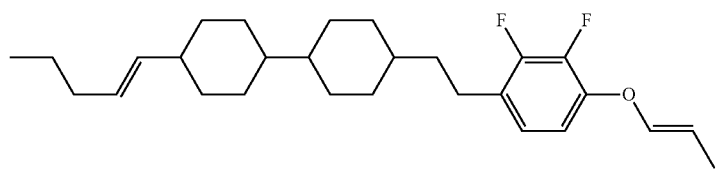 |
| 189 | 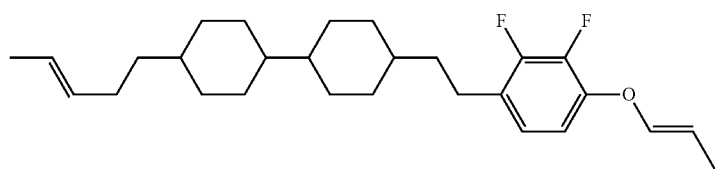 [SMILES: C/C=C/CCC1CCC(C2CCC(CCc3ccc(O/C=C/C)c(F)c3F)CC2)CC1] |
| 190 | 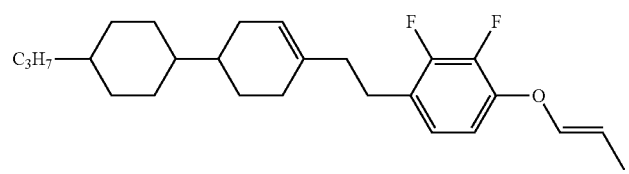 |
| 191 | 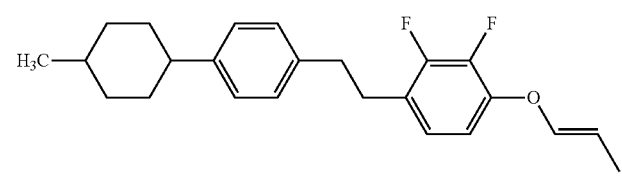 |

-continued
| No. | |
|---|---|
| 192 | 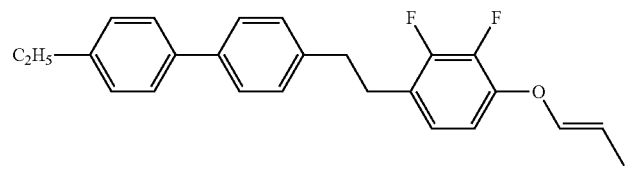 [SMILES: C/C=C/Oc1ccc(CCc2ccc(-c3ccc(CC)cc3)cc2)c(F)c1F] |
| 193 | 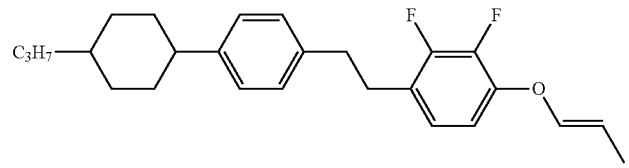 |
| 194 | 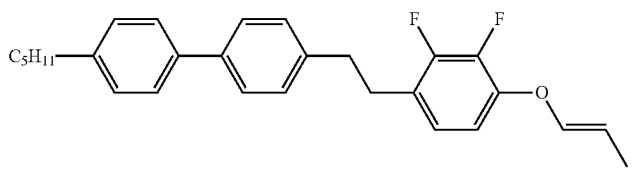 |
| 195 | 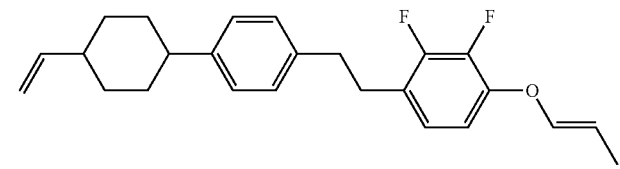 |
| 196 | 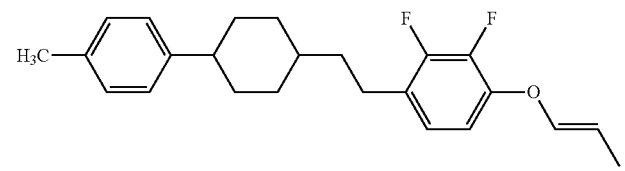 |
| 197 | 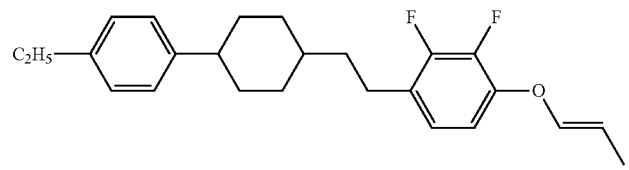 |
| 198 | 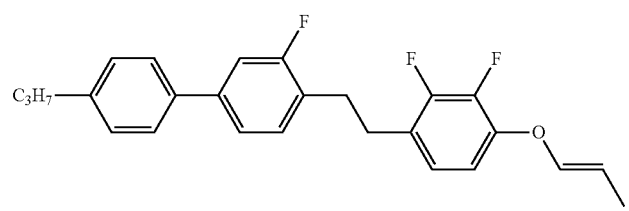 |
| 199 | 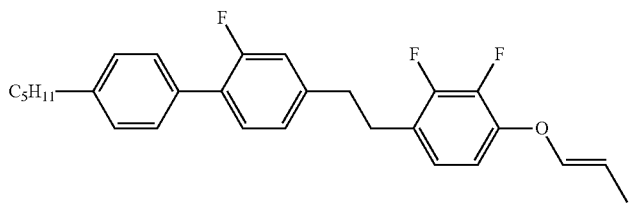 |

-continued
| No. |  |
| --- | --- |
| 200 | 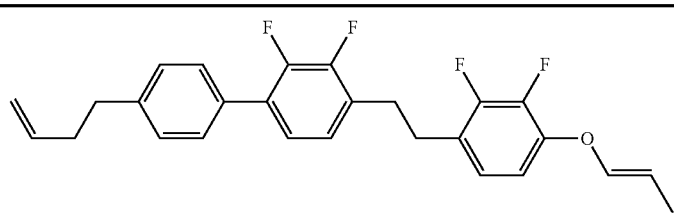 |
| 201 | 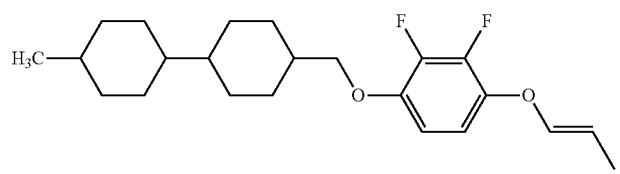 |
| 202 | 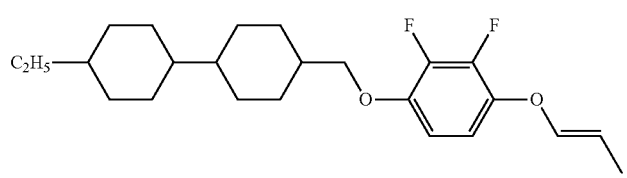 |
| No. |  |
| --- | --- |
| 203 | 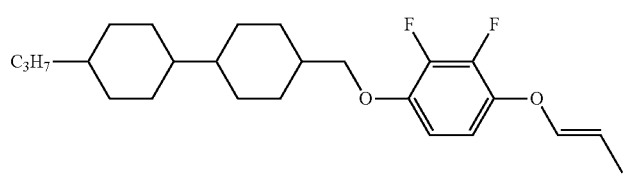
C 104.2 N 134.7 I
$T_{NI}$; 118.6, Δ n; 0.107, Δ ε; -6.6, η; 67.6 |
| 204 | 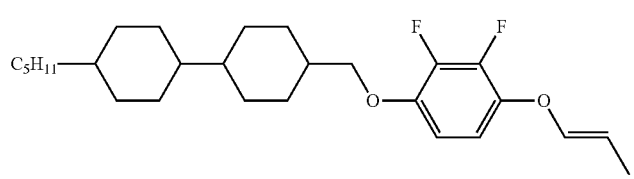 |
| 205 | 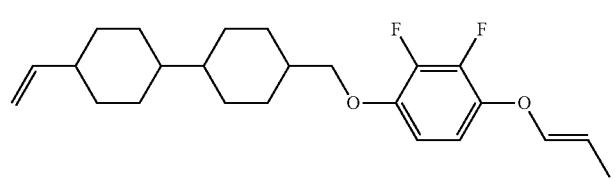 |
| 206 | 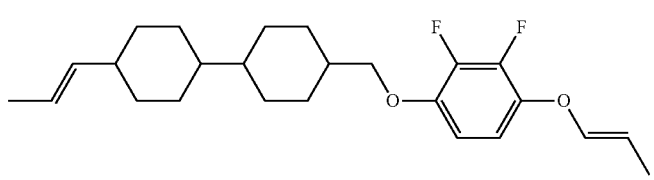 [SMILES: C/C=C/Oc1ccc(OCC2CCC(C3CCC(/C=C/C)CC3)CC2)c(F)c1F] |
| 207 | 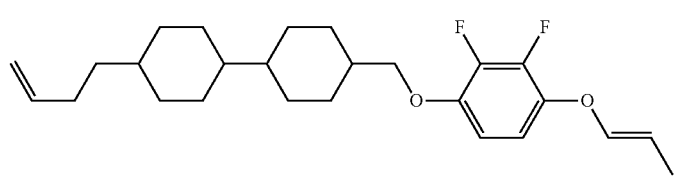 |

-continued
| No. | |
|---|---|
| 208 | 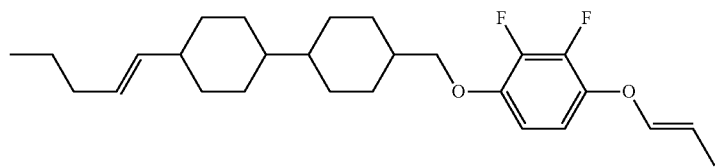 |
| 209 | 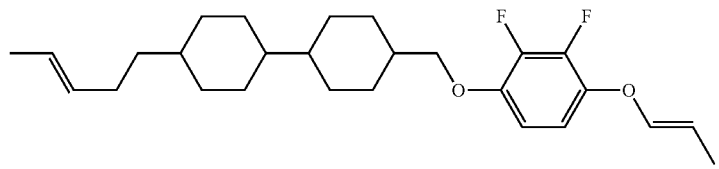 |
| 210 | 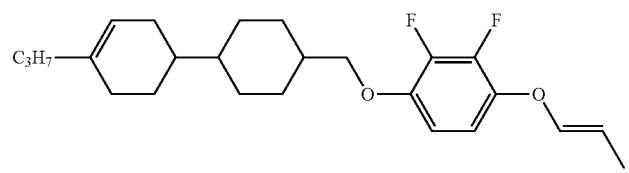 |
| 211 | 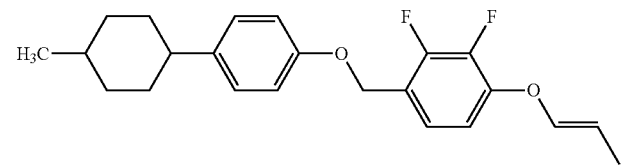 [SMILES: C/C=C/Oc1ccc(COc2ccc(C3CCC(C)CC3)cc2)c(F)c1F] |
| 212 | 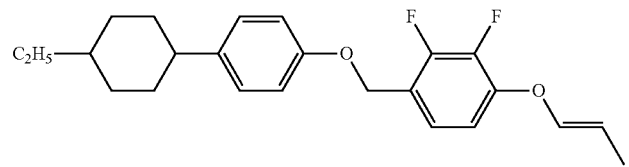 |
| 213 | 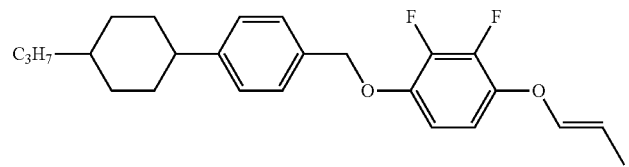 |
| 214 | 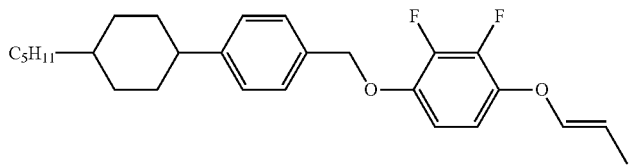 |
| 215 | 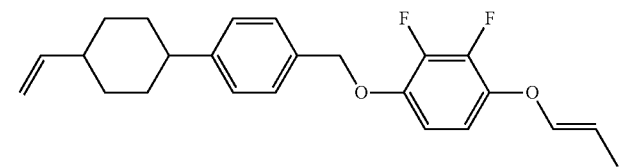 [SMILES: C=CC1CCC(c2ccc(COc3ccc(O/C=C/C)c(F)c3F)cc2)CC1] |
| 216 | 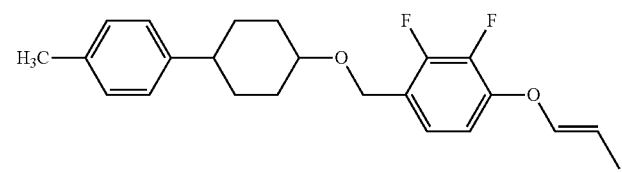 |

| No. | |
|---|---|
| 217 | 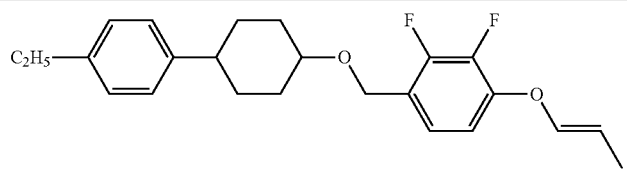 |
| 218 | 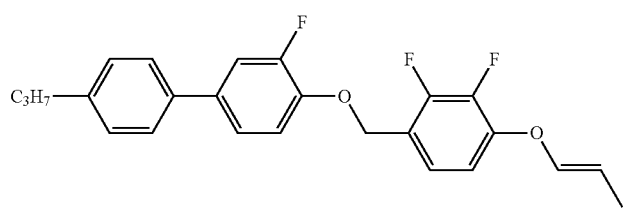 |
| 219 | 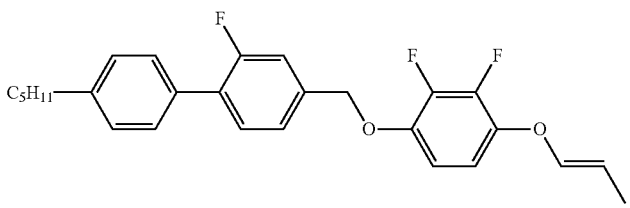 |
| 220 | 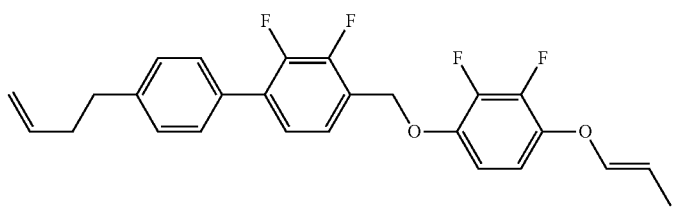 |
| 221 | 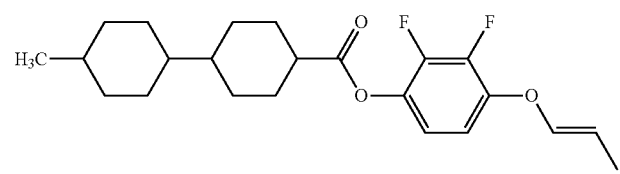 [SMILES: C/C=C/Oc1ccc(OC(=O)C2CCC(C3CCC(C)CC3)CC2)c(F)c1F] |
| 222 | 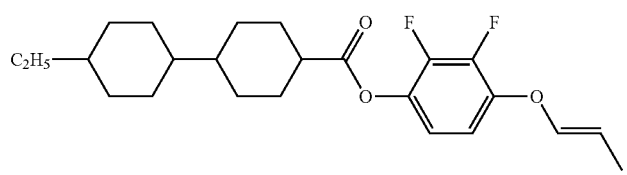 [SMILES: C/C=C/Oc1ccc(OC(=O)C2CCC(C3CCC(CC)CC3)CC2)c(F)c1F] |
| 223 | 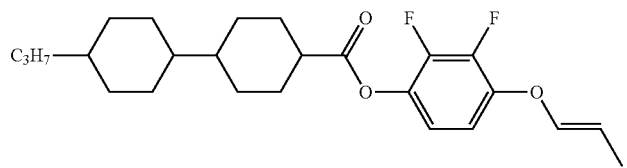 |
| 224 | 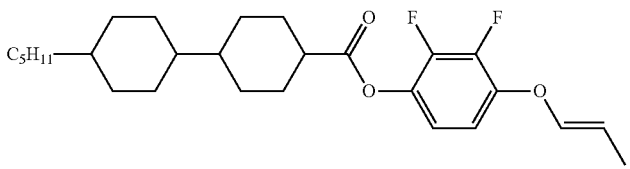 |

-continued
| No. | |
|---|---|
| 225 | 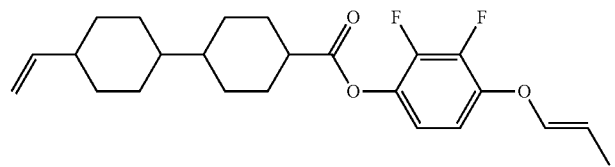 [SMILES: C=CC1CCC(C2CCC(C(=O)Oc3ccc(O/C=C/C)c(F)c3F)CC2)CC1] |
| 226 | 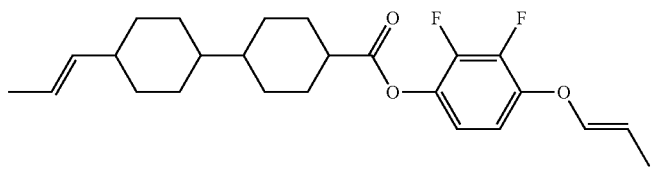 [SMILES: C/C=C/Oc1ccc(OC(=O)C2CCC(C3CCC(/C=C/C)CC3)CC2)c(F)c1F] |
| 227 | 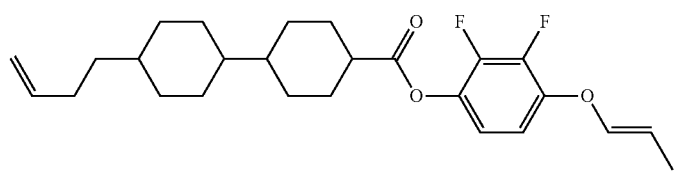 [SMILES: C=CCCC1CCC(C2CCC(C(=O)Oc3ccc(O/C=C/C)c(F)c3F)CC2)CC1] |
| 228 | 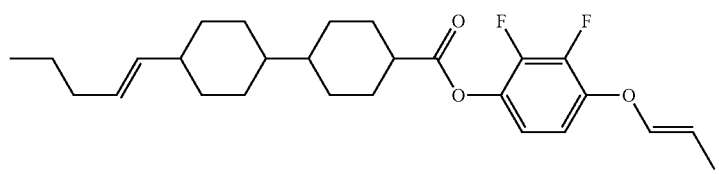 [SMILES: C/C=C/Oc1ccc(OC(=O)C2CCC(C3CCC(/C=C/CCC)CC3)CC2)c(F)c1F] |
| 229 | 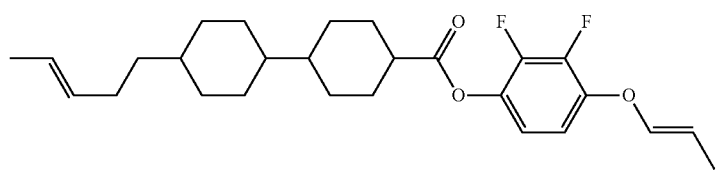 [SMILES: C/C=C/CCC1CCC(C2CCC(C(=O)Oc3ccc(O/C=C/C)c(F)c3F)CC2)CC1] |
| 230 | 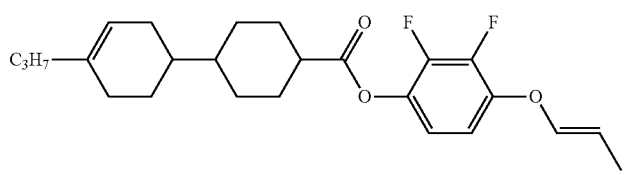 |
| 231 | 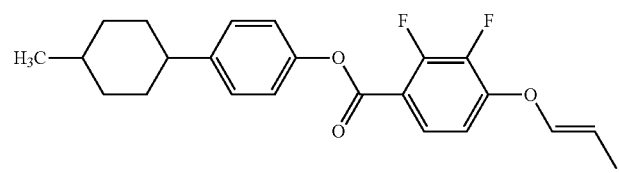 [SMILES: C/C=C/Oc1ccc(C(=O)Oc2ccc(C3CCC(C)CC3)cc2)c(F)c1F] |
| 232 | 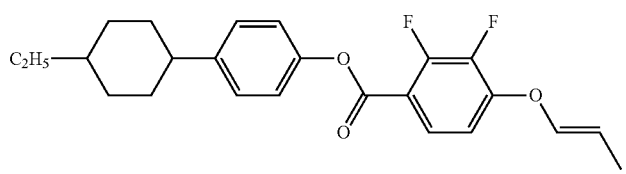 |
| 233 | 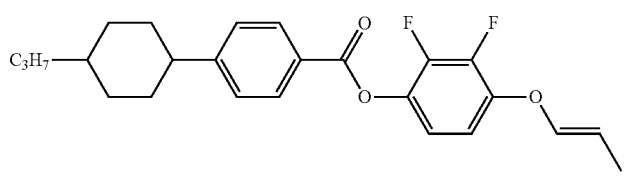 |

| No. | |
|---|---|
| 234 | 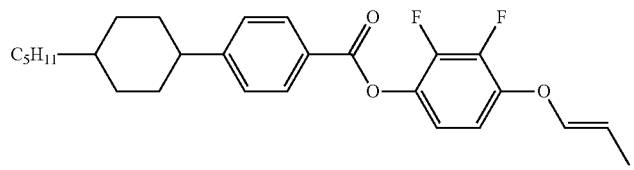 |
| 235 | 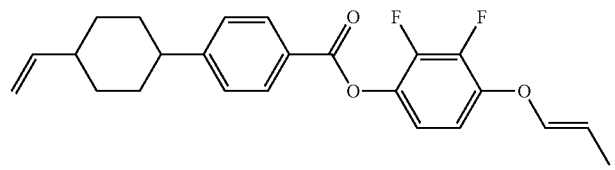 [SMILES: C=CC1CCC(c2ccc(C(=O)Oc3ccc(O/C=C/C)c(F)c3F)cc2)CC1] |
| 236 | 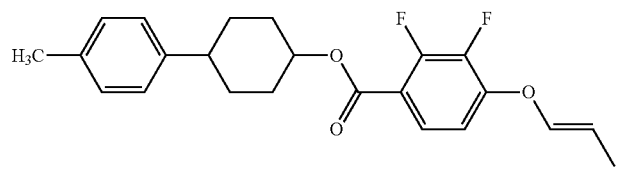 [SMILES: C/C=C/Oc1ccc(C(=O)OC2CCC(c3ccc(C)cc3)CC2)c(F)c1F] |
| 237 | 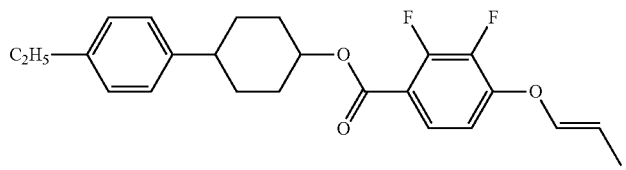 [SMILES: C/C=C/Oc1ccc(C(=O)OC2CCC(c3ccc(CC)cc3)CC2)c(F)c1F] |
| 238 | 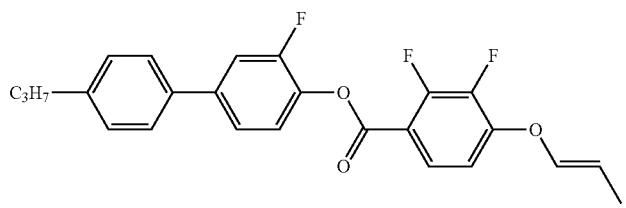 |
| 239 | 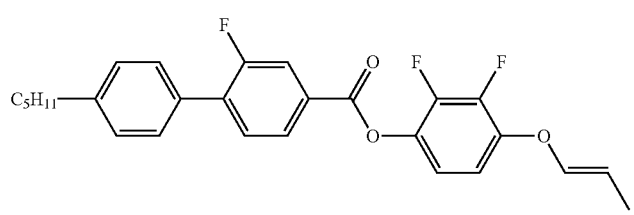 |
| 240 | 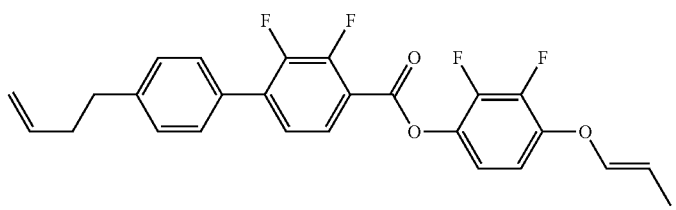 [SMILES: C=CCCc1ccc(-c2ccc(C(=O)Oc3ccc(O/C=C/C)c(F)c3F)c(F)c2F)cc1] |
| 241 | 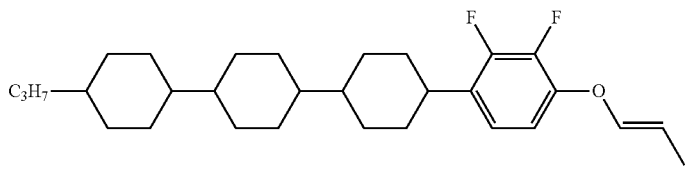 |

-continued
| No. | |
|---|---|
| 242 | 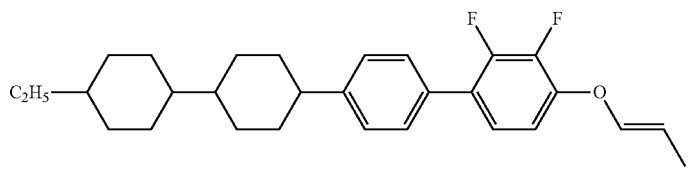 |
| 243 | 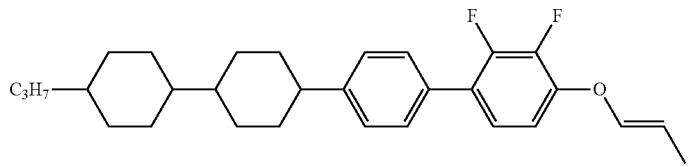 |
| 244 | 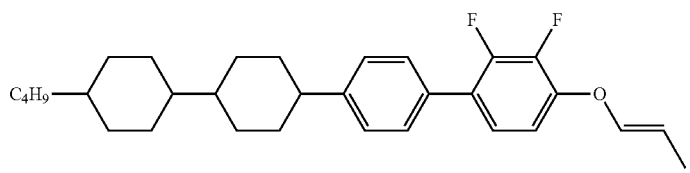 |
| 245 | 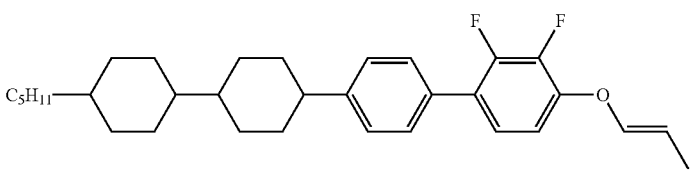 |
| 246 | 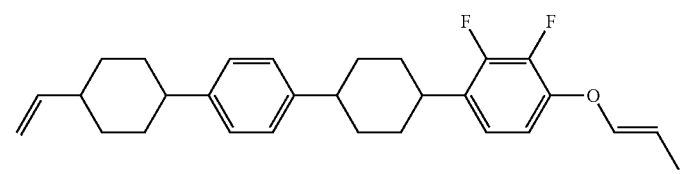 [SMILES: C=CC1CCC(c2ccc(C3CCC(c4ccc(O/C=C/C)c(F)c4F)CC3)cc2)CC1] |
| 247 | 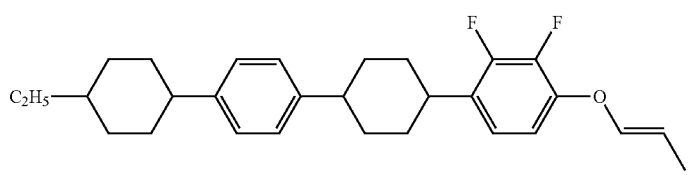 [SMILES: C/C=C/Oc1ccc(C2CCC(c3ccc(C4CCC(CC)CC4)cc3)CC2)c(F)c1F] |
| 248 | 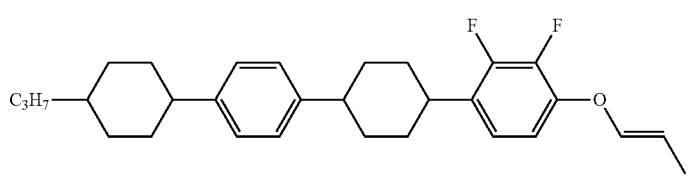 |
| 249 | 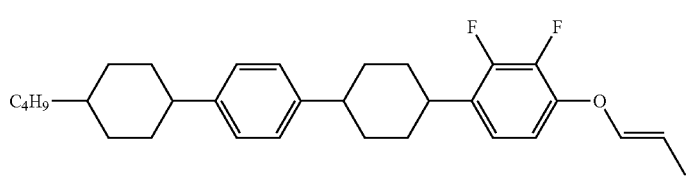 |
| 250 | 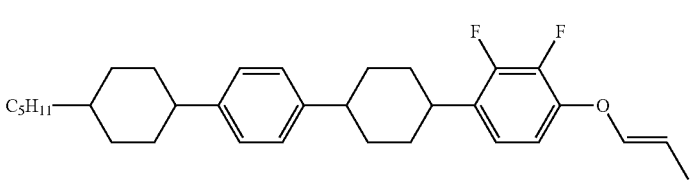 |

| No. | |
|---|---|
| 251 | 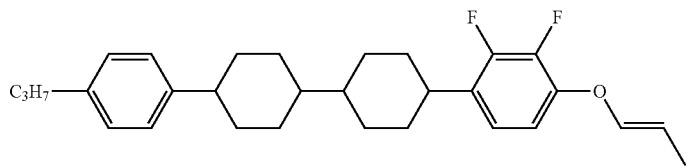 |
| 252 | 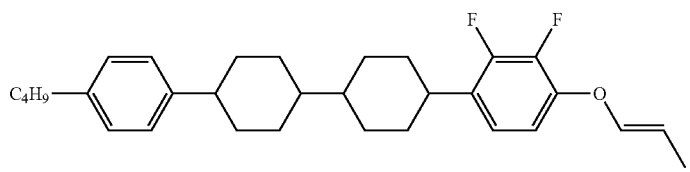 |
| 253 | 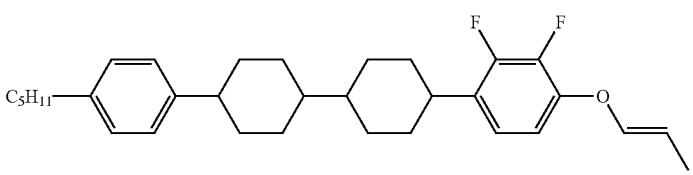 |
| 254 | 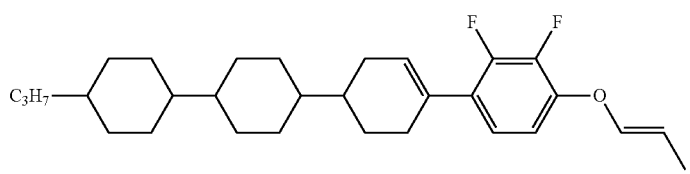 |
| 255 | 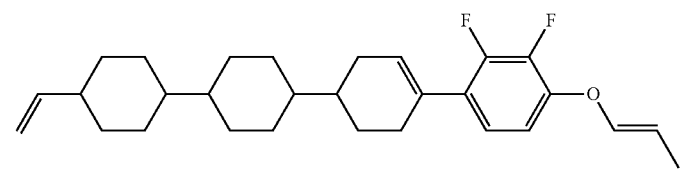 [SMILES: C=CC1CCC(C2CCC(C3CC=C(c4ccc(O/C=C/C)c(F)c4F)CC3)CC2)CC1] |
| 256 | 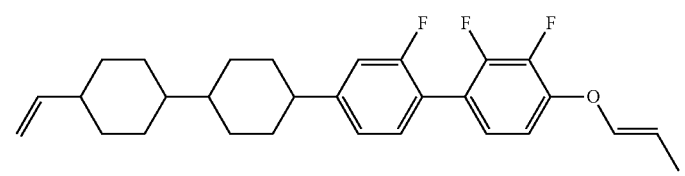 [SMILES: C=CC1CCC(C2CCC(c3ccc(-c4ccc(O/C=C/C)c(F)c4F)c(F)c3)CC2)CC1] |
| 257 | 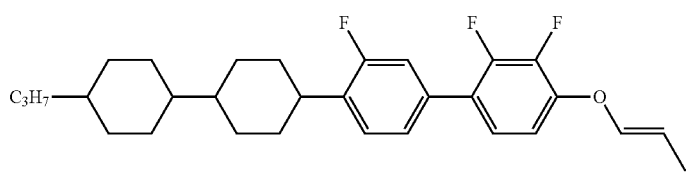 |
| 258 | 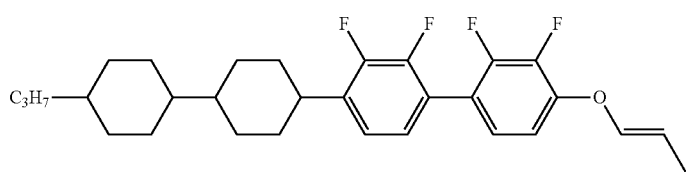 |
| 259 | 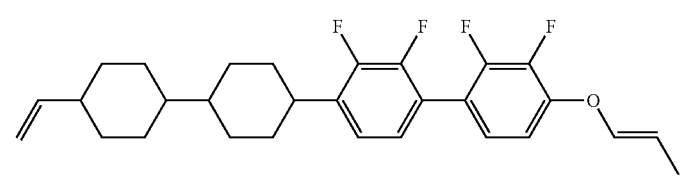 |

| No. | |
|---|---|
| 260 | 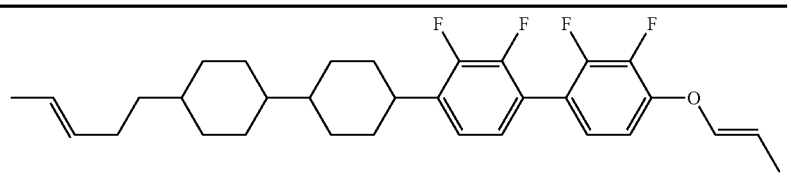 |
| 261 | 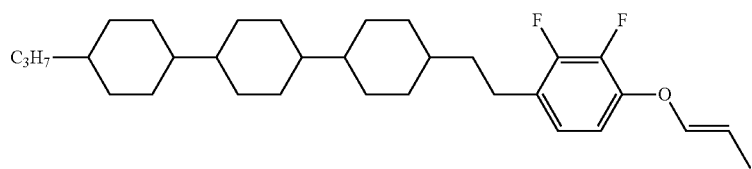 |
| 262 | 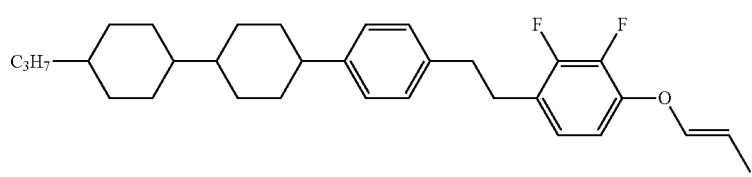 |
| 263 | 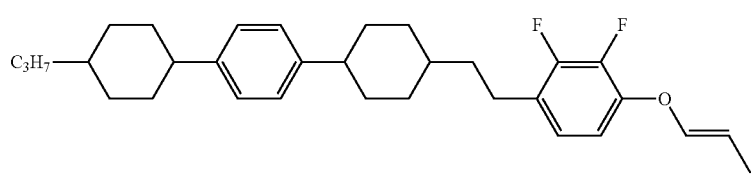 |
| 264 | 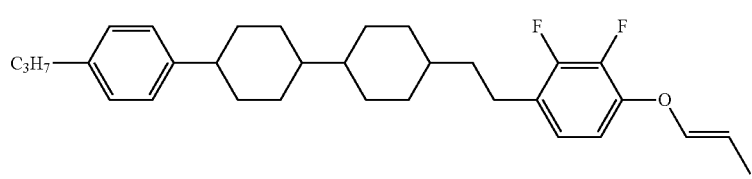 |
| 265 | 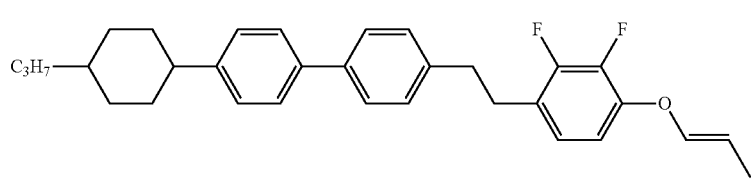 |
| 266 | 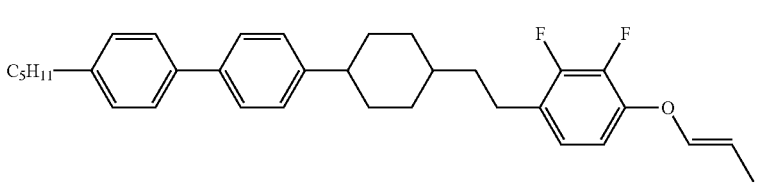 |
| 267 | 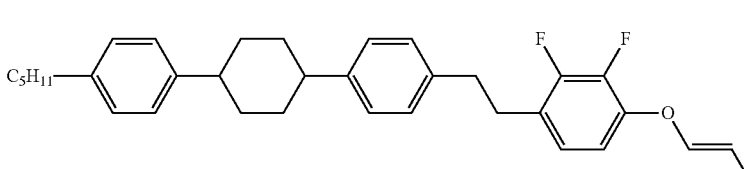 |
| 268 | 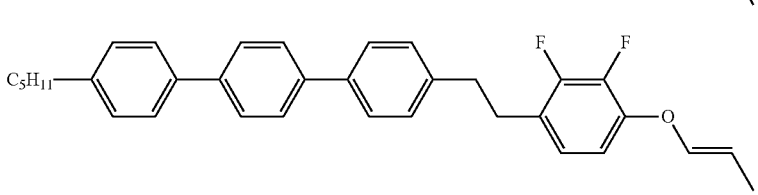 |

-continued
| No. | |
|---|---|
| 269 | 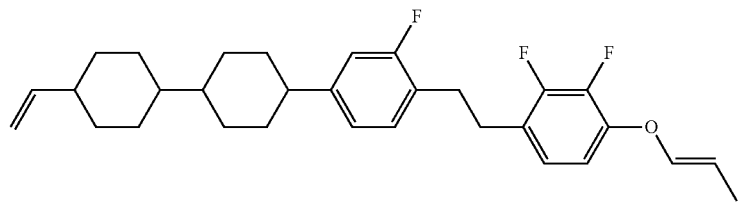 [SMILES: C=CC1CCC(C2CCC(c3ccc(CCc4ccc(O/C=C/C)c(F)c4F)c(F)c3)CC2)CC1] |
| 270 | 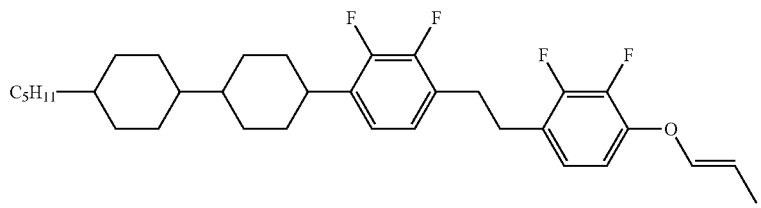 |
| 271 | 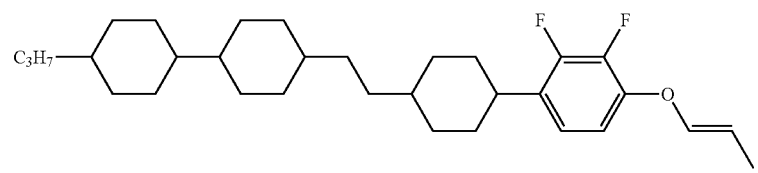 |
| 272 | 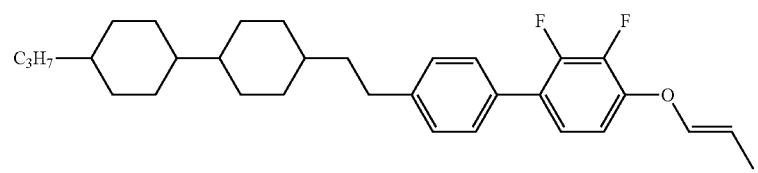 |
| 273 | 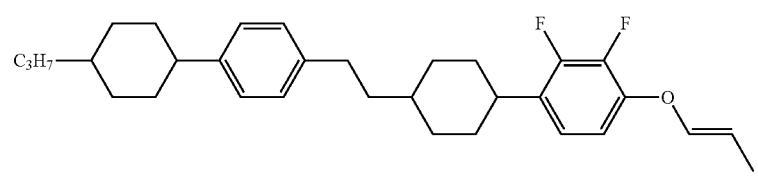 |
| 274 | 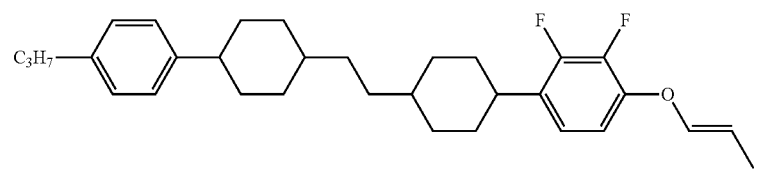 |
| 275 | 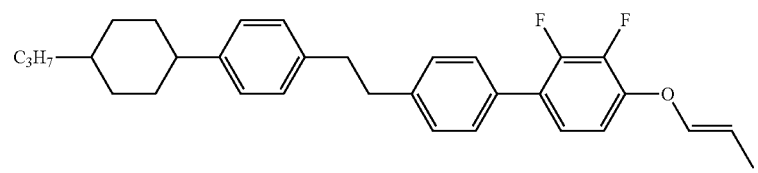 |
| 276 | 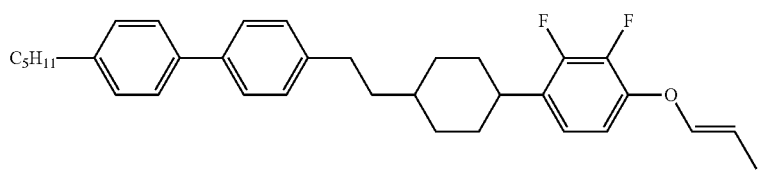 |

-continued
| No. | |
|---|---|
| 277 | 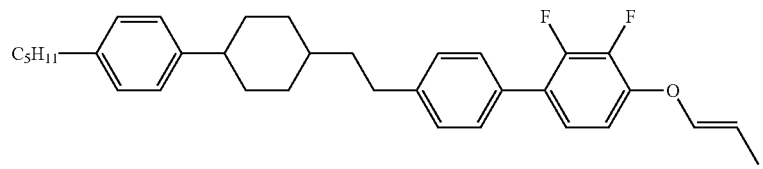 |
| 278 | 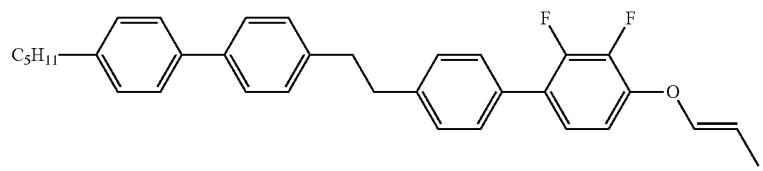 |
| 279 | 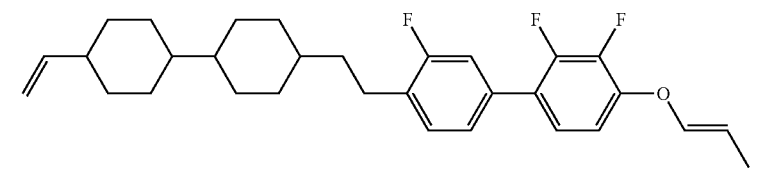 |
| 280 | 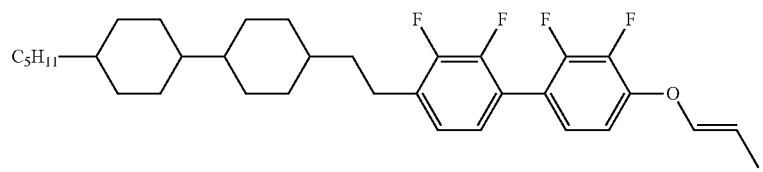 |
| 281 | 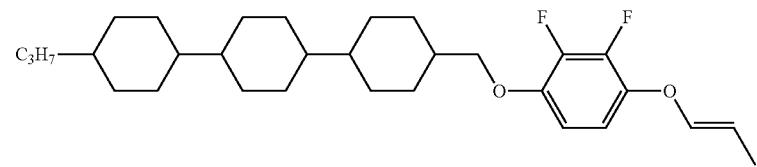 |
| 282 | 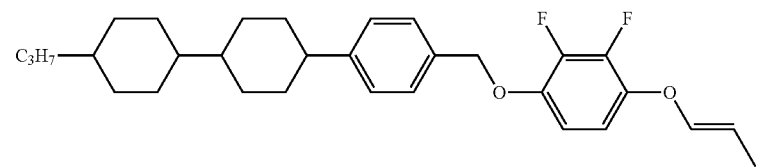 |
| 283 | 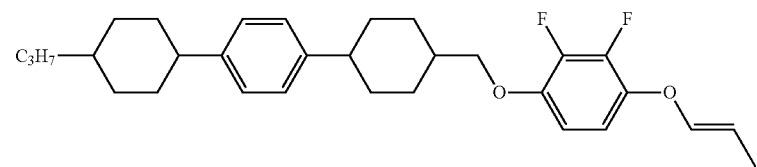 |
| 284 | 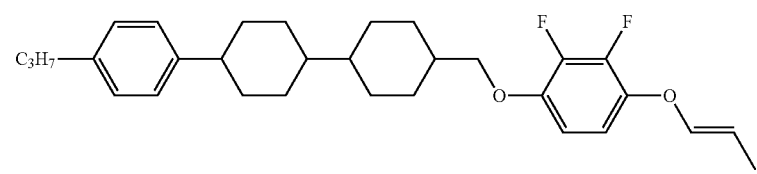 |
| 285 | 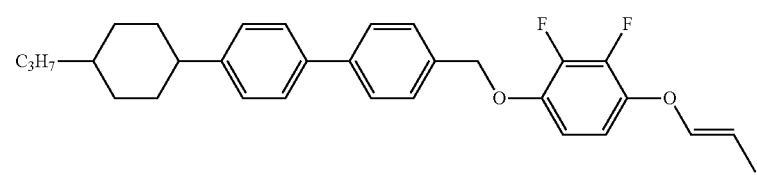 |

| No. |
| --- |
286
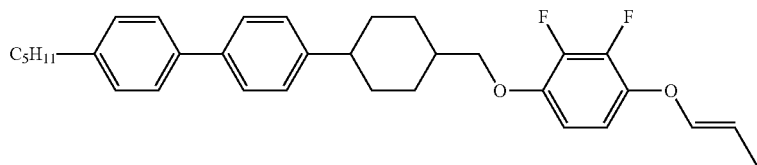
287
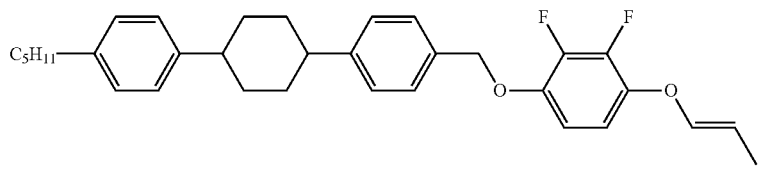
288
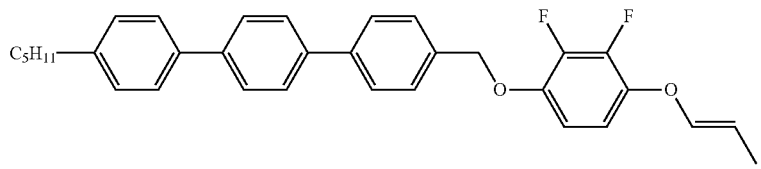
289
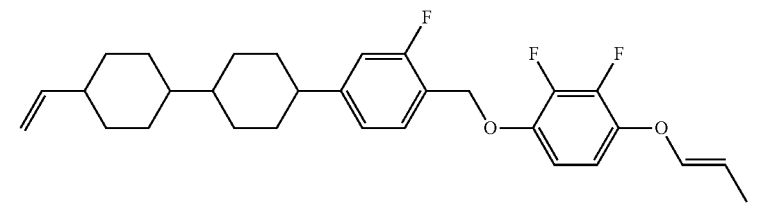
290
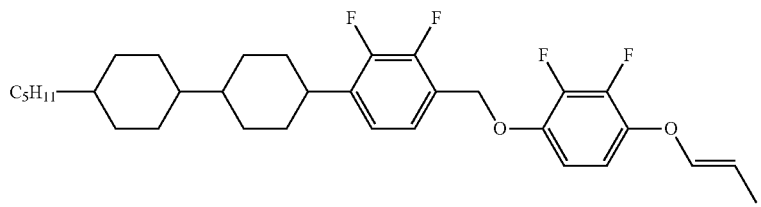
291
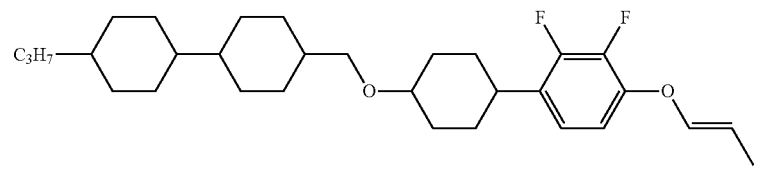
292
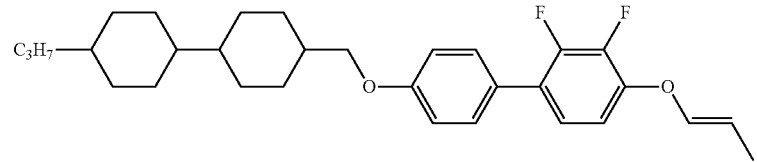
293
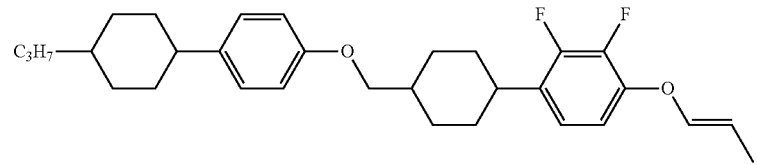

| No. | |
|---|---|
| 294 | 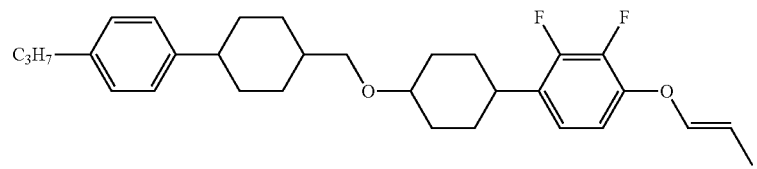 |
| 295 | 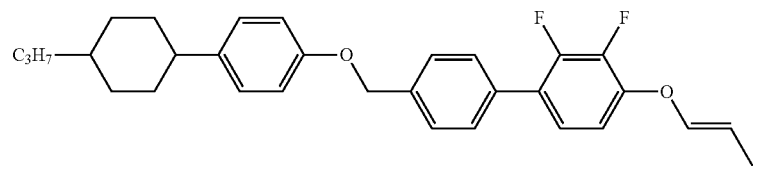 |
| 296 | 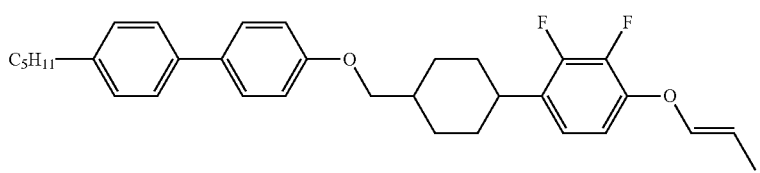 |
| 297 | 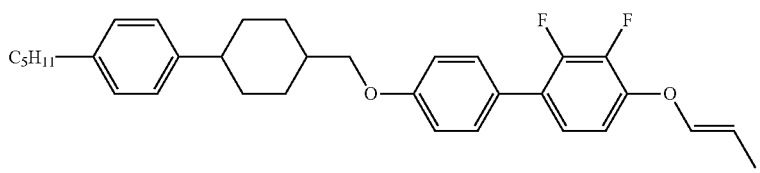 |
| 298 | 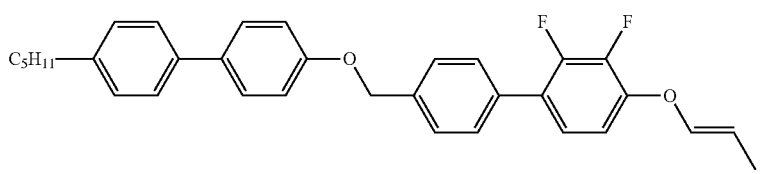 |
| 299 | 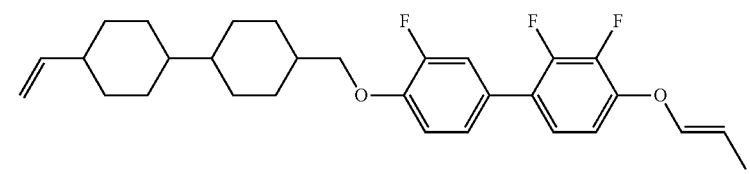 [SMILES: C=CC1CCC(C2CCC(COc3ccc(-c4ccc(O/C=C/C)c(F)c4F)cc3F)CC2)CC1] |
| 300 | 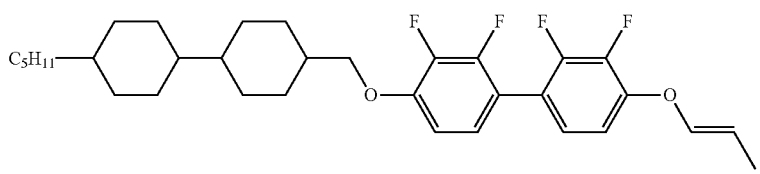 |
| 301 | 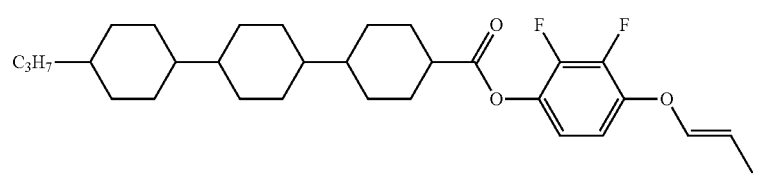 |
| 302 | 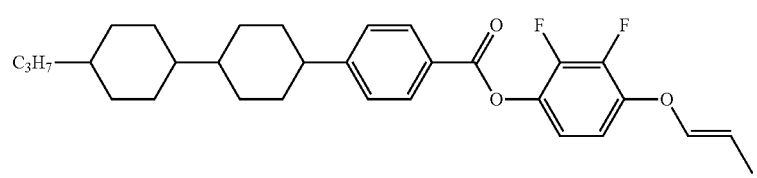 |

| No. | |
|---|---|
| 303 | 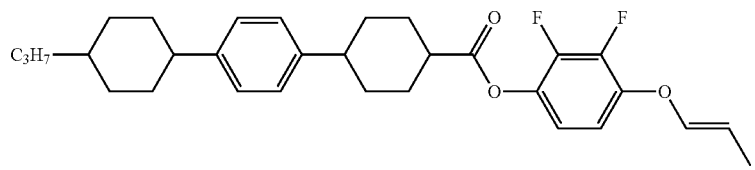 |
| 304 | 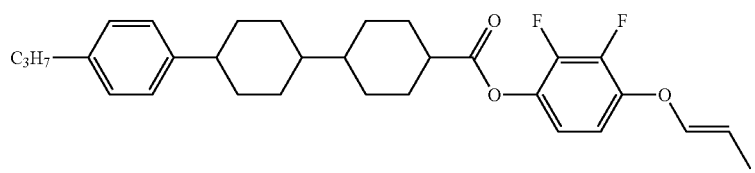 |
| 305 | 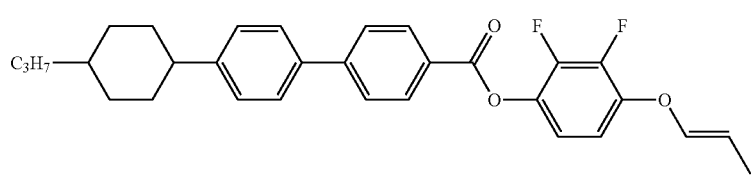 |
| 306 | 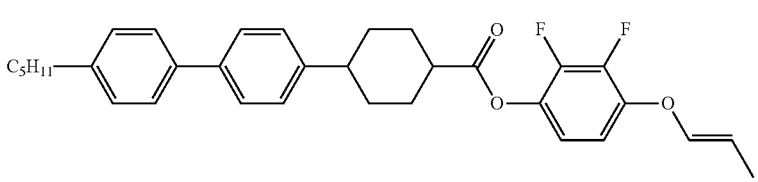 |
| 307 | 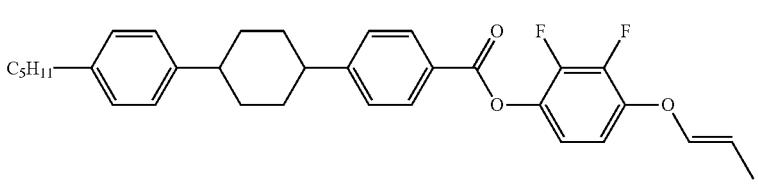 |
| 308 | 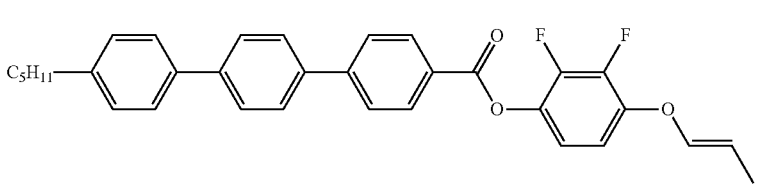 |
| 309 | 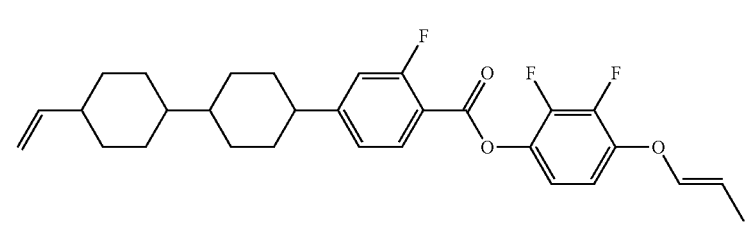 [SMILES: C=CC1CCC(C2CCC(c3ccc(C(=O)Oc4ccc(O/C=C/C)c(F)c4F)c(F)c3)CC2)CC1] |
| 310 | 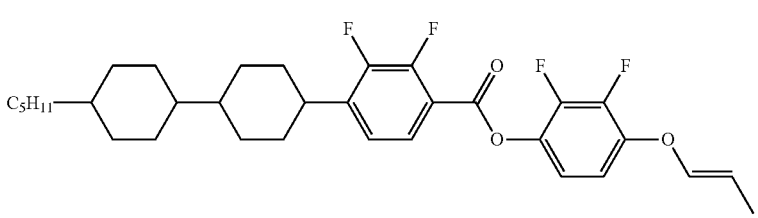 |

-continued
| No. | |
|---|---|
| 311 | 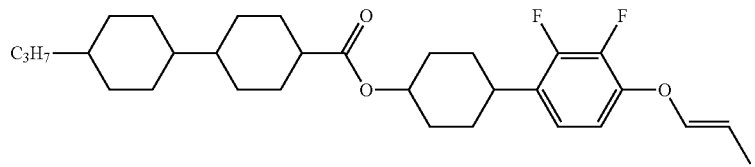 |
| 312 | 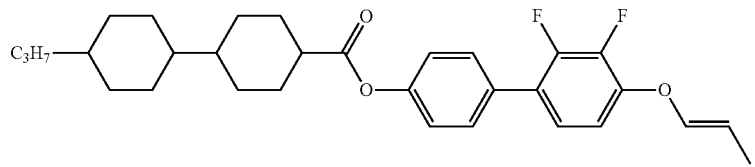 |
| 313 | 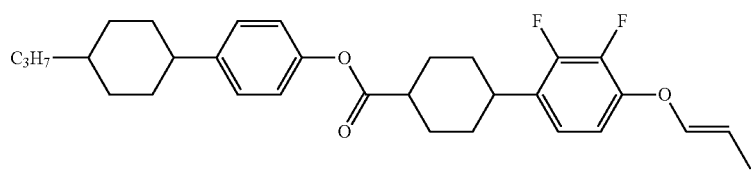 |
| 314 | 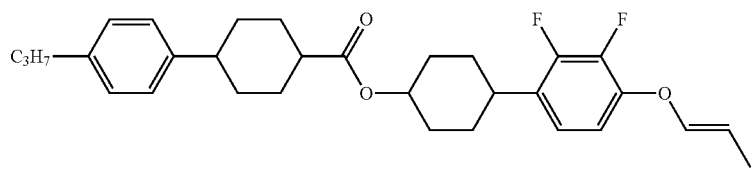 |
| 315 | 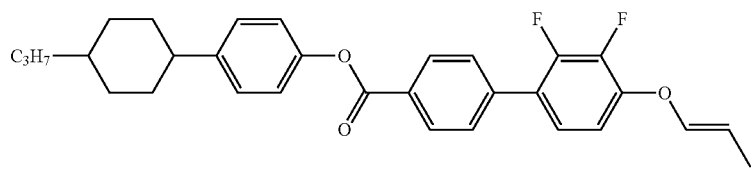 |
| 316 | 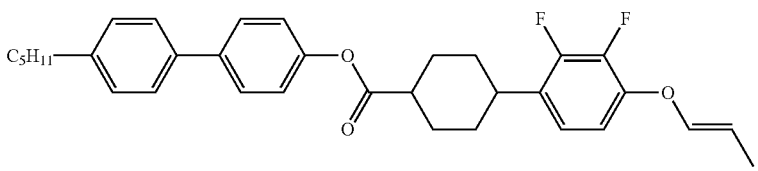 |
| 317 | 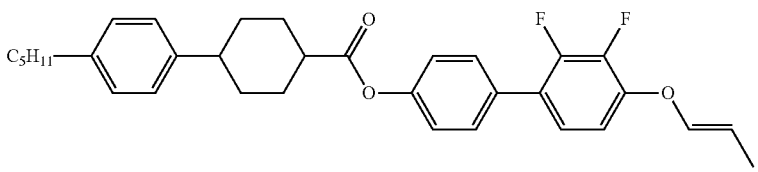 |
| 318 | 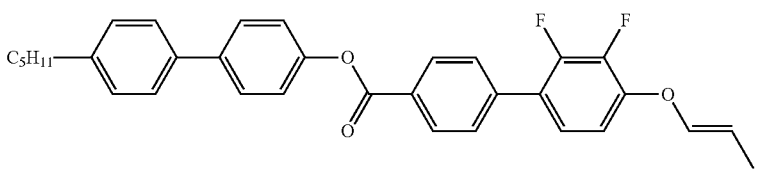 |
| 319 | 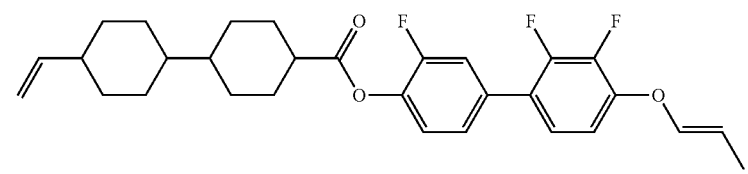 |

-continued

| No. | |
|---|---|
| 320 | 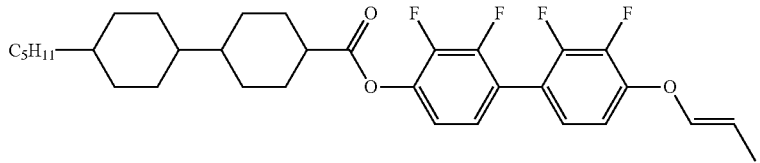 |

1-2. Example of Composition (1)

Liquid crystal composition (1) of the invention will be explained in detail by way of Examples. Compounds described in Examples were expressed using symbols according to definitions in the Table below. In the Table, a configuration of 1,4-cyclohexylene is trans. A parenthesized number next to a symbolized compound in Examples corresponds to the number of the compound. A symbol (—) means any other liquid crystal compound. A ratio (percentage) of a liquid crystal compound is expressed in terms of weight percentage (% by weight) based on the total weight of the liquid crystal composition. Values of physical properties of the composition were summarized in a last part. The physical properties were measured in accordance with the methods described above, and were directly described without extrapolating the measured values.

TABLE

Method for Description of Compounds using Symbols
R—(A₁)—Z₁—•••••—Zn—(Aₙ)—R'

| 1) Left-terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn- |
| $CH_2=CH$— | V— |
| $C_nH_{2n+1}$—CH=CH— | nV— |
| $CH_2=CH$—$C_nH_{2n}$— | Vn- |
| $C_mH_{2m+1}$—CH=CH—$C_nH_{2n}$— | mVn- |
| $CF_2=CH$— | VFF— |
| $CF_2=CH$—$C_nH_{2n}$— | VFFn- |

| 2) Right-terminal Group —R' | Symbol |
|---|---|
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —OCH=CH—$C_nH_{2n+1}$ | —OVn |
| —$C_nH_{2n}$—CH=$CH_2$ | -nV |
| —CH=$CF_2$ | —VFF |
| —$COOCH_3$ | -EMe |
| —CN | —C |
| —F | —F |
| —Cl | —CL |
| —$OCF_3$ | —$OCF_3$ |

| 3) Bonding Group —$Z_n$— | Symbol |
|---|---|
| —$CnH_{2n}$— | n |
| —COO— | E |
| —CH=CH— | V |
| —$CH_2O$— | 10 |
| —$CF_2O$— | X |
| —C≡C— | T |

| 4) Ring Structure —$A_n$— | Symbol |
|---|---|
| (cyclohexylene) | H |
| (tetrahydropyran) | Dh |

TABLE-continued
| Structure | Code |
|---|---|
| (tetrahydropyran) | dh |
| (1,3-dioxane) | G |
| (benzene) | B |
| (pyrimidine) | Py |
| (2-fluorobenzene) | B (2F) |
| (3-fluorobenzene) | B (F) |
| (3,5-difluorobenzene) | B (F, F) |
| (2,3-difluorobenzene) | B (2F, 3F) |
| (2-fluoro-3-chlorobenzene) | B (2F, 3CL) |
| (2-chloro-3-fluorobenzene) | B (2CL, 3F) |
5) Examples of Description
Example 1    3-H1OB(2F, 3F)-OV1
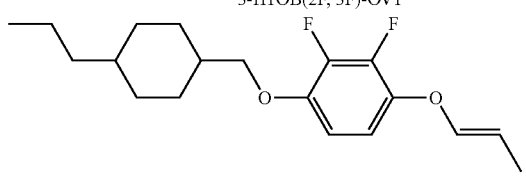

TABLE-continued

Example 2  V-HHB(2F, 3F)-OV1

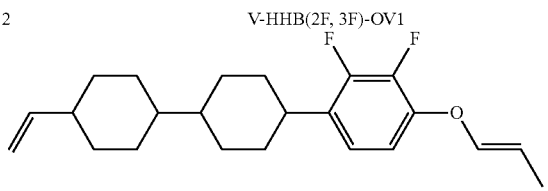

Example 3  1V2-BEB-C

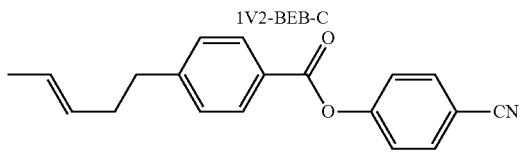

Example 4  3-H2BTB-2

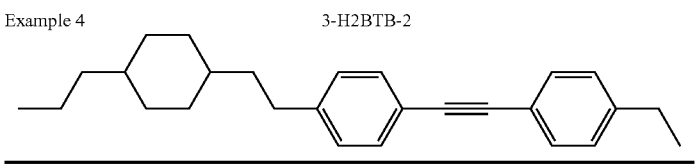

Example 6

| | | |
|---|---|---|
| 3-H1OB(2F,3F)-OV1 | (No. 83) | 4% |
| 3-BB(2F,3F)-OV1 | (No. 23) | 4% |
| 3-HH-O1 | (13-1) | 8% |
| 5-HH-O1 | (13-1) | 4% |
| 3-HH-4 | (13-1) | 5% |
| 3-HB(2F,3F)-O2 | (6-1) | 16% |
| 5-HB(2F,3F)-O2 | (6-1) | 21% |
| 3-HHB(2F,3F)-1 | (7-1) | 7% |
| 3-HHB(2F,3F)-O2 | (7-1) | 14% |
| 5-HHB(2F,3F)-O2 | (7-1) | 17% |

NI = 64.4° C.;
Δn = 0.084;
Δε = −4.1;
η = 29.3 mPa · s.

Example 7

| | | |
|---|---|---|
| 3-H1OB(2F,3F)-OV1 | (No. 83) | 3% |
| 3-HB(2F,3F)-OV1 | (No. 3) | 3% |
| 3-HB-O1 | (13-5) | 15% |
| 3-HH-4 | (13-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 12% |
| 3-HHB(2F,3F)-O2 | (7-1) | 7% |
| 5-HHB(2F,3F)-O2 | (7-1) | 13% |
| 3-HHB-1 | (14-1) | 6% |

NI = 73.2° C.;
Δn = 0.087;
Δε = −3.0;
η = 23.3 mPa · s.

Example 8

| | | |
|---|---|---|
| 3-HB(2F,3F)-OV1 | (No. 3) | 4% |
| V-HHB(2F,3F)-OV1 | (No. 136) | 4% |
| 3-HH-4 | (13-1) | 6% |
| 3-H2B(2F,3F)-O2 | (6-4) | 22% |
| 5-H2B(2F,3F)-O2 | (6-4) | 22% |
| 2-HHB(2F,3CL)-O2 | (7-12) | 2% |
| 3-HHB(2F,3CL)-O2 | (7-12) | 3% |
| 4-HHB(2F,3CL)-O2 | (7-12) | 2% |
| 5-HHB(2F,3CL)-O2 | (7-12) | 2% |
| 3-HBB(2F,3F)-O2 | (7-7) | 9% |
| 5-HBB(2F,3F)-O2 | (7-7) | 9% |
| V-HHB-1 | (14-1) | 6% |
| 3-HHB-3 | (14-1) | 6% |
| 3-HHEBH-5 | (15-6) | 3% |

NI = 82.2° C.;
Δn = 0.101;
Δε = −3.8;
η = 29.1 mPa · s.

Example 9

| | | |
|---|---|---|
| 3-H1OB(2F,3F)-OV1 | (No. 83) | 4% |
| 3-HH1OB(2F,3F)-OV1 | (No. 203) | 3% |
| 3-HB-O1 | (13-5) | 15% |
| 3-HH-4 | (13-1) | 4% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 12% |
| 3-HHB(2F,3F)-O2 | (7-1) | 10% |
| 5-HHB(2F,3F)-O2 | (7-1) | 10% |
| 6-HEB(2F,3F)-O2 | (6-6) | 6% |

NI = 71.1° C.;
Δn = 0.088;
Δε = −3.5;
η = 26.3 mPa · s.

A pitch was 59.7 micrometers when 0.25 part by weight of optically active compound (Op-05) was added to 100 parts by weight of the composition described above.

Example 10

| 3-BB(2F,3F)-OV1 | (No. 23) | 4% |
| --- | --- | --- |
| 3-HB(2F,3F)-OV1 | (No. 3) | 3% |
| 2-HH-5 | (13-1) | 3% |
| 3-HH-4 | (13-1) | 15% |
| 3-HH-5 | (13-1) | 4% |
| 3-HB-O2 | (13-5) | 12% |
| 3-H2B(2F,3F)-O2 | (6-4) | 15% |
| 5-H2B(2F,3F)-O2 | (6-4) | 15% |
| 3-HHB(2F,3CL)-O2 | (7-12) | 5% |
| 2-HBB(2F,3F)-O2 | (7-7) | 3% |
| 3-HBB(2F,3F)-O2 | (7-7) | 9% |
| 5-HBB(2F,3F)-O2 | (7-7) | 5% |
| 3-HHB-1 | (14-1) | 4% |
| 3-HHB-O1 | (14-1) | 3% |

NI = 63.0° C.;
Δn = 0.091;
Δε = −2.8;
η = 19.0 mPa · s.

Example 11

| 3-H1OB(2F,3F)-OV1 | (No. 83) | 4% |
| --- | --- | --- |
| 3-HH1OB(2F,3F)-OV1 | (No. 203) | 3% |
| 3-HB-O1 | (13-5) | 12% |
| 3-HH-4 | (13-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 12% |
| 3-HHB(2F,3F)-O2 | (7-1) | 9% |
| 5-HHB(2F,3F)-O2 | (7-1) | 13% |
| 3-HHB-1 | (14-1) | 6% |

NI = 80.3° C.;
Δn = 0.089;
Δε = −3.3;
η = 26.0 mPa · s.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A liquid crystal compound of the invention has a high stability to heat, light and so forth, a high clearing point, a low minimum temperature of a liquid crystal phase, a small viscosity, a suitable optical anisotropy, a large negative dielectric anisotropy, a suitable elastic constant and an excellent compatibility with other liquid crystal compounds. A liquid crystal composition of the invention contains the compound, and has a high maximum temperature of a nematic phase, a low minimum temperature of the nematic phase, a small viscosity, a suitable optical anisotropy, a large negative dielectric anisotropy, and a suitable elastic constant. The composition has a suitable balance regarding at least two of physical properties. A liquid crystal display device of the invention includes the composition, and has a wide temperature range in which the device can be used, a short response time, a large voltage holding ratio, a low threshold voltage, a large contrast ratio and a long service life. Therefore, the device can be widely applied to a display of a personal computer, a television and so forth.

What is claimed is:

1. A compound represented by formula (1-1):

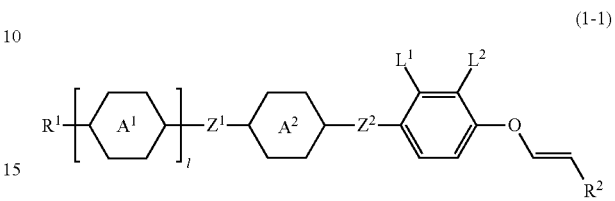

wherein, in formula (1-1),
$R^1$ is hydrogen, alkyl having 1 to 10 carbons, alkoxy having 1 to 9 carbons, alkoxyalkyl having 2 to 9 carbons, alkenyl having 2 to 10 carbons or alkenyloxy having 2 to 9 carbons;
$R^2$ is alkyl having 1 to 10 carbons, alkoxy having 1 to 9 carbons, alkoxyalkyl having 2 to 9 carbons, alkenyl having 3 to 10 carbons or alkenyloxy having 2 to 9 of carbons;
ring $A^1$ is 1,4-cyclohexylene, 1,4-cyclohexenylene or 1,4-phenylene;
ring $A^2$ is 1,4-cyclohexylene, 1,4-cyclohexenylene, 1,4-phenylene, 2-fluoro-1,4-phenylene or 2,3-difluoro-1,4-phenylene;
$Z^1$ and $Z^2$ are independently a single bond, —$(CH_2)_2$—, —$CH_2O$—, —$OCH_2$—, —COO— or —OCO—;
$L^1$ and $L^2$ are independently fluorine or chlorine and at least one of $L^1$ and $L^2$ is fluorine; and
l is 0, 1, or 2;
wherein when l is 0, $R^2$ is alkoxy having 1 to 6 carbons, alkoxyalkyl having 2 to 6 carbons, or alkenyloxy having 2 to 5 carbons; and
wherein when l is 1 or 2, $A^2$ is 1,4-cyclohexylene, 1,4-cyclohexenylene, 1,4-phenylene, or 2-fluoro-1,4-phenylene.

2. The compound according to claim 1, represented by formula (1-2):

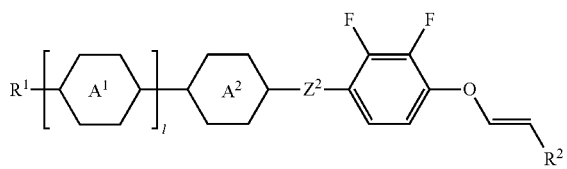

wherein, in formula (1-2),
$R^1$ and $R^2$ are independently alkyl having 1 to 10 carbons, alkoxy having 1 to 9 carbons, alkoxyalkyl having 2 to 9 carbons, alkenyl having 3 to 10 carbons or alkenyloxy having 2 to 9 carbons;
ring $A^1$ is 1,4-cyclohexylene, 1,4-cyclohexenylene or 1,4-phenylene;
ring $A^2$ is 1,4-cyclohexylene, 1,4-cyclohexenylene, 1,4-phenylene, 2-fluoro-1,4-phenylene or 2,3-difluoro-1,4-phenylene;

$Z^2$ is a single bond, —(CH$_2$)$_2$—, —CH$_2$O—, —OCH$_2$—, —COO— or —OCO—; and l is 0, 1 or 2;

wherein when l is 0, R$^2$ is alkoxy having 1 to 6 carbons, alkoxyalkyl having 2 to 6 carbons or alkenyloxy having 2 to 5 of carbons; and wherein when l is 1 or 2, A$^2$ is 1,4-cyclohexylene, 1,4-cyclohexenylene, 1,4-phenylene, or 2-fluoro-1,4-phenylene.

3. The compound according to claim 2, represented by formula (1-3):

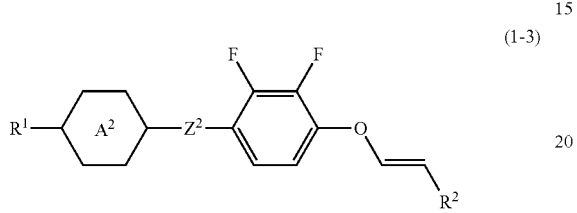

(1-3)

wherein, in formula (1-3),

R$^1$ is alkyl having 1 to 10 carbons, alkoxy having 1 to 9 carbons, alkoxyalkyl having 2 to 9 carbons, alkenyl having 2 to 10 carbons or alkenyloxy having 2 to 9 carbons R$^2$ is alkoxy having 1 to 6 carbons, alkoxyalkyl having 2 to 6 carbons, or alkenyloxy having 2 to 5 carbons;

ring A$^2$ is 1,4-cyclohexylene, 1,4-cyclohexenylene, 1,4-phenylene, 2-fluoro-1,4-phenylene, or 2,3-difluoro-1,4-phenylene; and $Z^2$ is a single bond, —(CH$_2$)$_2$—, —CH$_2$O—, —OCH$_2$—, —COO— or —OCO—.

4. The compound according to claim 2, represented by formula (1-4):

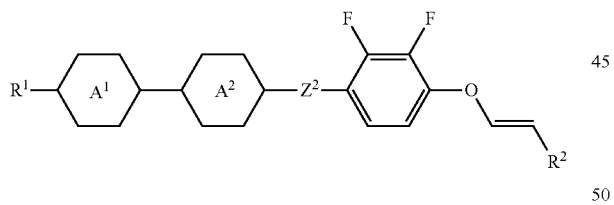

(1-4)

wherein, in formula (1-4),

R$^1$ is alkyl having 1 to 10 carbons, alkoxy having 1 to 9 carbons, alkoxyalkyl having 2 to 9 carbons, alkenyl having 2 to 10 carbons or alkenyloxy having 2 to 9 carbons;

R$^2$ is alkyl having 1 to 10 carbons, alkoxy having 1 to 9 carbons, alkoxyalkyl having 2 to 9 carbons, alkenyl having 3 to 10 carbons or alkenyloxy having 2 to 9 carbons;

ring A$^1$ is 1,4-cyclohexylene, 1,4-cyclohexenylene or 1,4-phenylene;

ring A$^2$ is 1,4-cyclohexylene, 1,4-cyclohexenylene, 1,4-phenylene or 2-fluoro-1,4-phenylene; and $Z^2$ is a single bond, —(CH$_2$)$_2$—, —CH$_2$O—, —OCH$_2$—, —COO— or —OCO—.

5. The compound according to claim 2, represented by any one of formulas (1-5-1) to (1-5-8) and (1-5-10) to (1-5-12):

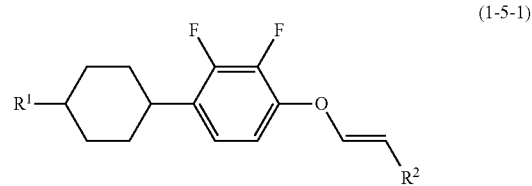

(1-5-1)

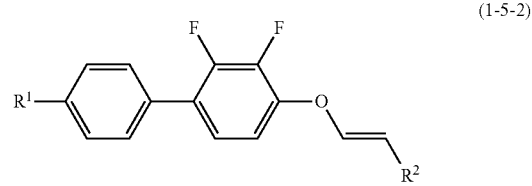

(1-5-2)

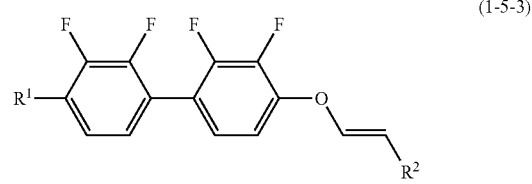

(1-5-3)

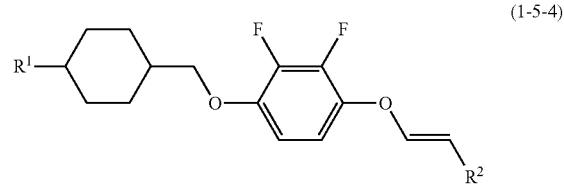

(1-5-4)

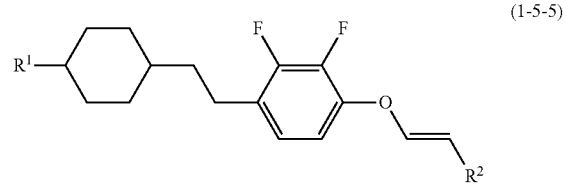

(1-5-5)

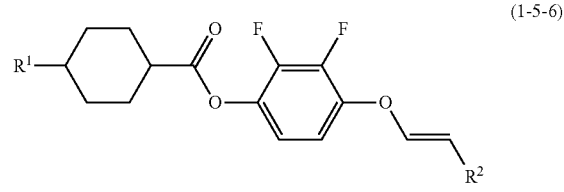

(1-5-6)

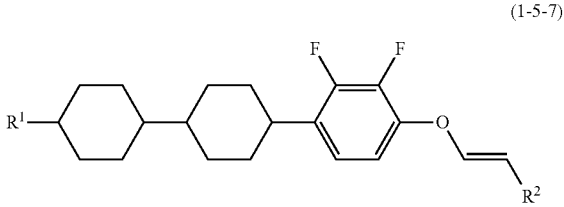

(1-5-7)

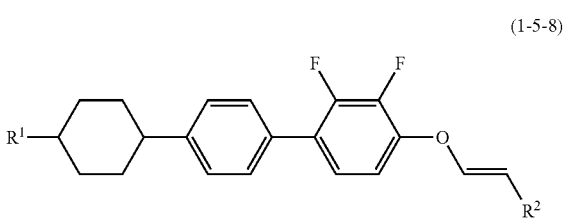

(1-5-8)

-continued

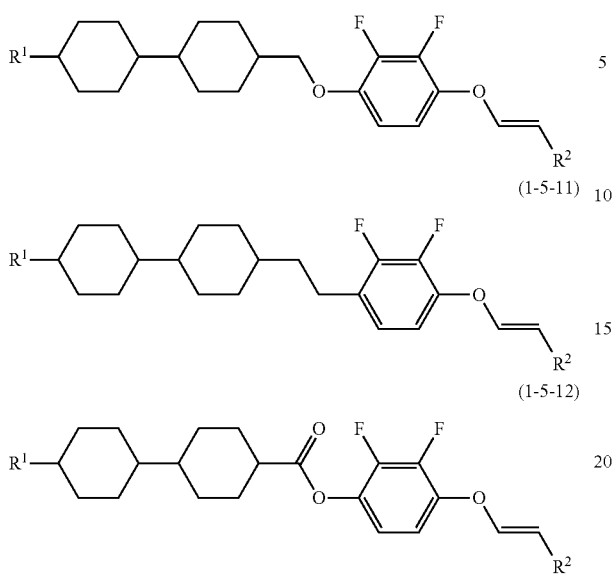

wherein, in formula (1-5-1) to (1-5-6),
R¹ is alkyl having 1 to 10 carbons, alkoxy having 1 to 9 carbons, alkoxyalkyl having 2 to 9 carbons, alkenyl having 2 to 10 carbons or alkenyloxy having 2 to 9 carbons; and
R² is alkoxy having 1 to 6 carbons, alkoxyalkyl having 2 to 6 carbons or alkenyloxy having 2 to 5 carbons;
wherein, in formula (1-5-7), (1-5-8), and (1-5-10) to (1-5-12), R¹ is alkyl having 1 to 10 carbons, alkoxy having 1 to 9 carbons, alkoxyalkyl having 2 to 9 carbons, alkenyl having 2 to 10 carbons or alkenyloxy having 2 to 9 carbons; and
wherein R² is alkyl having 1 to 10 carbons, alkoxy having 1 to 9 carbons, alkoxyalkyl having 2 to 9 carbons, alkenyl having 3 to 10 carbons or alkenyloxy having 2 to 9 carbons.

6. The compound according to claim 5, wherein, in formulas (1-5-10) to (1-5-12) according to claim 5, R¹ is alkyl having 1 to 10 carbons or alkenyl having 2 to 10 carbons, and R² is alkyl having 1 to 10 carbons or alkenyl having 3 to 10 carbons.

7. A liquid crystal composition, containing at least one of the compounds according to claim 1.

8. The liquid crystal composition according to claim 7, further containing at least one compound selected from the group of compounds represented by formula (6) to (12):

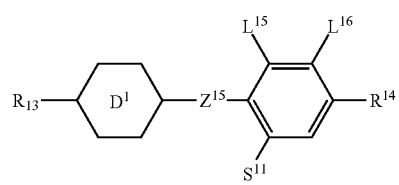

(6)

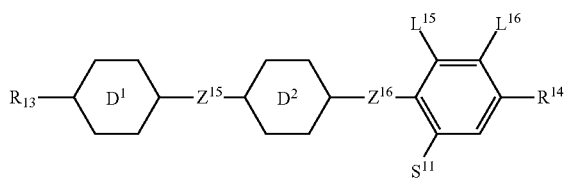

(7)

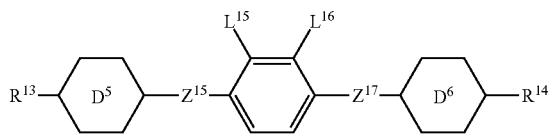

(8)

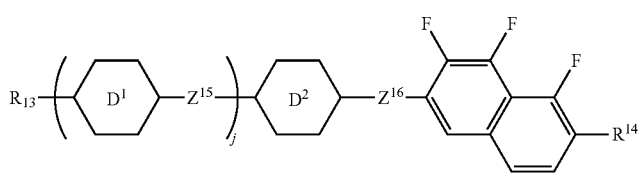

(9)

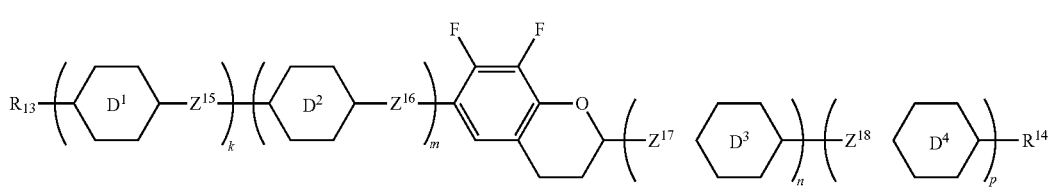

(10)

-continued

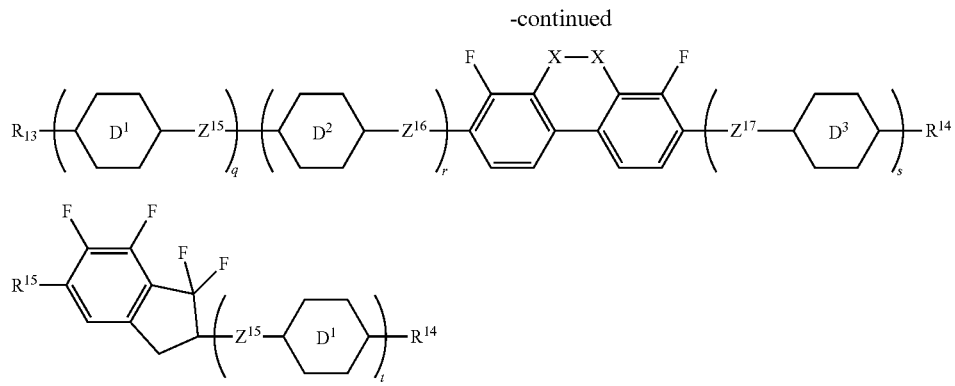

wherein, in formulas (6) to (12), $R^{13}$ is alkyl having 1 to 10 carbons or alkenyl having 2 to 10 carbons, and in the alkyl and the alkenyl, at least one of —$CH_2$— may be replaced by —O— and at least one of hydrogen may be replaced by fluorine;

$R^{14}$ is alkyl having 1 to 10 carbons, and in the alkyl, at least one of —$CH_2$— may be replaced by —O— and at least one of hydrogen may be replaced by fluorine;

$R^{15}$ is hydrogen, fluorine, alkyl having 1 to 10 carbons or alkenyl having 2 to 10 carbons, and in the alkyl and the alkenyl, at least one of —$CH_2$— may be replaced by —O— and at least one of hydrogen may be replaced by fluorine;

$S^{11}$ is independently hydrogen or methyl;

X is —$CF_2$—, —O— or —CHF—;

ring $D^1$, ring $D^2$, ring $D^3$ and ring $D^4$ are independently 1,4-cyclohexylene, 1,4-cyclohexenylene, 1,4-phenylene in which at least one of hydrogen may be replaced by fluorine, tetrahydropyran-2,5-diyl or decahydronaphthalene-2,6-diyl;

ring $D^5$ and ring $D^6$ are independently 1,4-cyclohexylene, 1,4-cyclohexenylene, 1,4-phenylene, tetrahydropyran-2,5-diyl or decahydronaphthalene 2,6-diyl;

$Z^{15}$, $Z^{16}$, $Z^{17}$ and $Z^{18}$ are independently a single bond, —$CH_2CH_2$—, —COO—, —$CH_2O$—, —$OCF_2$— or —$OCF_2CH_2CH_2$—;

$L^9$ and $L^{10}$ are independently fluorine or chlorine; and j, k, m, n, p, q, r and s are independently 0 or 1, a sum of k, m, n and p is 1 or 2, a sum of q, r and s is 0, 1, 2 or 3, and t is 1, 2 or 3.

9. The liquid crystal composition according to claim 7, further containing at least one compound selected from the group of compounds represented by formulas (13) to (15):

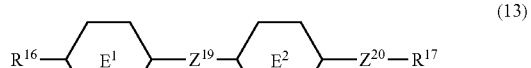

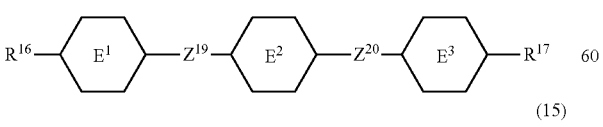

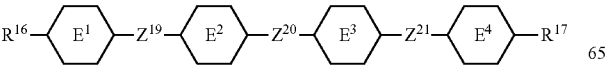

wherein, in formulas (13) to (15), $R^{16}$ and $R^{17}$ are independently alkyl having 1 to 10 carbons or alkenyl having 2 to 10 carbons, and in the alkyl or the alkenyl, at least one of —$CH_2$— may be replaced by —O— and at least one of hydrogen may be replaced by fluorine;

ring $E^1$, ring $E^2$, ring $E^3$, and ring $E^4$ are independently 1,4-cyclohexylene, 1,4-phenylene, 2-fluoro-1,4-phenylene, 2,5-difluoro-1,4-phenylene or pyrimidine-2,5-diyl; and $Z^{19}$, $Z^{20}$ and $Z^{21}$ are independently a single bond, —$CH_2CH_2$—, —CH=CH—, —C≡C— or —COO—.

10. The liquid crystal composition according to claim 7, further containing at least one compound selected from the group of compounds represented by formulas (2) to (4):

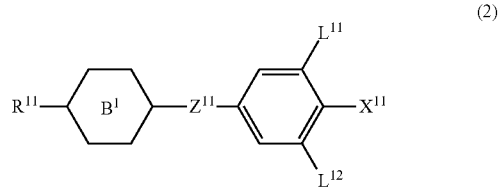

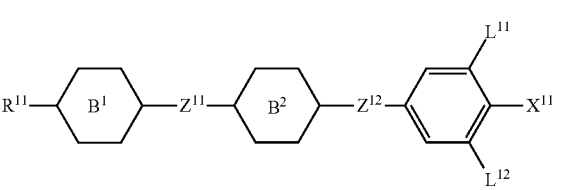

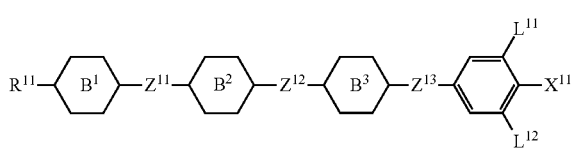

wherein, in formulas (2) to (4), $R^{11}$ is alkyl having 1 to 10 carbons or alkenyl having 2 to 10 carbons, and in the alkyl and the alkenyl, at least one of hydrogen may be replaced by fluorine and at least one of —$CH_2$— may be replaced by —O—;

$X^{11}$ is fluorine, chlorine, —$OCF_3$, —$OCHF_2$, —$CF_3$, —$CHF_2$, —$CH_2F$, —$OCF_2CHF_2$ or —$OCF_2CHFCF_3$;

ring $B^1$, ring $B^2$ and ring $B^3$ are independently 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;

$Z^{11}$, $Z^{12}$ and $Z^{13}$ are independently a single bond, —CH$_2$CH$_2$—, —CH=CH—, —C≡C—, —COO—, —CF$_2$O—, —OCF$_2$—, —CH$_2$O— or —(CH$_2$)$_4$—; and $L^{11}$ and $L^{12}$ are independently hydrogen or fluorine.

11. The liquid crystal composition according to claim 7, further containing at least one compound selected from the group of compounds represented by formula (5):

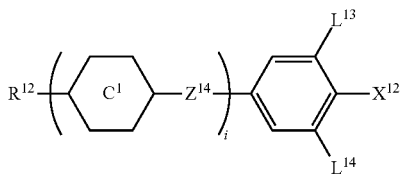
(5)

wherein, in formula (5),
$R^{12}$ is alkyl having 1 to 10 carbons or alkenyl having 2 to 10 carbons, and in the alkyl and alkenyl, at least one of hydrogen may be replaced by fluorine and at least one of —CH$_2$— may be replaced by —O—;
$X^{12}$ is —C≡N or —C≡C—C≡N;
ring $C^1$ is 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;
$Z^{14}$ is a single bond, —CH$_2$CH$_2$—, —C≡C—, —COO—, —CF$_2$O—, —OCF$_2$— or —CH$_2$O—;
$L^{13}$ and $L^{14}$ are independently hydrogen or fluorine; and
i is 1, 2, 3 or 4.

12. The liquid crystal composition according to claim 7, further containing at least one optically active compound and/or at least one polymerizable compound.

13. The liquid crystal composition according to claim 7, further containing at least one antioxidant and/or at least one ultraviolet light absorber.

14. A liquid crystal display device, including the liquid crystal composition according to claim 7.

* * * * *